(12) United States Patent
Safonov

(10) Patent No.: US 7,250,699 B2
(45) Date of Patent: Jul. 31, 2007

(54) TURBINE GENERATOR VIBRATION DAMPER SYSTEM

(76) Inventor: Vladilen V. Safonov, 455 Graceland Ave., Des Plaines, IL (US) 60016

( * ) Notice: Subject to any disclaimer, the term of this patent is extended or adjusted under 35 U.S.C. 154(b) by 0 days.

(21) Appl. No.: 11/223,419

(22) Filed: Sep. 12, 2005

(65) Prior Publication Data

US 2006/0091741 A1  May 4, 2006

Related U.S. Application Data

(60) Division of application No. PCT/US2004/039854, filed on Nov. 26, 2004, which is a continuation of application No. 10/724,541, filed on Dec. 1, 2003, now Pat. No. 7,026,736.

(51) Int. Cl.
*H02K 7/08* (2006.01)
*H02K 5/24* (2006.01)

(52) U.S. Cl. .............................. 310/51; 310/90; 290/55; 384/627

(58) Field of Classification Search .................. 310/89, 310/90, 51; 290/52, 55; 60/698; 416/144, 416/145; 74/574.2, 604; 384/627, 448; 188/378
See application file for complete search history.

(56) References Cited

U.S. PATENT DOCUMENTS

| | | | |
|---|---|---|---|
| 1,855,570 A | * | 4/1932 | Edison ...................... 74/606 R |
| 4,150,588 A | * | 4/1979 | Brewer ....................... 464/180 |
| 4,352,178 A | * | 9/1982 | Kitamura et al. ........... 369/252 |
| 4,935,651 A | * | 6/1990 | Hong et al. ..................... 310/51 |
| 7,026,736 B2 | * | 4/2006 | Safonov ....................... 310/90 |
| 2005/0116552 A1 | * | 6/2005 | Safonov ....................... 310/51 |
| 2006/0091741 A1 | * | 5/2006 | Safonov ....................... 310/51 |

OTHER PUBLICATIONS

"Vibration Control for a 25 MW Steam Turbine Generator Installation Near Academic Teaching and Research Laboratories", Jack Evans, Twelfth International Congress on Sound and Vibration, Jul. 2005.*

* cited by examiner

*Primary Examiner*—Karl Tamai
(74) *Attorney, Agent, or Firm*—John D. Gugliotta

(57) ABSTRACT

The invention relates to the vibration damper systems (here, method and apparatus) for active removal of beyond-normal internal vibrations from turbine-generator-sets [T-G-Ss]. The invention relies on dynamic forces generated by at least a pair (when symmetrically placed) of "wings" or by at least one "wing" (when centrally placed), or combination of that, and associated hardware mounted on the bearing housing, which operate to offset internally produced vibrations in an active or "real time" fashion. This is in contrast to the typical method of taking the turbine-generator off-line, shutting it down and then eliminating the source of vibration. The invention allows the generator to remain operational during adjustments. Thus, it remains on-line producing electricity and associated revenue. The system may be installed at presently operating T-G-Ss. It also foresees the simple developments to be done in future designed T-G-Ss for use of this method. The use of invention provides a real solution to internal vibrations that develop in turbine-generator-sets throughout their lifetime. This method can also be utilized by other or materially different processes in all kind of machinery, apparatuses and technologies for as long it successfully damps vibrations.

5 Claims, 70 Drawing Sheets

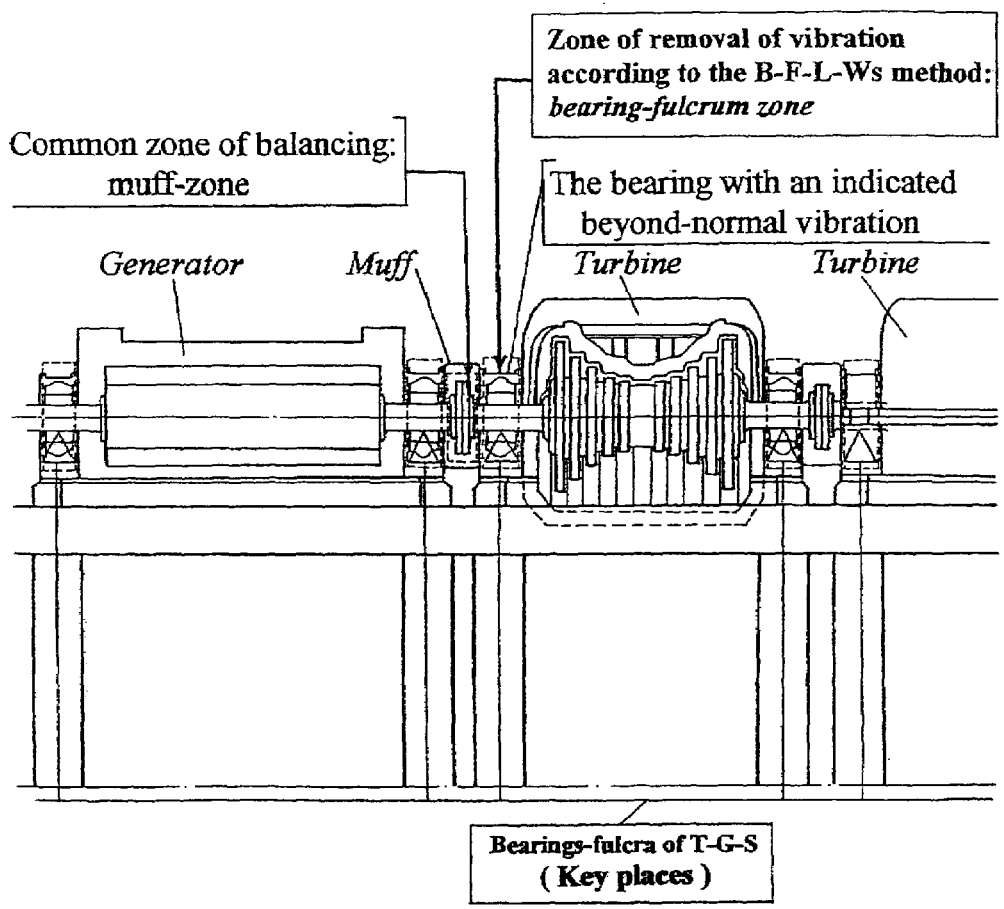
Fig. 1 Zones for application of the process (the method of removal of beyond-normal vibrations at T-G-Ss without stopping their generating electricity / being in operation) - bearings-fulcra zones.

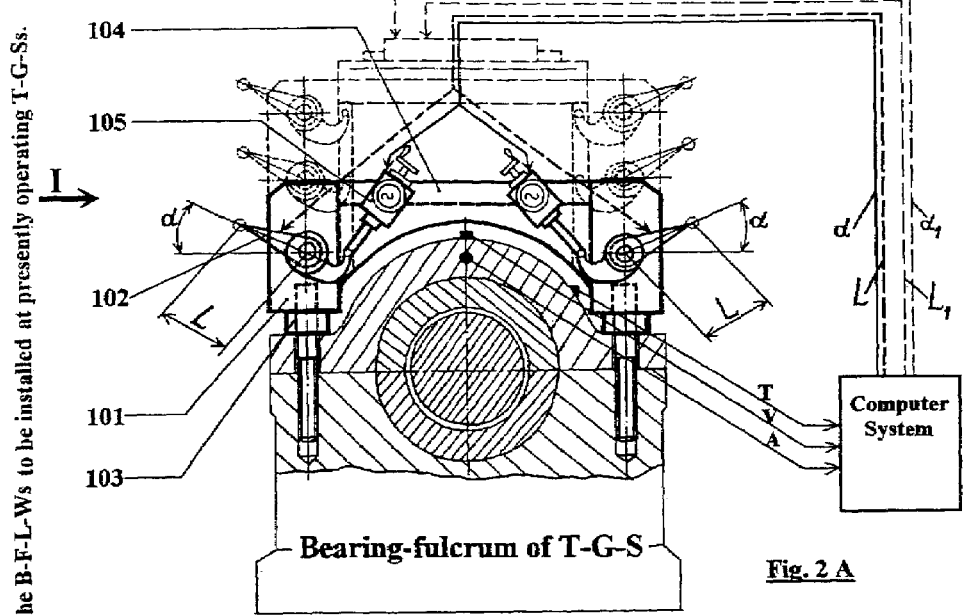
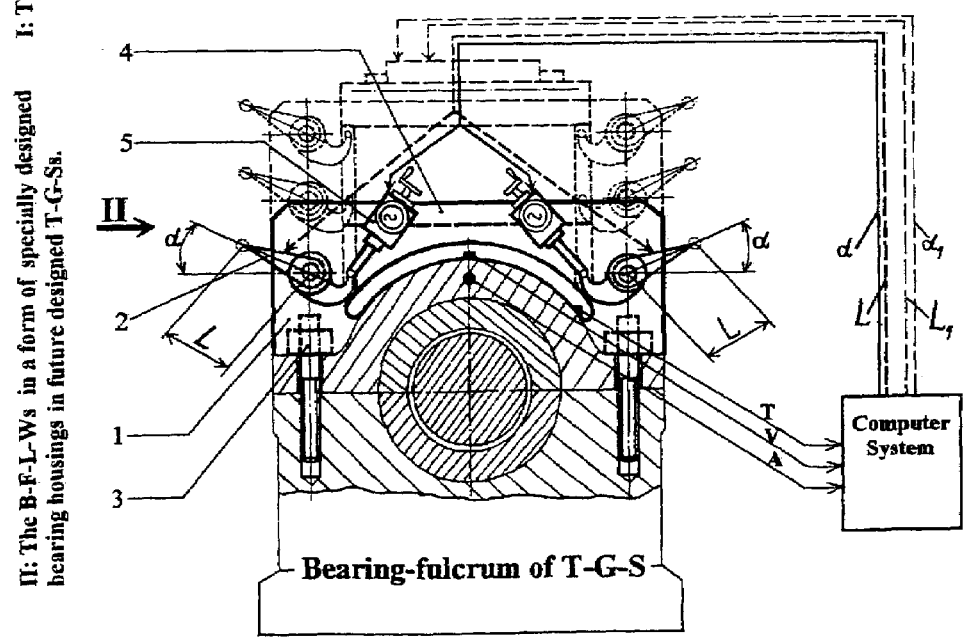
Fig. 2 B Turbine Generator Vibration Damper System: Principal scheme of application upon T-G-Ss.

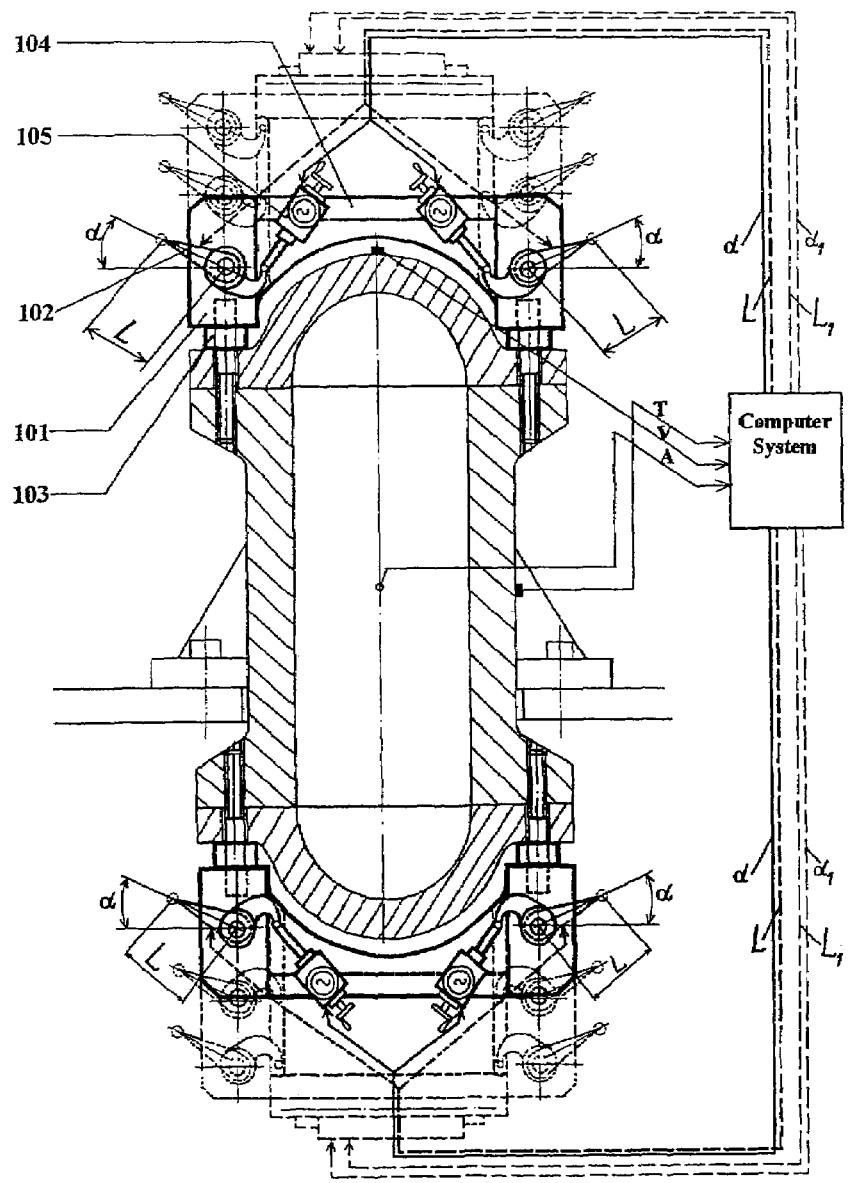
Fig. 2C Removal of vibrations with the B-F-L-Ws at apparatus or reactor. Principal scheme of application.

Turbine Generator Vibration Damper System. Vladilen Safonov.
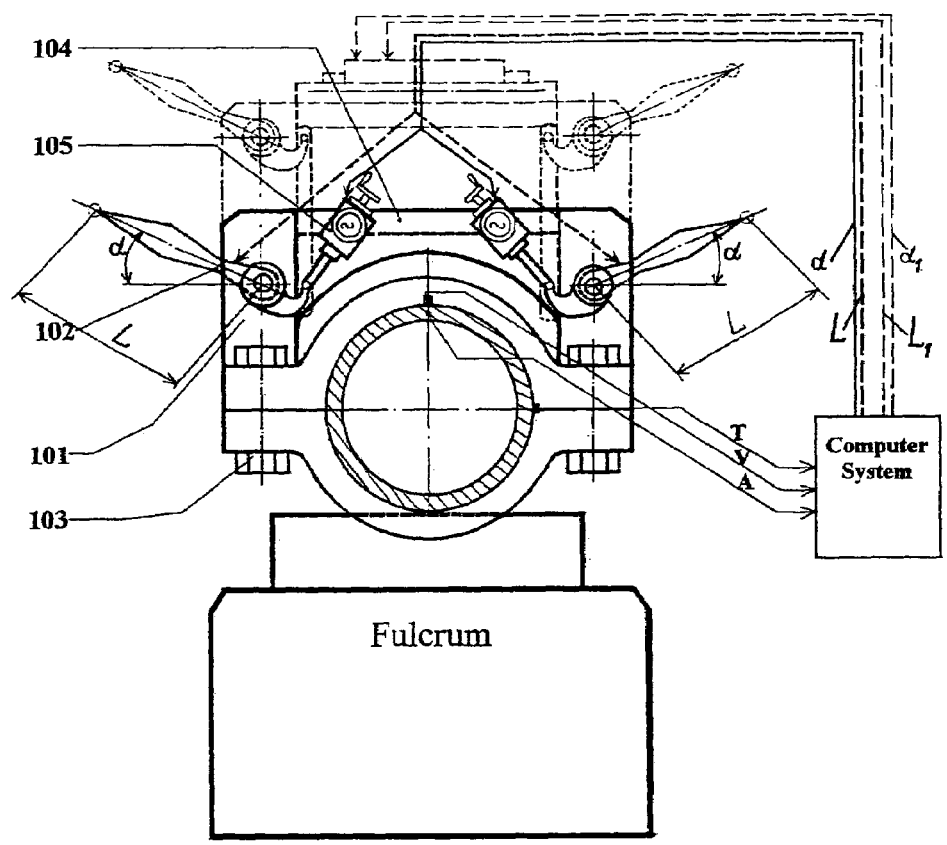
Fig. 2D Removal of vibrations with the B-F-L-Ws at pipeline.
Principal scheme of application.

Turbine Generator Vibration Damper System. Vladilen Safonov.
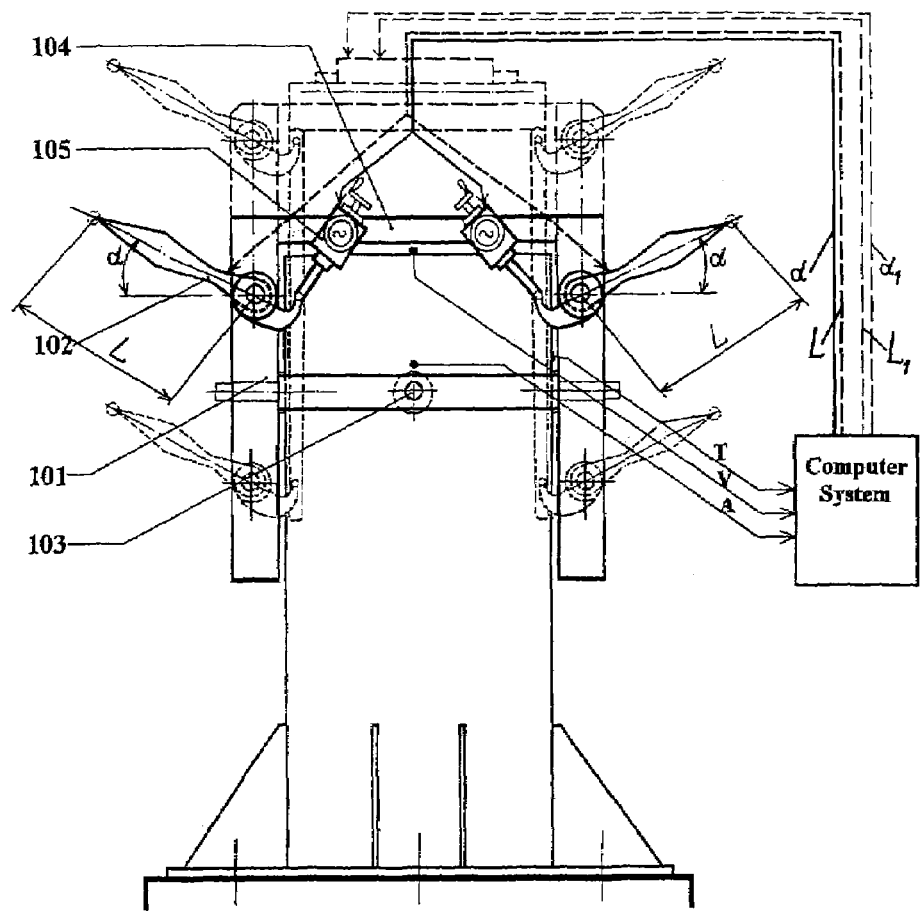
Fig. 2E Removal of vibrations with the B-F-L-Ws at a vibrating body such as tank or vessel. Principle scheme of application.

Turbine Generator Vibration Damper System. Vladilen Safonov.
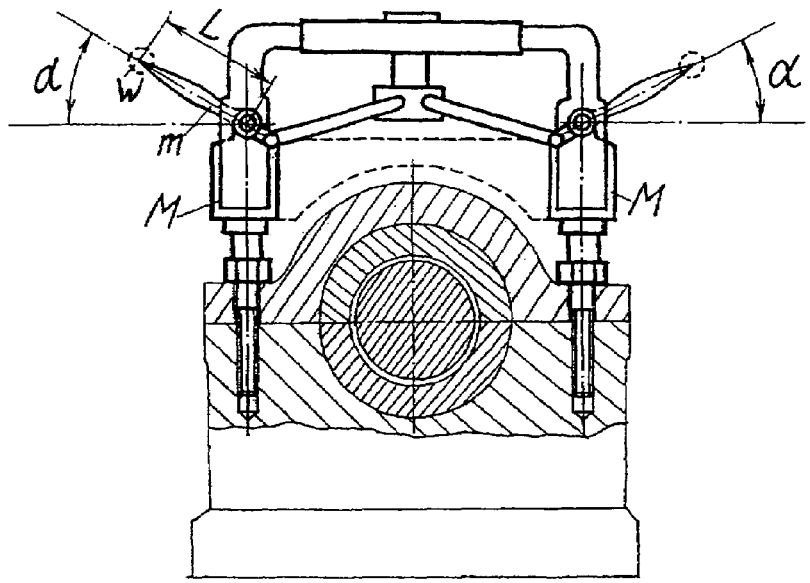
Bearing-fulcrum of T-G-S
Fig. 3 The B-F-L-Ws for removal of beyond-normal vibrations in wide diapasons.
For the stated M & L(m, w) tuning the system to the vibrations damping is done by changing $\alpha$.
See text in Specification.

Turbine Generator Vibration Damper System. Vladilen Safonov.
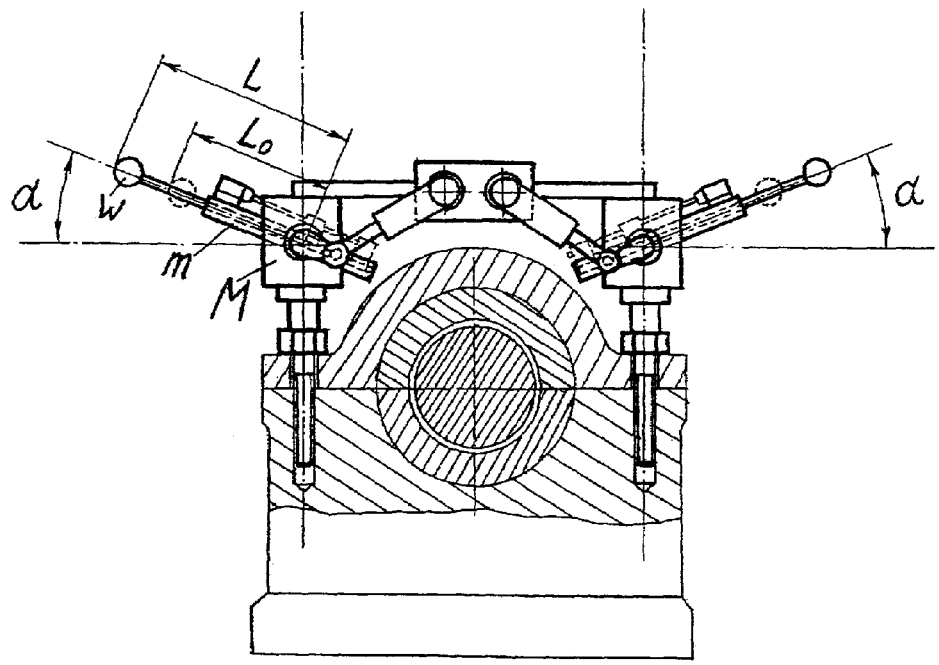
Bearing-fulcrum of T-G-S
Fig. 4 The B-F-L-Ws for removal of beyond-normal vibrations in super-wide diapasons.
For the stated M (and m, w) tuning the system to the vibrations damping is done by changing L and $\alpha$.
See text in Specification.

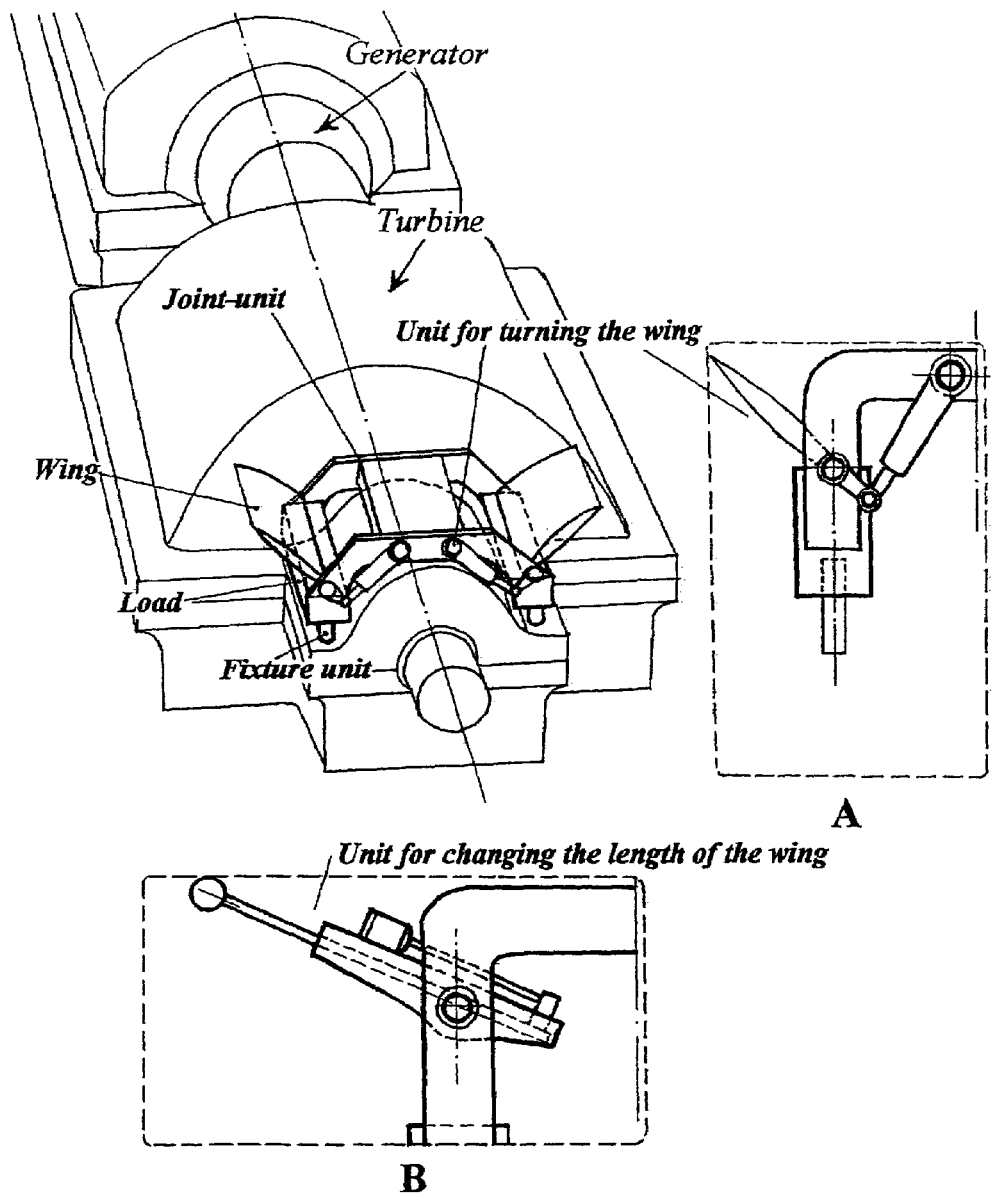
Fig. 5 The main elements of the B-F-L-Ws.

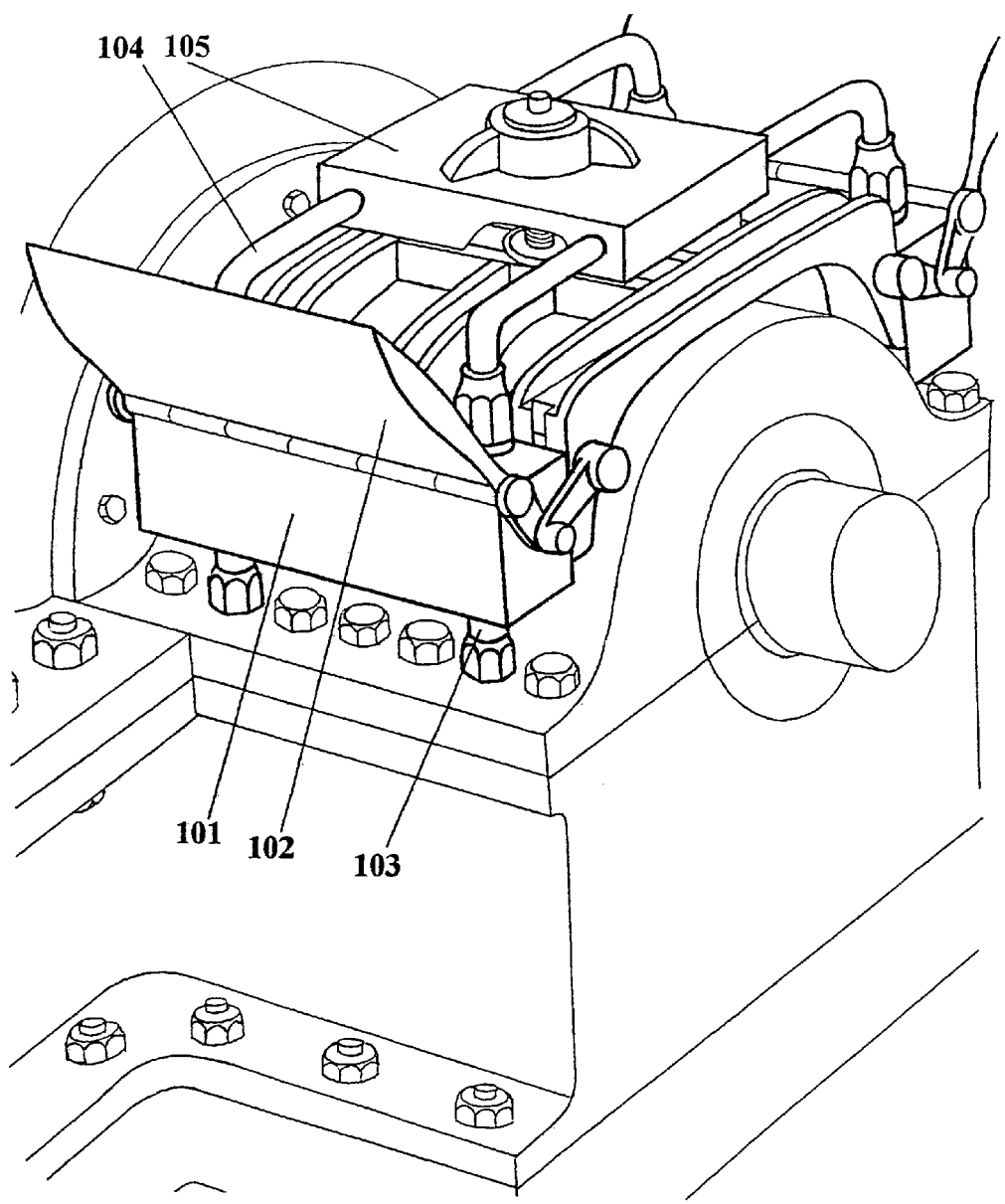
Fig. 6 The B-F-L-Ws for removal of beyond-normal vibrations in wide diapasons (variant). See text in Specification.

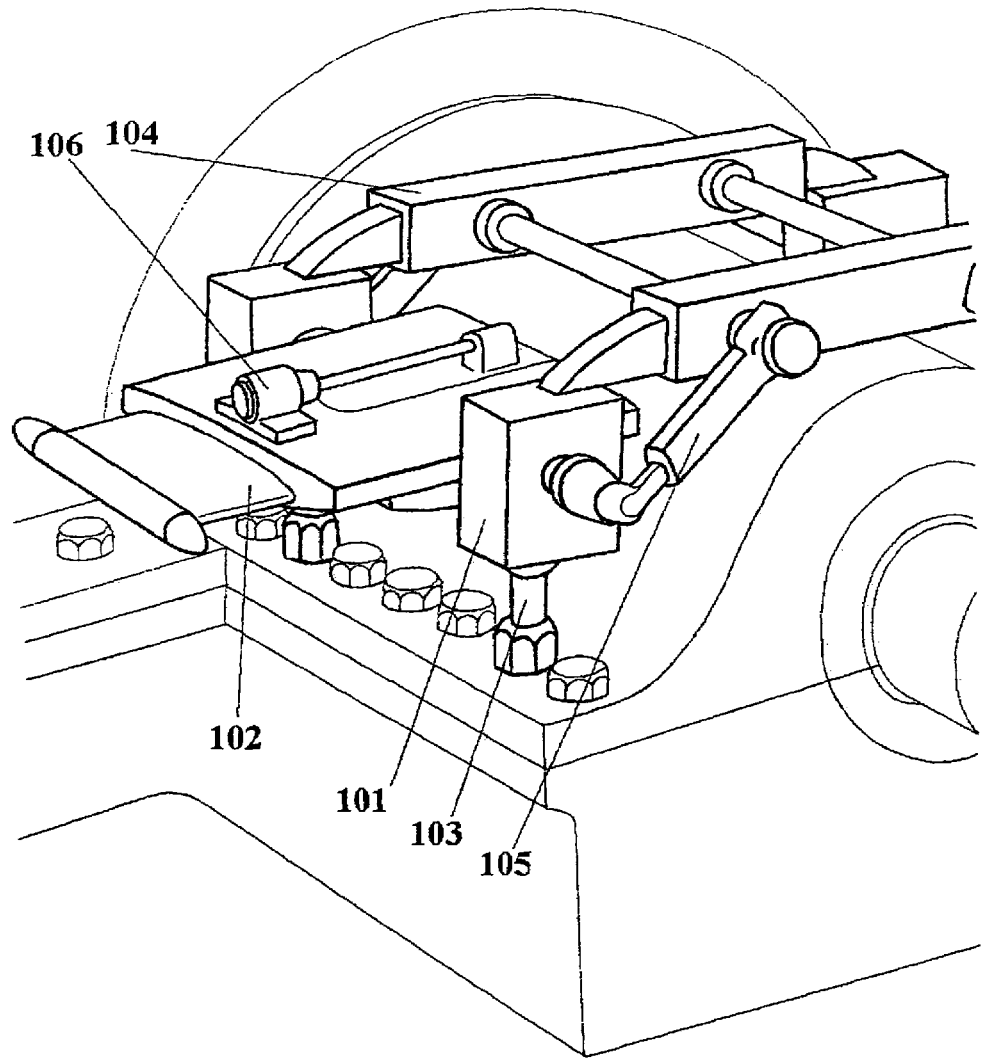
Fig. 7 The B-F-L-Ws for removal of beyond-normal vibrations in super-wide diapasons (variant).
See text in Specification.

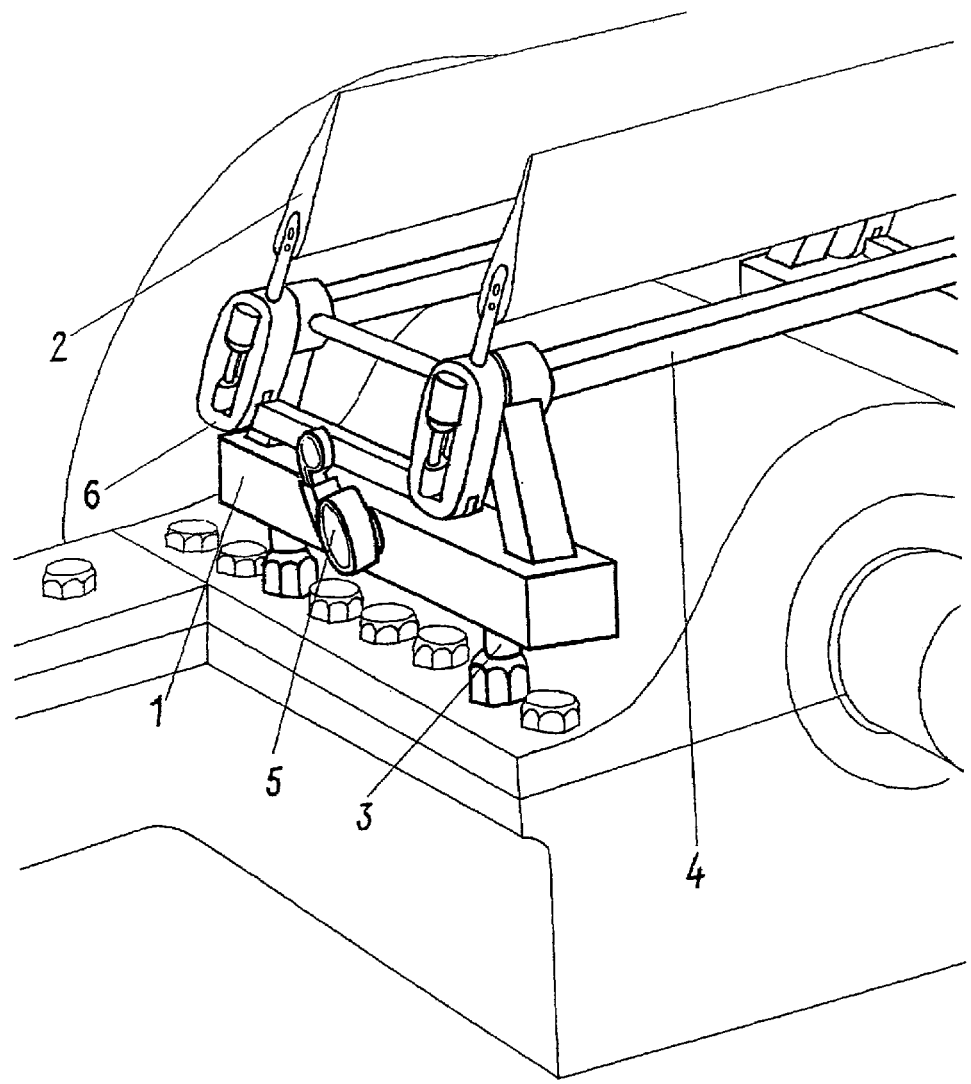
Fig. 8 The B-F-L-Ws for removal of beyond-normal vibrations in super-wide diapasons (variant).
Placement in direction perpendicularly to rotor axis of T-G-S.
See text in Specification.

Turbine Generator Vibration Damper System. Vladilen Safonov.
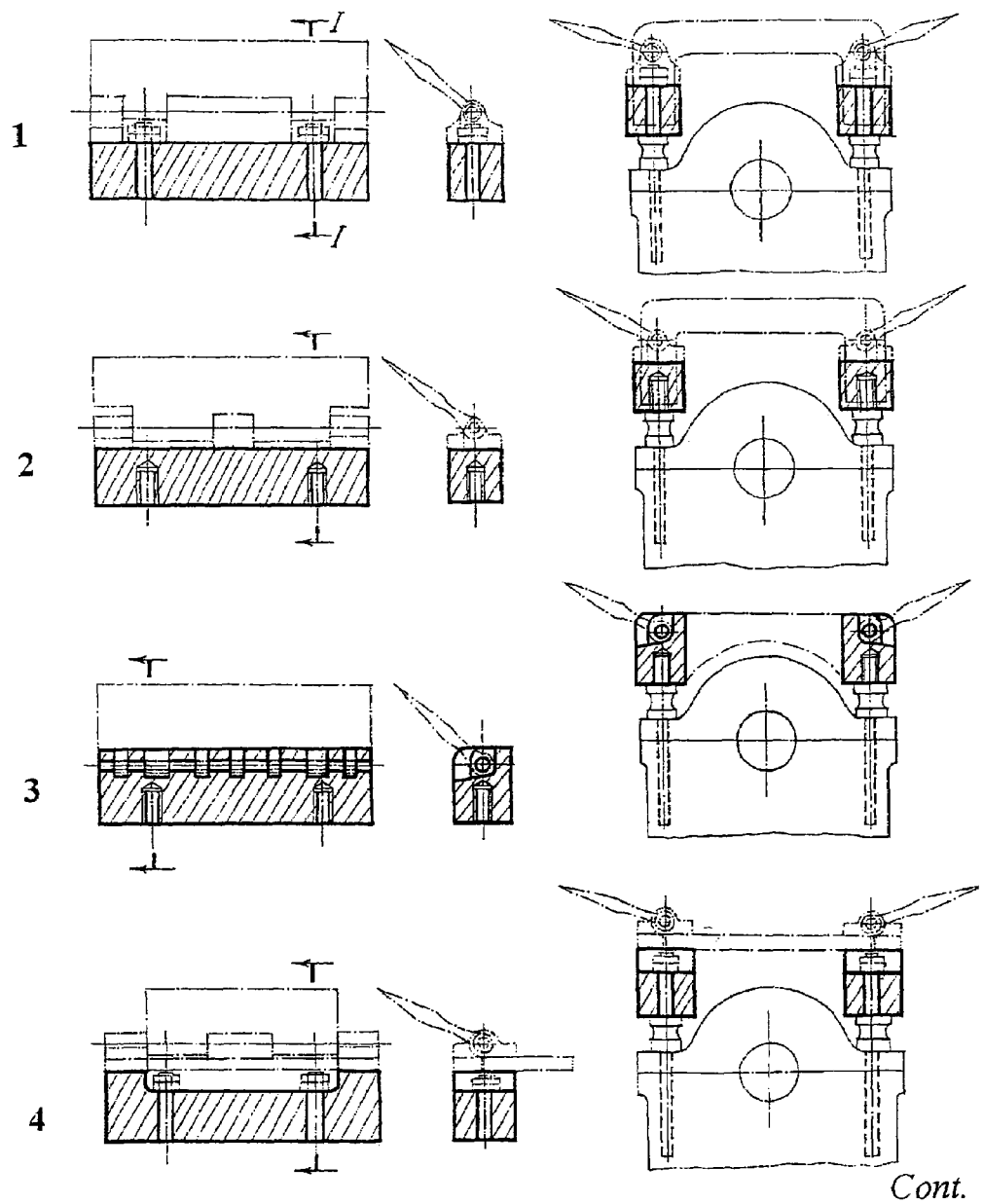
Fig. 9 Loads of the B-F-L-Ws (variants).
Various forms of the loads.

Turbine Generator Vibration Damper System. Vladilen Safonov.
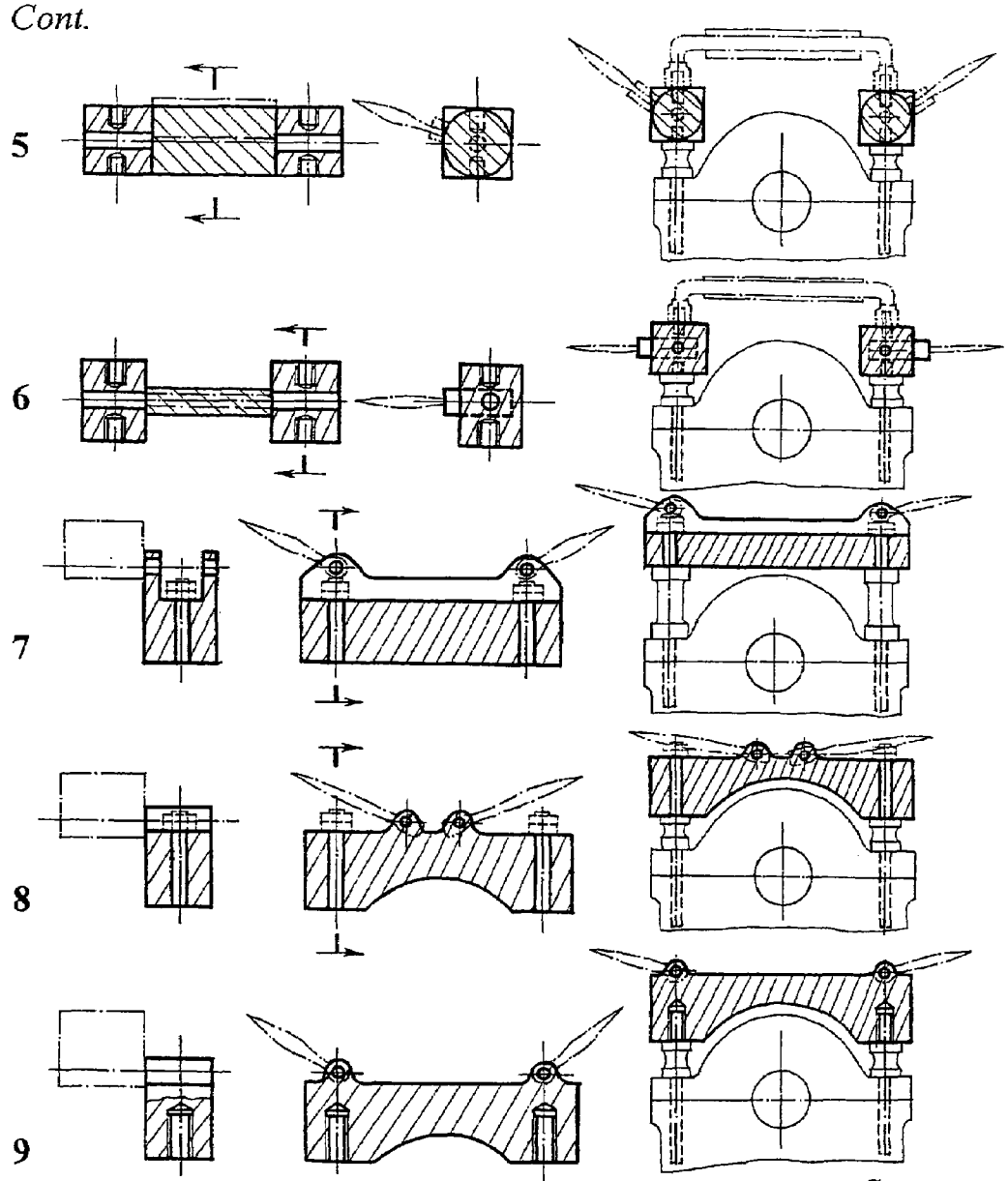
Fig. 9 *Continuation.* Loads of the B-F-L-Ws (variants).
Various forms of the loads.

Turbine Generator Vibration Damper System. Vladilen Safonov.
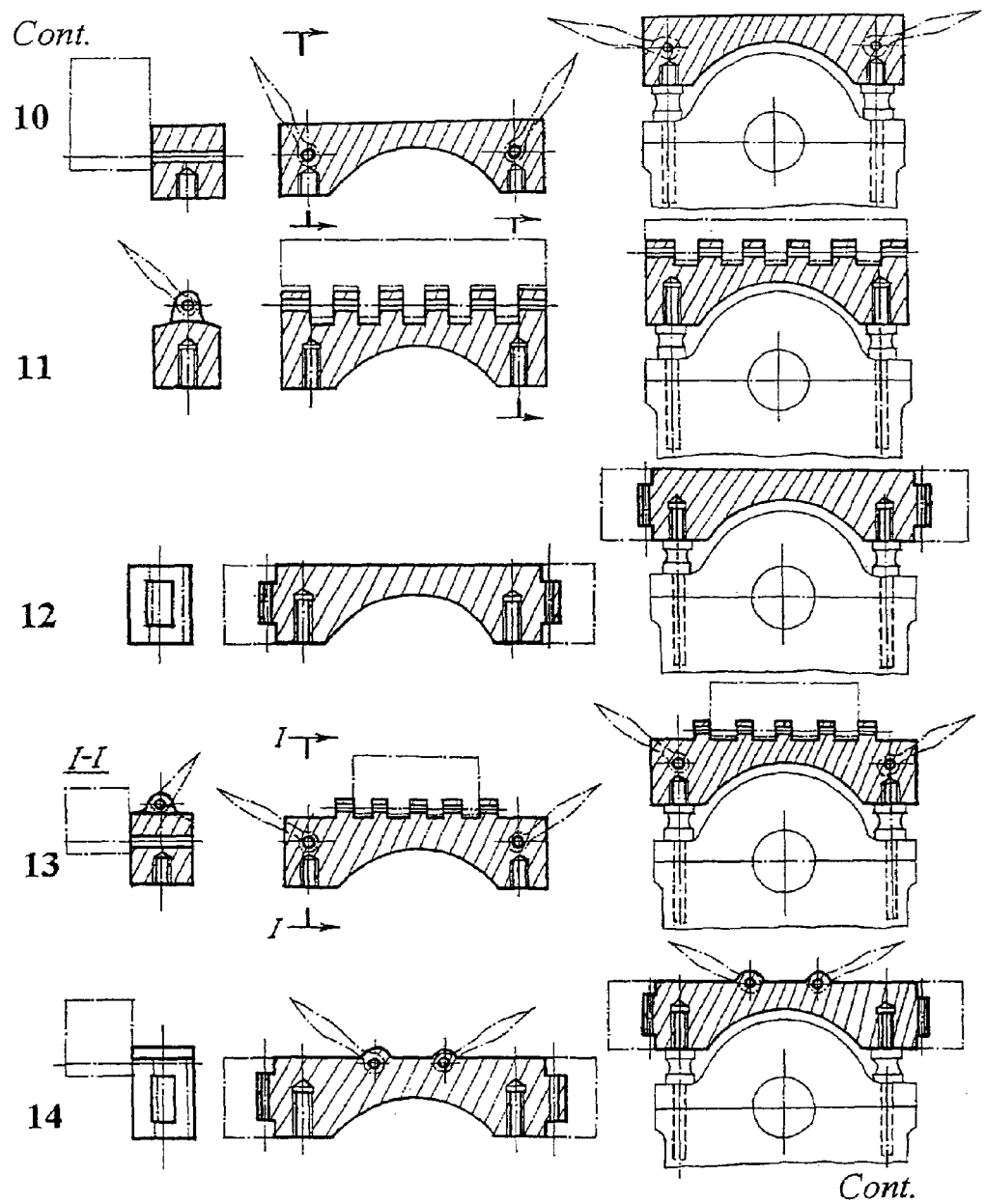
Fig. 9 *Continuation.* Loads of the B-F-L-Ws (variants).
Various forms of the loads.

Turbine Generator Vibration Damper System. Vladilen Safonov.

*Cont.*

15. The ways of forming the loads ( variants ).

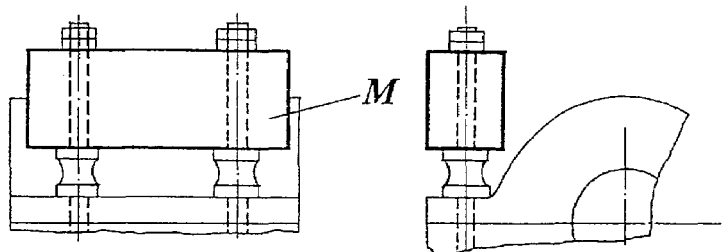

15a. The stated mass load manufactured by casting ( or pressing, shaping, etc. ).

$$M = M_1 + M_2 + M_3 + M_4 + M_5.$$

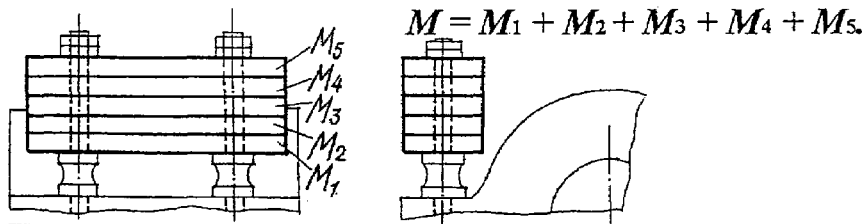

15b. The stated mass load collected from the weights.

$$M = M_0 + M_1 + M_2.$$

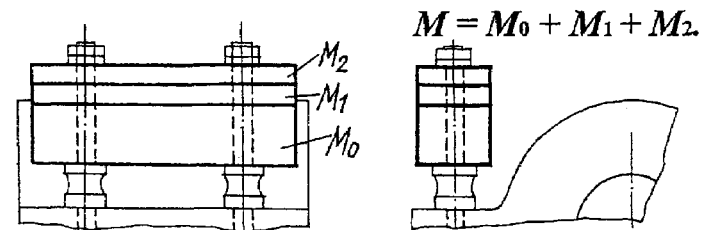

15c. The load collected from the basic load and the additional weights.

Fig. 9 *Continuation.* Loads of the B-F-L-Ws (variants).
The ways of forming the loads.

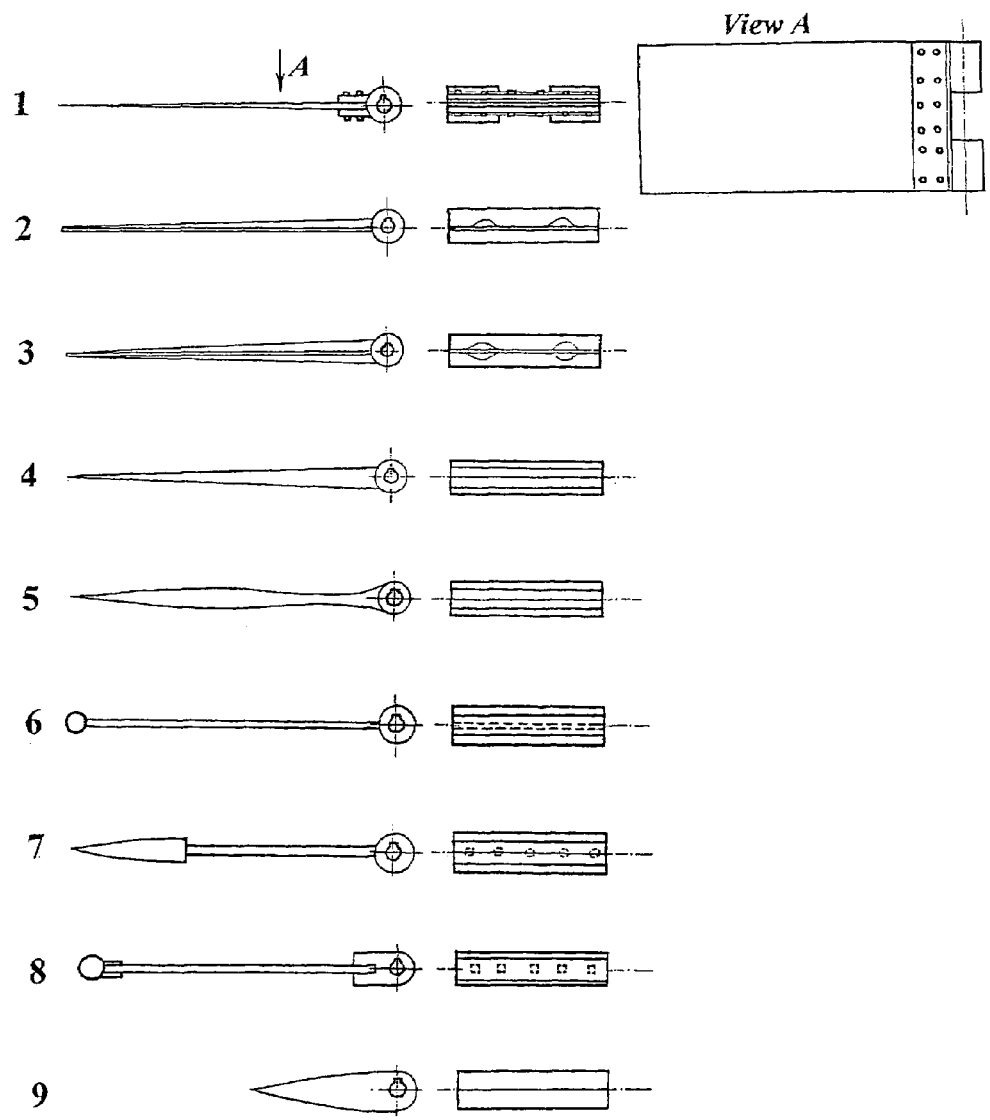
Fig. 10 Wings of the B-F-L-Ws (variants).
Various forms of the wings.

Turbine Generator Vibration Damper System. Vladilen Safonov.
*Cont.*
10 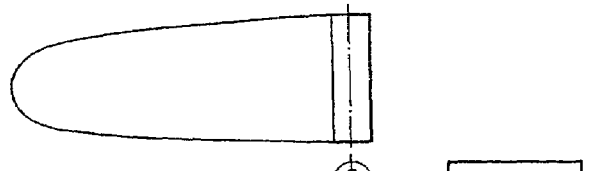
11 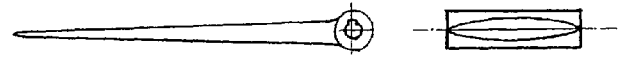
12 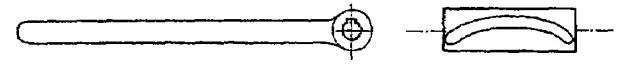
13 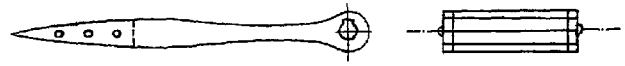
14 
15 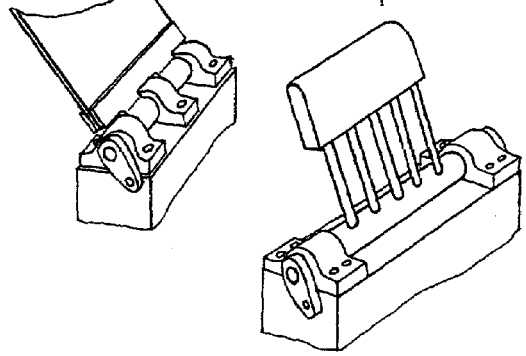
16 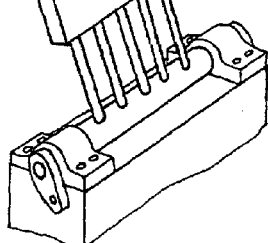
Fig. 10 *Continuation.* Wings of the B-F-L-Ws (variants).
Various forms of the wings.
See also: *Preferable fixations of wings fulcra (on)to the loads and the joint–units* [Fig. 17 (par. 4)], *Folding wings of the B-F-L-Ws* (Fig. 35).

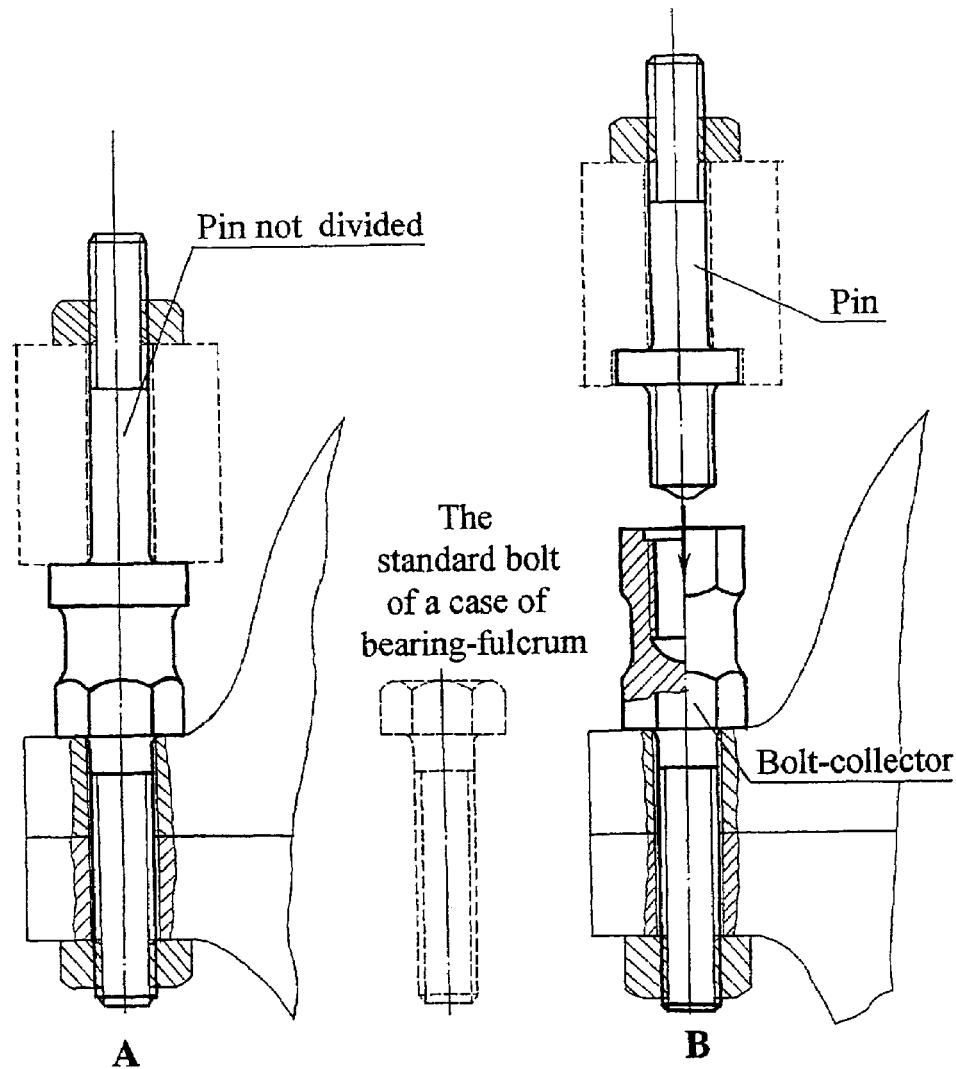
Fig. 11 Fixture units for fixing of loads of the B-F-L-Ws to a case of bearing-fulcrum (variants).

Turbine Generator Vibration Damper System. Vladilen Safonov.
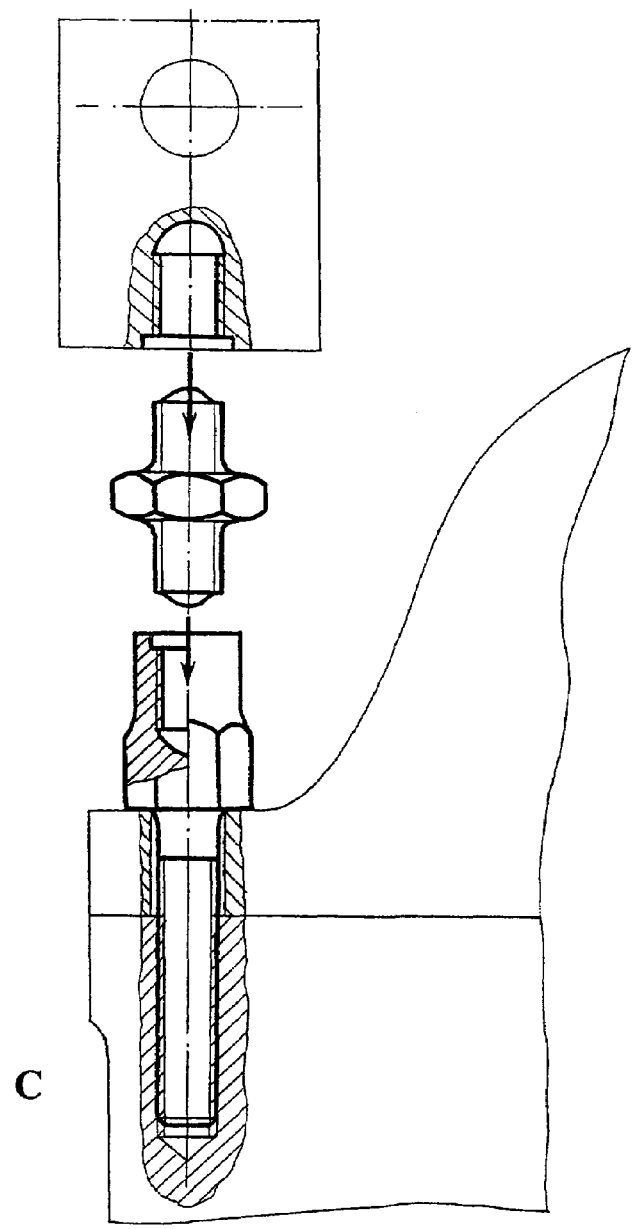
Fig. 11 *Continuation.* Fixture units for fixing loads of the B-F-L-Ws to a case of bearing-fulcrum (variant).

Turbine Generator Vibration Damper System. Vladilen Safonov.
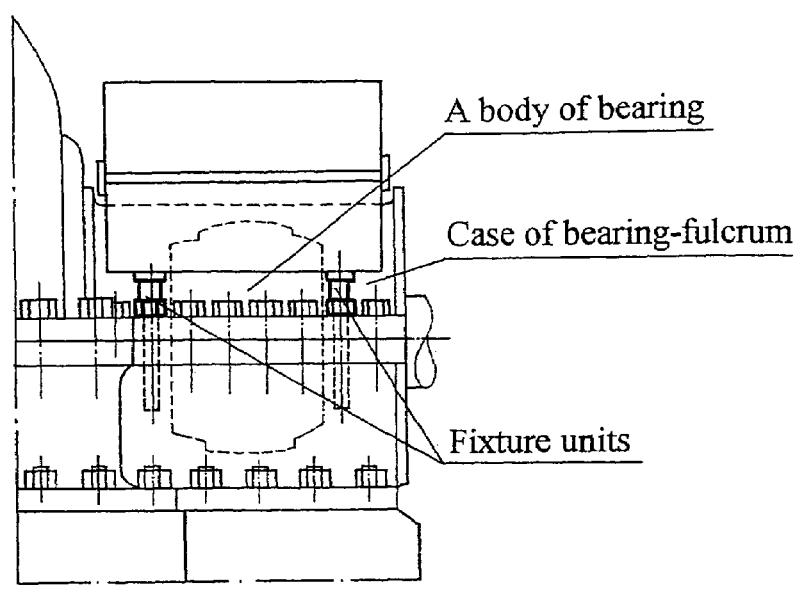
Fig. 12 Preferable setting of fixture units of the B-F-L-Ws.

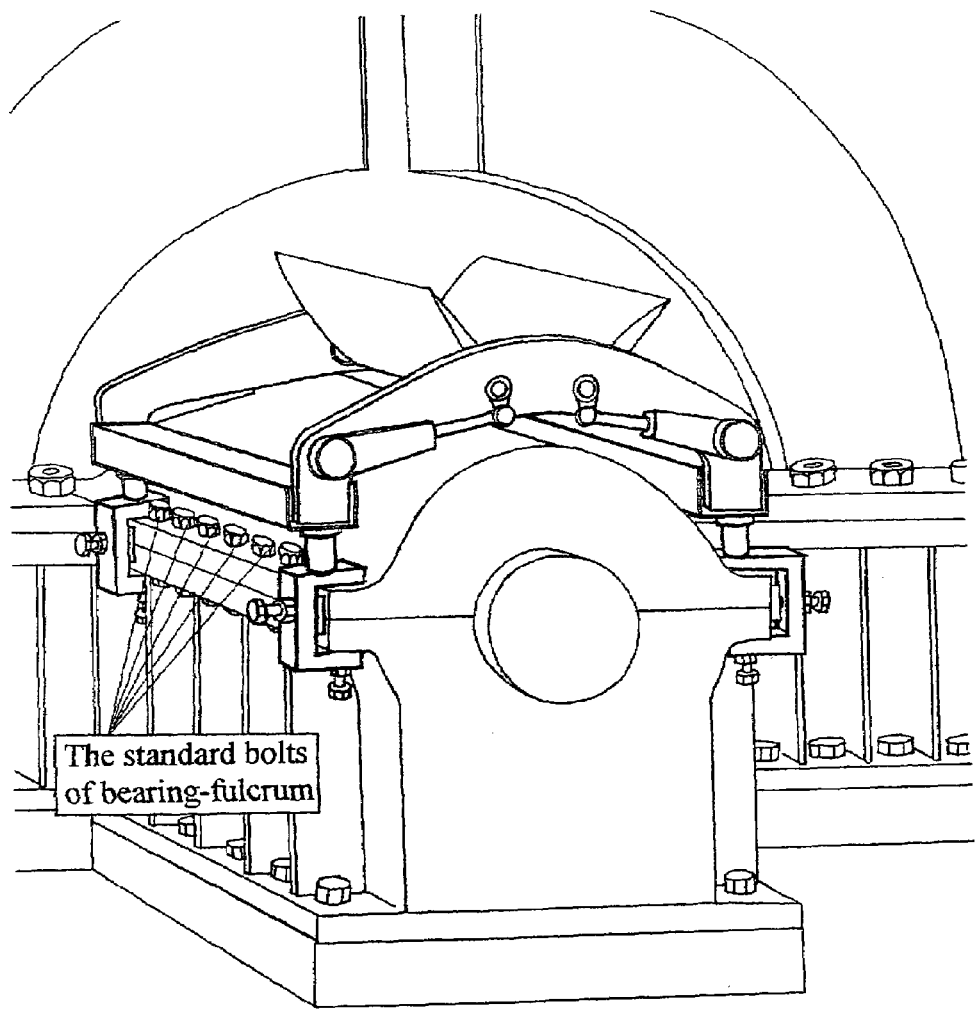
Fig. 13 Installation of the B-F-L-Ws with fixation which not requires replacement of the standard bolts of bearing--fulcrum (variant).

Turbine Generator Vibration Damper System. Vladilen Safonov.
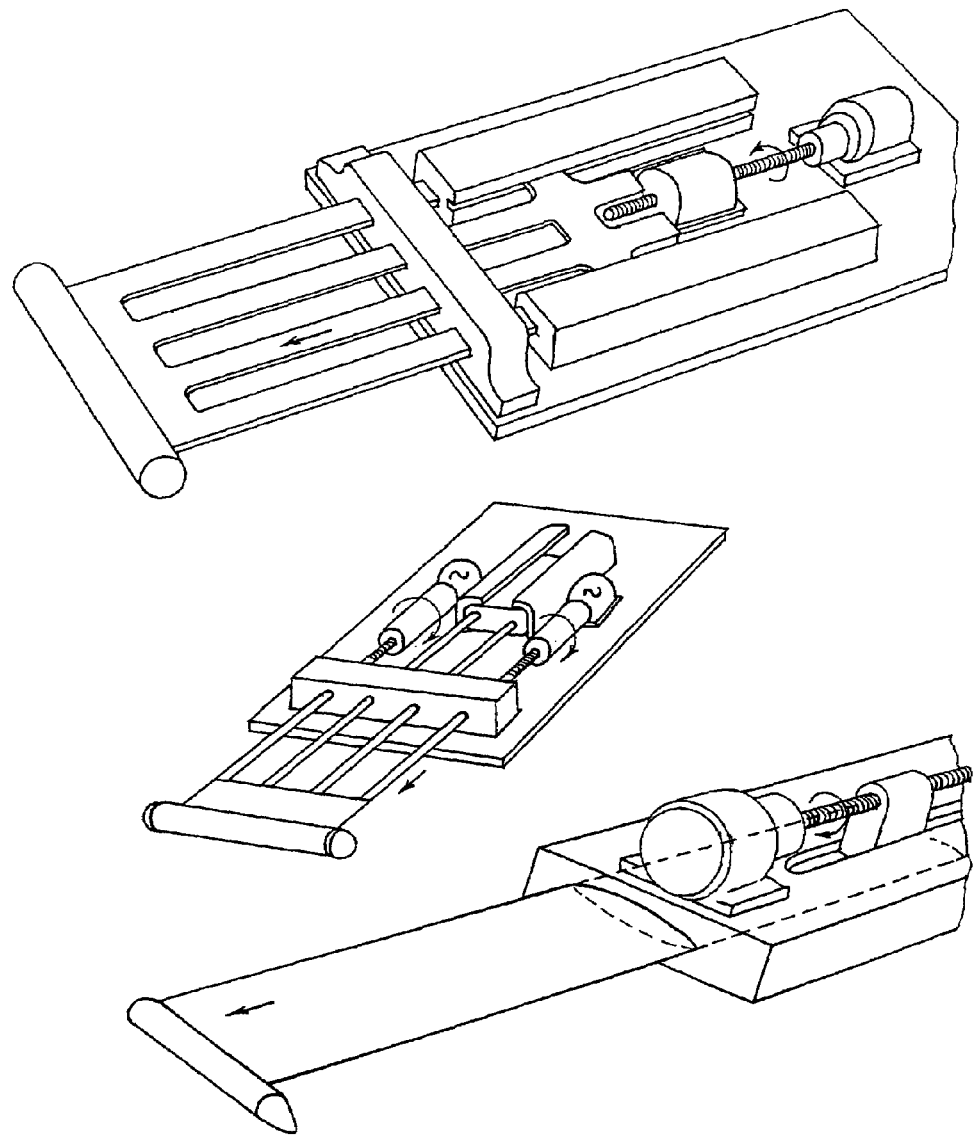
Fig. 14 Variants of units for changing the length of wings of the B-F-L-Ws.
See text in Specification.

Turbine Generator Vibration Damper System. Vladilen Safonov.

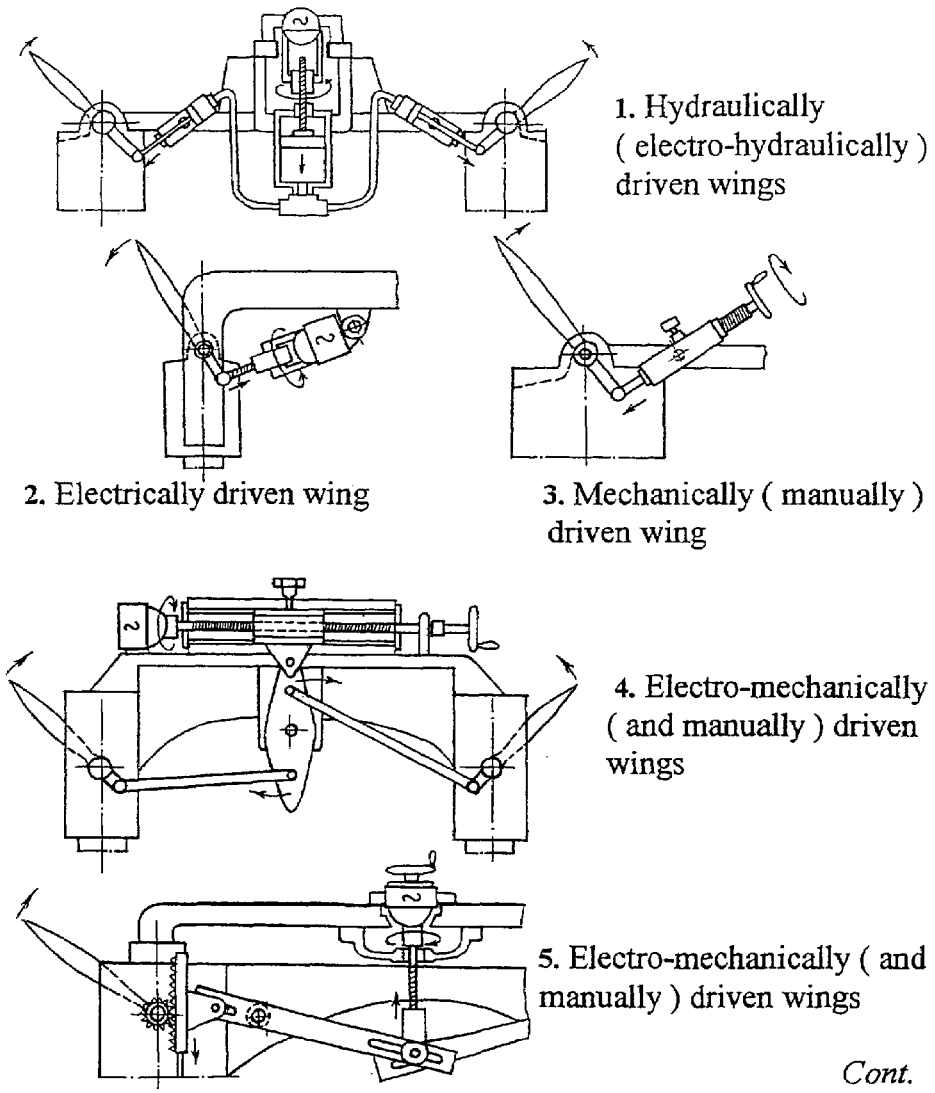

1. Hydraulically ( electro-hydraulically ) driven wings

2. Electrically driven wing

3. Mechanically ( manually ) driven wing

4. Electro-mechanically ( and manually ) driven wings

5. Electro-mechanically ( and manually ) driven wings

Cont.

Fig. 15 Various types of drivers (shown schematically) of units for turning wings of the B-F-L-Ws.
See text in Specification.

Turbine Generator Vibration Damper System. Vladilen Safonov.
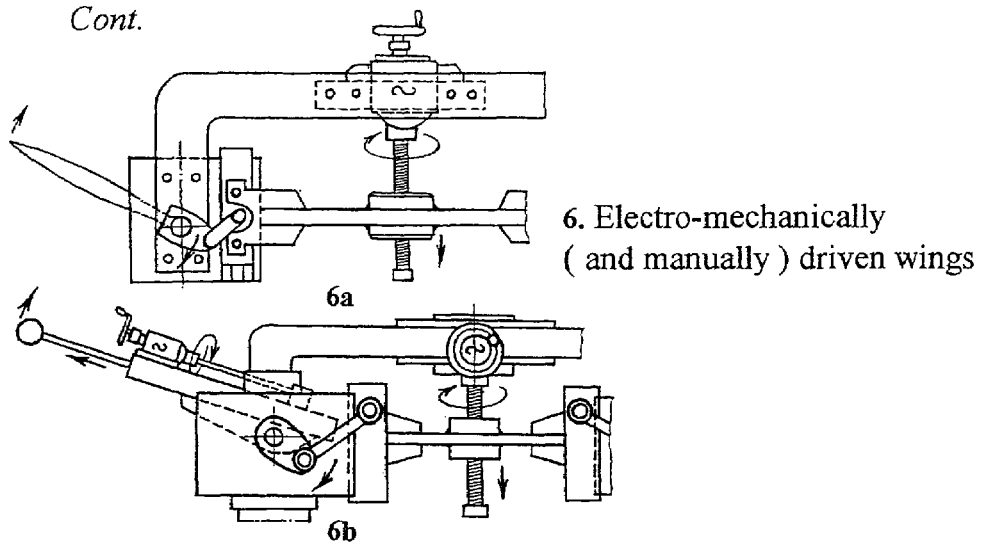
6. Electro-mechanically ( and manually ) driven wings
6a
6b
Fig. 15 *Continuation.* Various types of drivers (shown schematically) of units for turning wings of the B-F-L-Ws. See text in Specification.

Turbine Generator Vibration Damper System.  Vladilen Safonov.
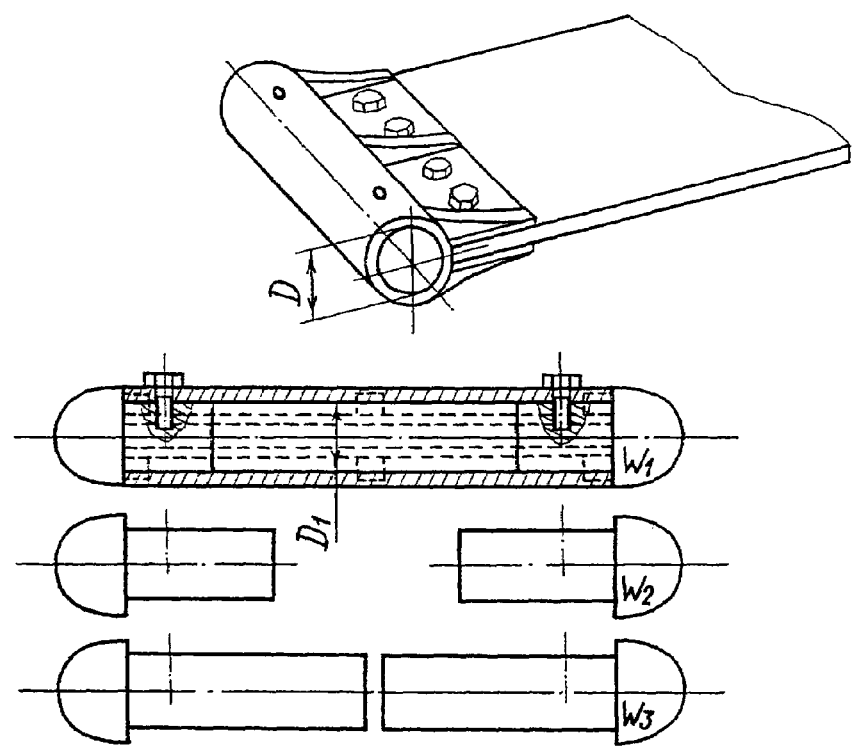
Fig. 16  A change of mass of wing of the B-F-L-Ws
by attached weights (variant).
A change may be done by attached pairs of weights of various length
and diameter $D_1$, $D_2$, ..., etc.

Turbine Generator Vibration Damper System. Vladilen Safonov.
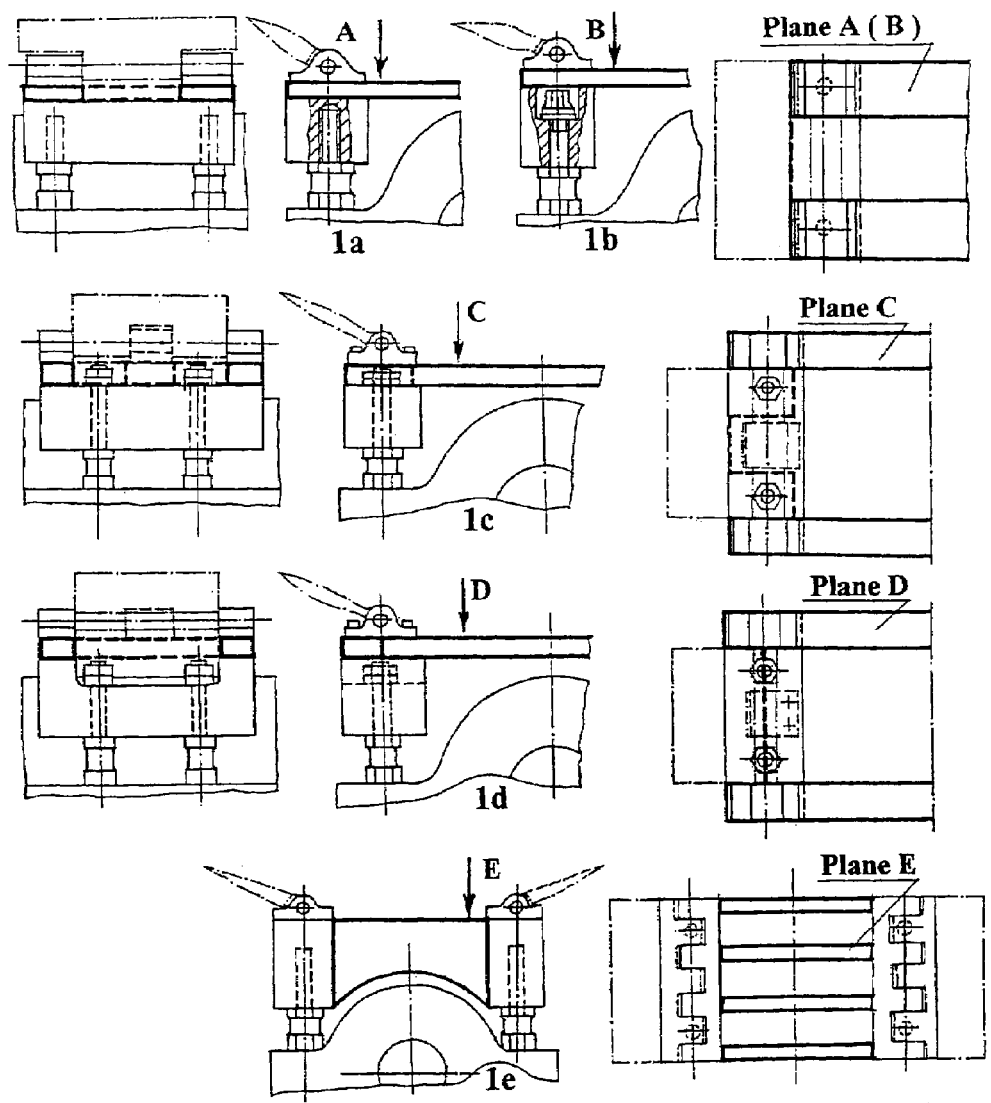
1. The two loads are firmly joined together by the connecting plate(s) [ or bars, ribs, etc. ].
Cont.
Fig. 17  Joint-units of the B-F-L-Ws (variants).

Turbine Generator Vibration Damper System. Vladilen Safonov.
*Cont.*
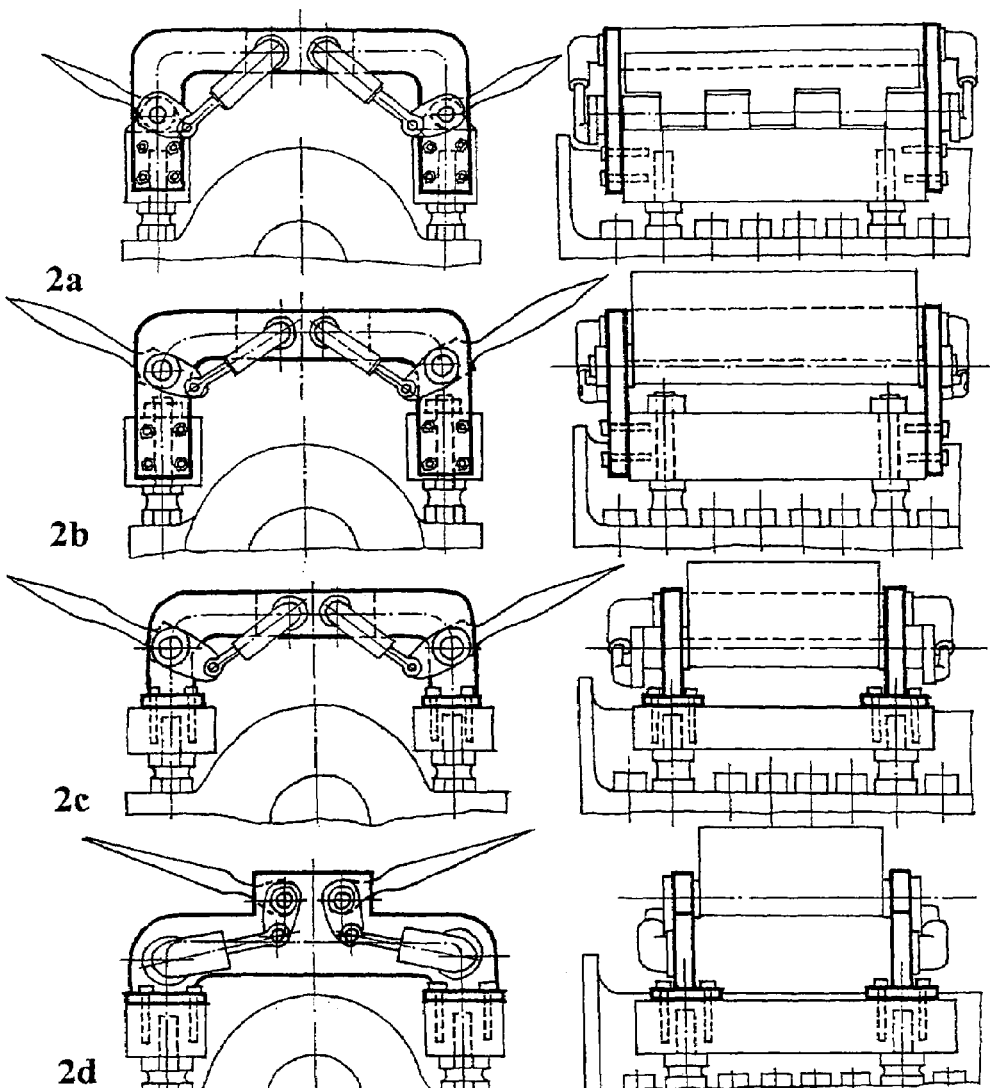
2. The two loads are firmly joined together by the connecting arch-
-shaped units. ( For variants 2b, 2c, 2d wings fulcra are fixed onto
the joint-unit ).
*Cont.*
Fig. 17 *Continuation.* Joint-units of the B-F-L-Ws (variants).

Turbine Generator Vibration Damper System. Vladilen Safonov.

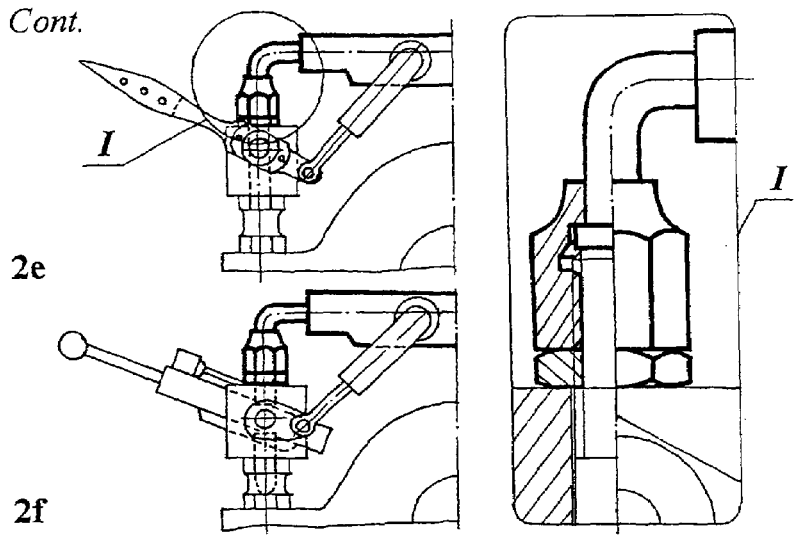

2e
2f

2. The two loads are firmly joined together by the connecting arch--shaped ( pipe ) units.

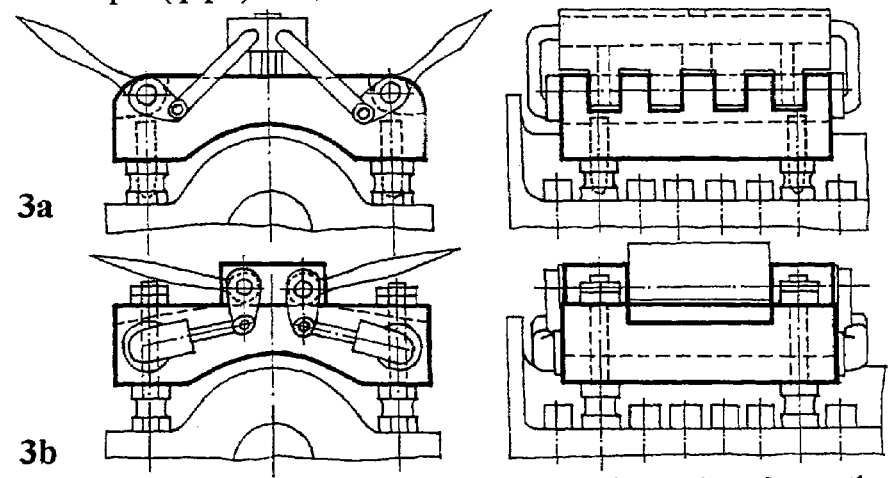

3a
3b

3. The two loads are manufactured as the whole one ( e.g. by casting, pressing, shaping, etc. ) with the arch jointing. [ For variant 3b wings fulcra are fixed onto the joint-unit ].

Cont.

Fig. 17 *Continuation.* Joint-units of the B-F-L-Ws (variants).

Turbine Generator Vibration Damper System. Vladilen Safonov.

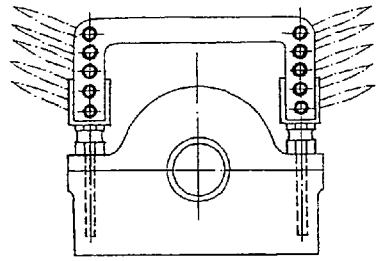

4a. The most preferable variants of fixation of wings fulcra (on)to the loads and the joint-units.

4b. Fixation with the eccentricity $a$ ( external ).

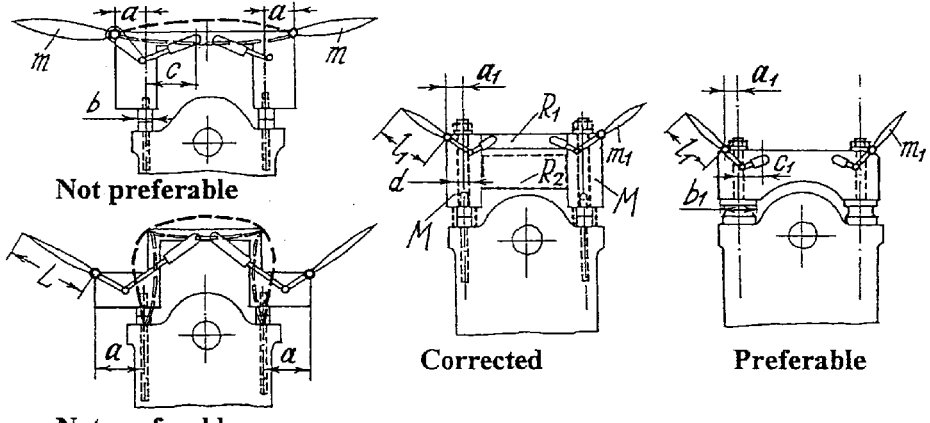

Not preferable

Not preferable

Corrected

Preferable

The recommendations to prefer the fixing of the wings fulcra:

1) $a \rightarrow a_1 = a_{min}$.
2) $b_1 > b$.
3) $a_1 < 1/2\ b_1$.
4) $l_1 < L$, ( $m_1 < m$ ); $c_1 < c$.
5) The system [ formed out of the loads $M$, the fixture units $d$, the joint-units $R_1$, $R_2$ ] is so rigid that it may also successfully resist the additional momentum originated from the eccentricity $a_1$.

4. Some recommendations for preferable fixing of wings fulcra (on)to the loads and the joint-units.

Cont.

Fig. 17 *Continuation.* Joint-units of the B-F-L-Ws (variants).

Turbine Generator Vibration Damper System. Vladilen Safonov.

*Cont.*
4c. Fixation with the eccentricity $e$ ( internal ).

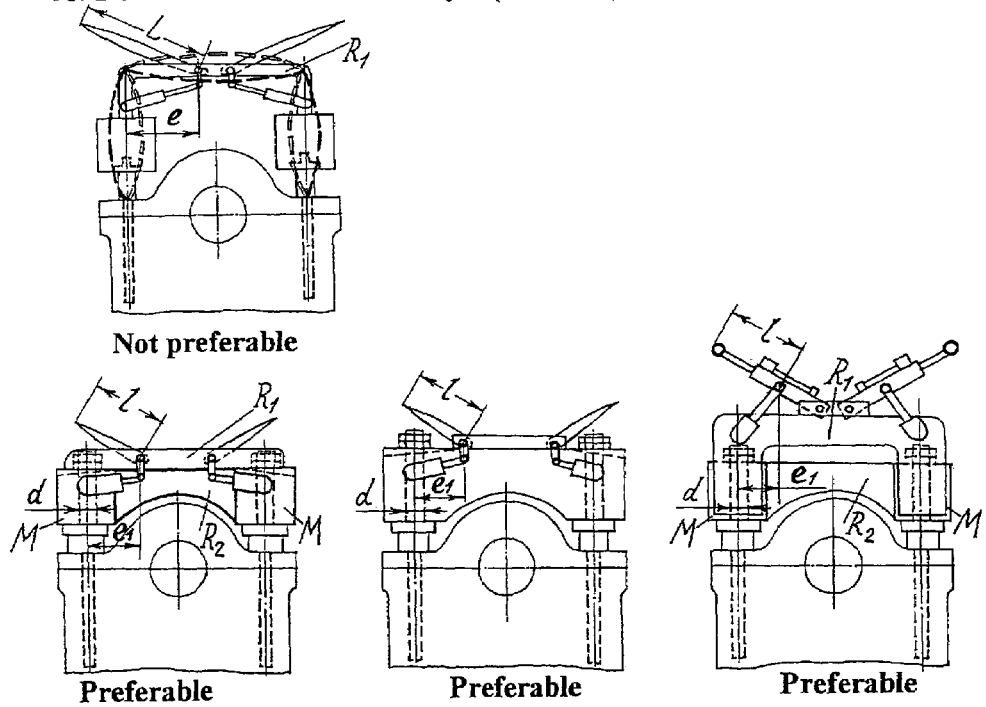

The recommendations to prefer the fixing of the wings fulcra:
1) $e$, $e_1 \rightarrow e_{min}$.
2) $l < L$ ( e.g. work within limited space for spreading the wings ).
3) The system [ formed out of the loads $M$, the fixture units $d$, the joint-units $R_1$, $R_2$ ] is so rigid that it may also successfully resist the additional momentum originated from eccentricity $e_1$.

4. Some recommendations for preferable fixing of wings fulcra (on)to the loads and the joint-units.

Fig. 17 *Continuation.* Joint-units of the B-F-L-Ws (variants).

Turbine Generator Vibration Damper System. Vladilen Safonov.
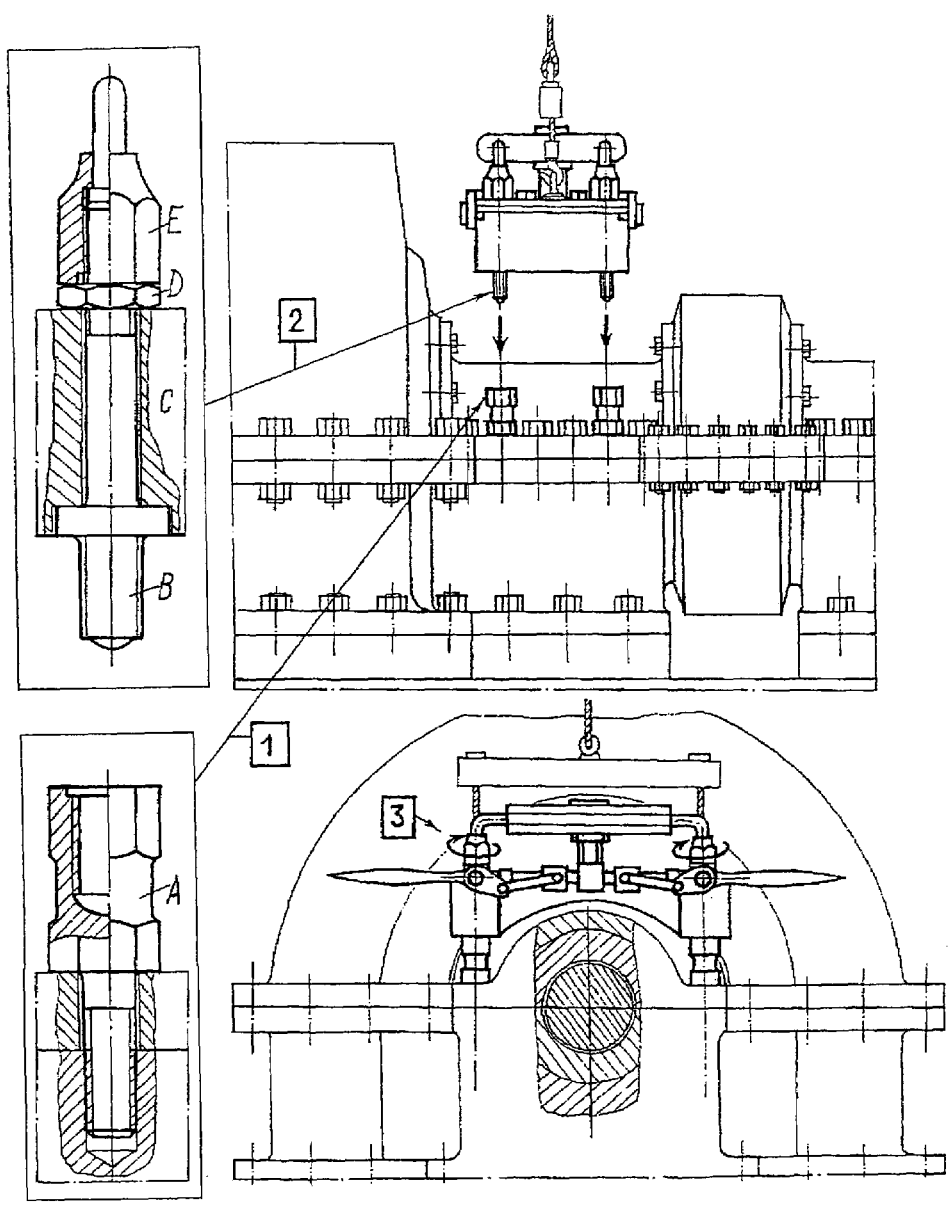
Fig.18 Operations (in number and sequence) to install the B-F-L-Ws [variant]. See text in Specification.

Turbine Generator Vibration Damper System. Vladilen Safonov.
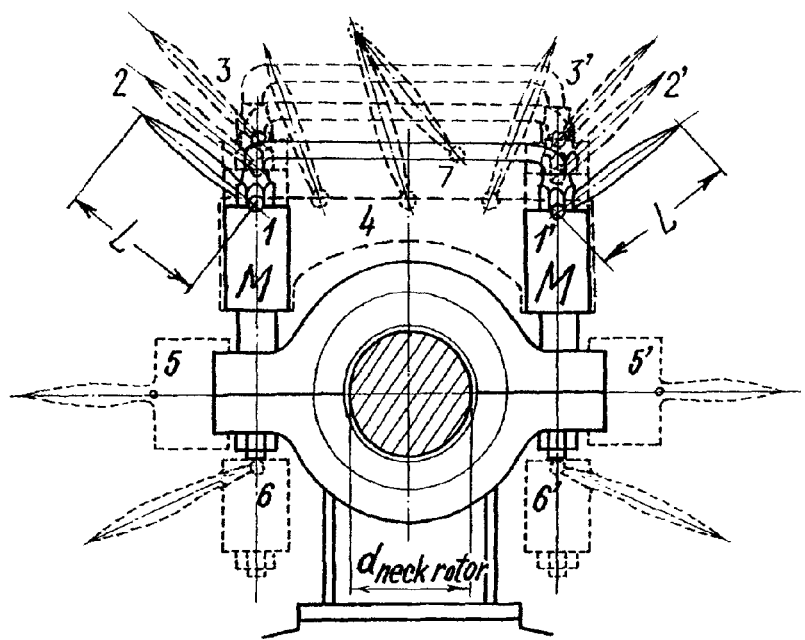
Fig.19 Placement of the B-F-L-Ws around bearing-fulcrum at T-G-S in direction parallelly to rotor axis.
See text in Specification.

Turbine Generator Vibration Damper System. Vladilen Safonov.

*Cont.*

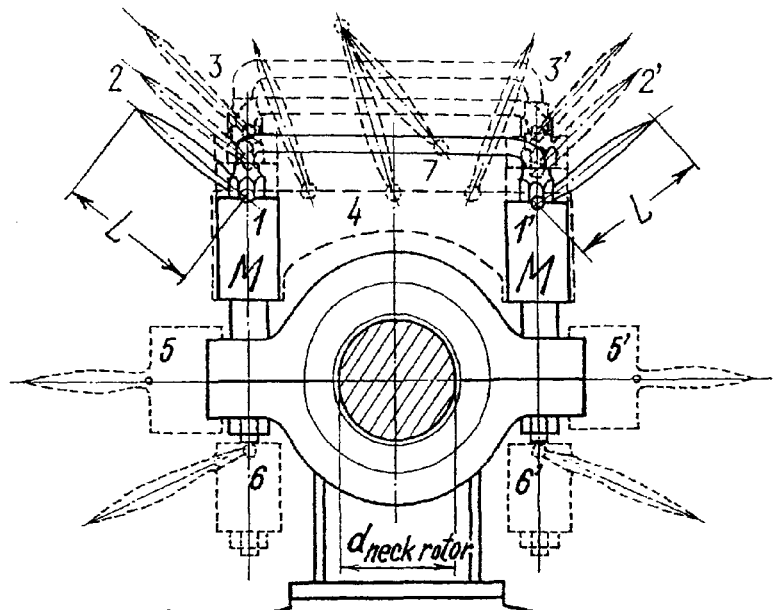

*Continuation.*

Fig.19 Placement of the B-F-L-Ws around bearing-fulcrum at T-G-S in direction parallelly to rotor axis.

Placement:

(1 & 1') - the most adequate and practically possible variant.

(2 & 2'), (3 & 3') - additional (and limited) variants.

(1 & 1') + (6 & 6') – adequate, but practically not always possible variant.

(4) – most adequate variant.

(5 & 5') - adequate, but practically not always possible variant.

(6 & 6') - adequate, but practically not always possible; not preferable variant as not increasing the weight of an upper cover of bearing-fulcrum. Loads may be used with wings, or without wings (as additional variant).

(7) - adequate, but practically not always possible variant.
Here the wing is shown folding (and changeable in length, width and weight).

Turbine Generator Vibration Damper System. Vladilen Safonov.
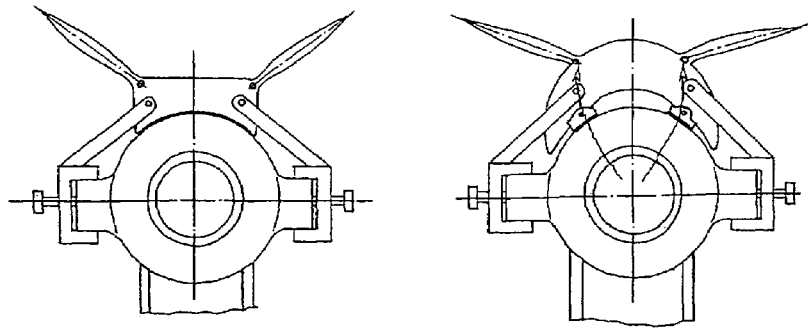
1) Incorrect placements.
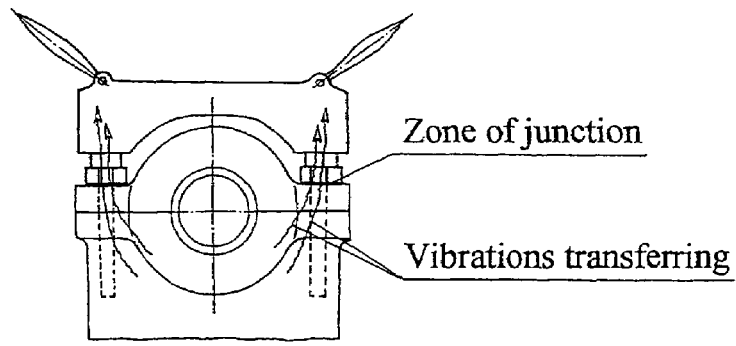
2) Correct placement.
Fig. 20 Correct and incorrect placements of the B-F-L-Ws at bearing-fulcrum /if to follow the instructions of the B-F-L-Ws method/.
See text in Specification.

Turbine Generator Vibration Damper System. Vladilen Safonov.
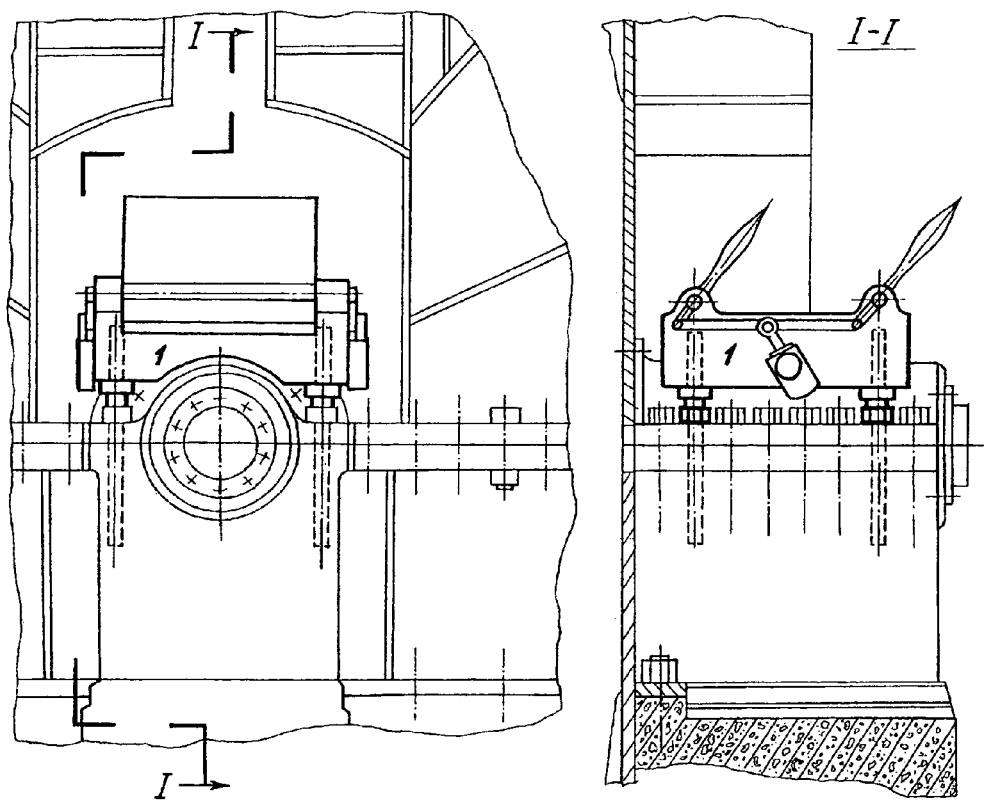
An axial stress bearing-fulcrum
*Cont.*
Fig. 21 Placement of the B-F-L-Ws upon bearing--fulcrum at T-G-S in direction perpendicularly to rotor axis.

Turbine Generator Vibration Damper System. Vladilen Safonov.
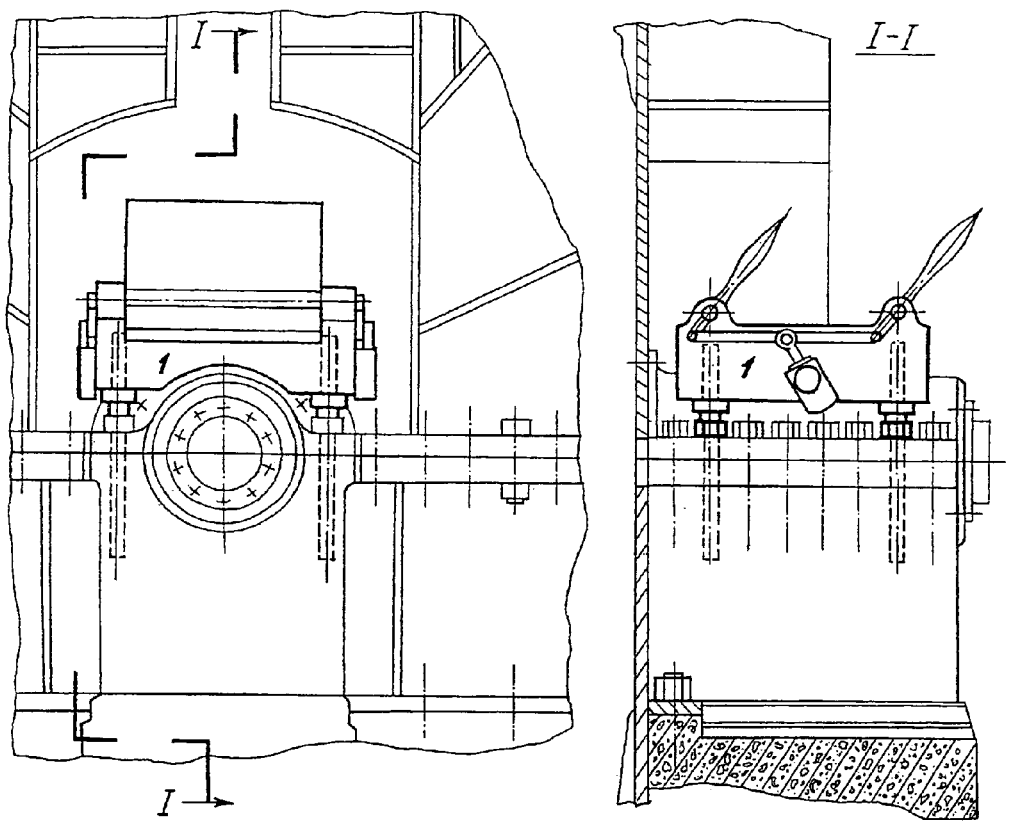
An axial stress bearing-fulcrum
*Cont.*
Continuation.
Fig. 21 Placement of the B-F-L-Ws upon bearing-
-fulcrum at T-G-S in direction perpendicularly to rotor
axis.
   Placement:
   1 - the most adequate and practically possible variant.

Turbine Generator Vibration Damper System. Vladilen Safonov.
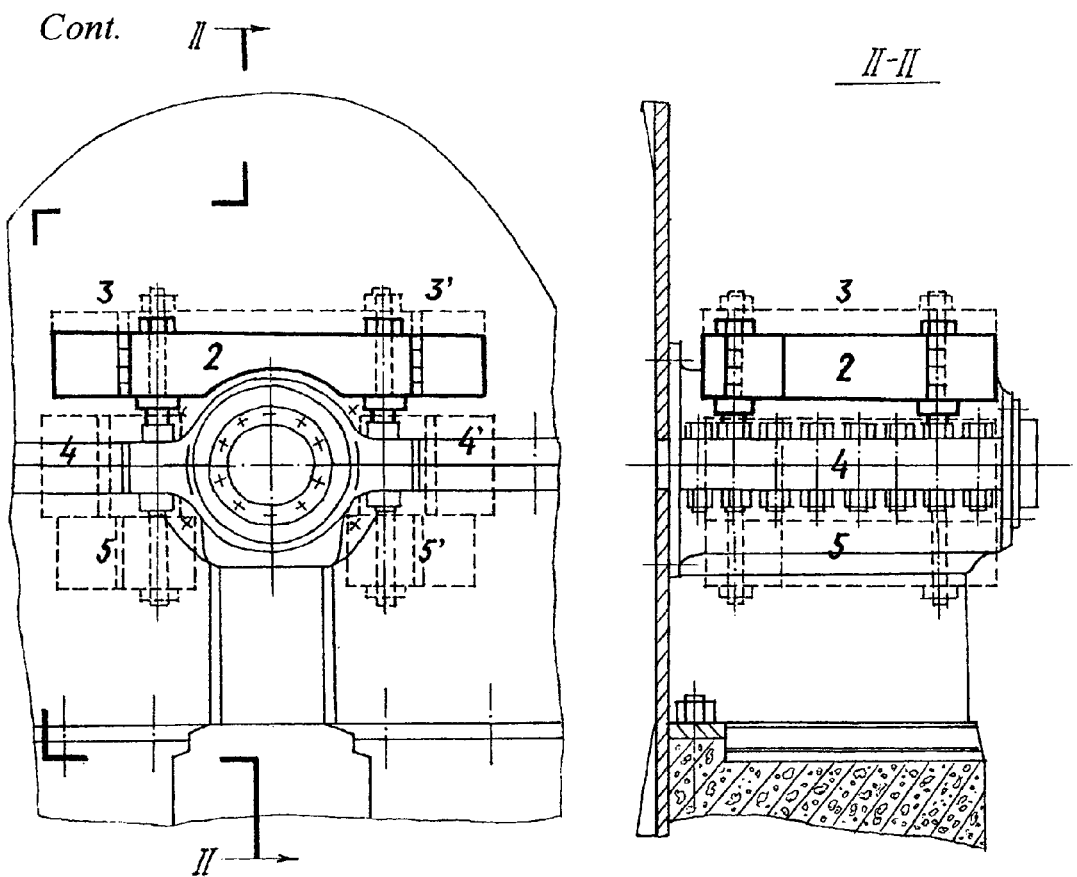
Fig. 21 *Continuation.* Placements of the B-F-L-Ws around bearing-fulcrum at T-G-S in direction perpendicularly to rotor axis.
See text in Specification.

Turbine Generator Vibration Damper System. Vladilen Safonov.

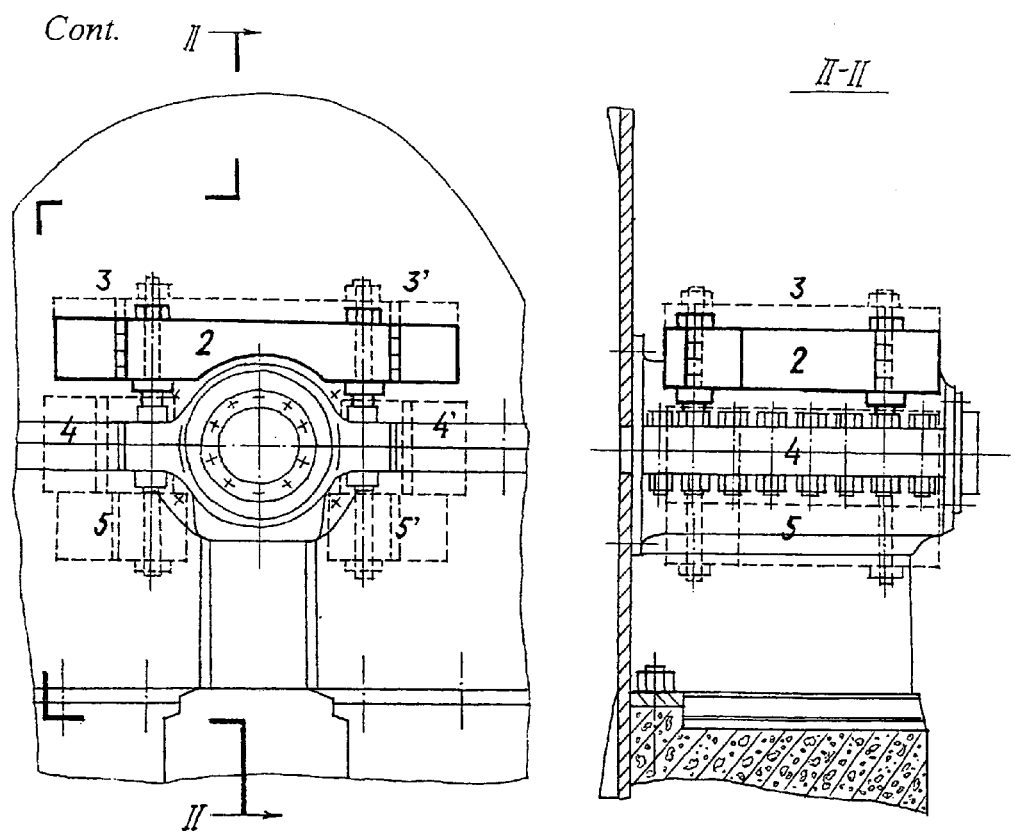

Fig. 21 *Continuation.* Placements of the B-F-L-Ws around bearing-fulcrum at T-G-S in direction perpendicularly to rotor axis.

Placements:
2 - most adequate variant.
(3 & 3') - additional variants [for loading].
(4 & 4') - adequate, but practically not always possible variant.
(5 & 5') - adequate, but practically not always possible variant.

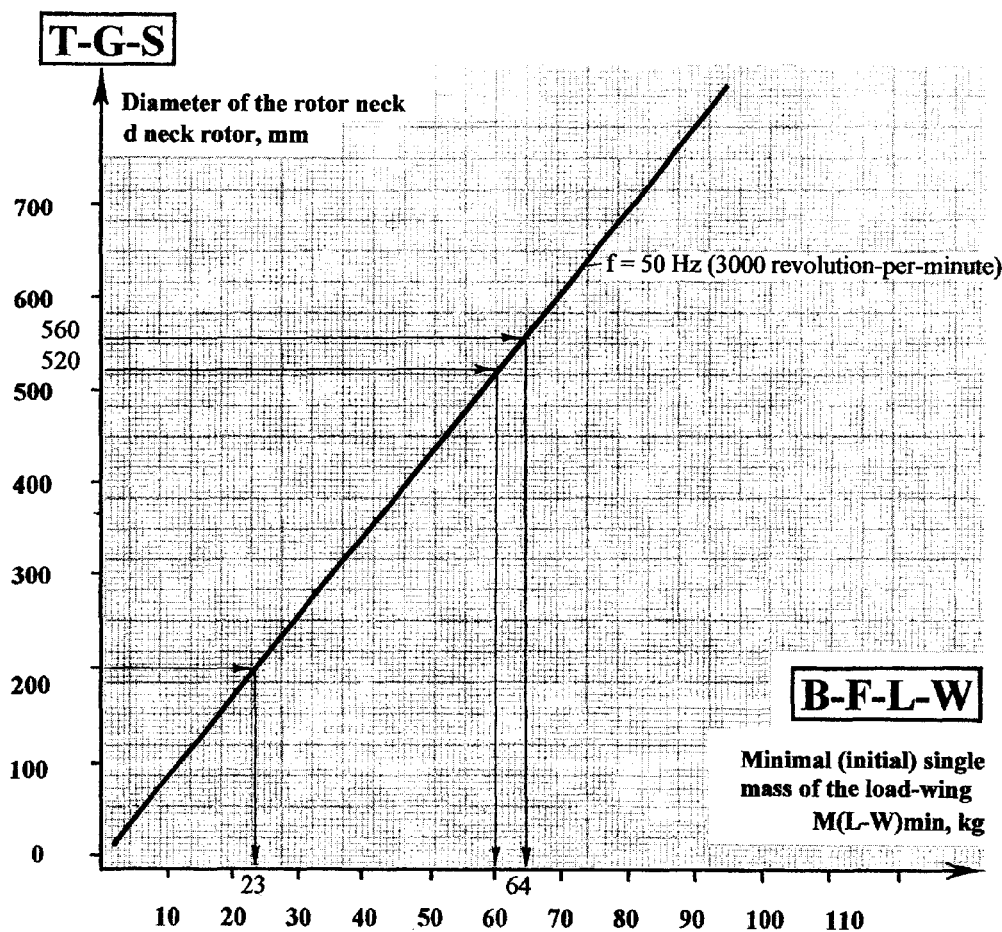
Fig. 22 The graph for determination of initial single mass of the load-wing $M_{(L-W)}$min of B-F-L-W as function of diameter of the rotor neck $d_{neck\ rotor}$ of T-G-S [by Vladilen Safonov].
See text in Specification.

Turbine Generator Vibration Damper System. Vladilen Safonov.

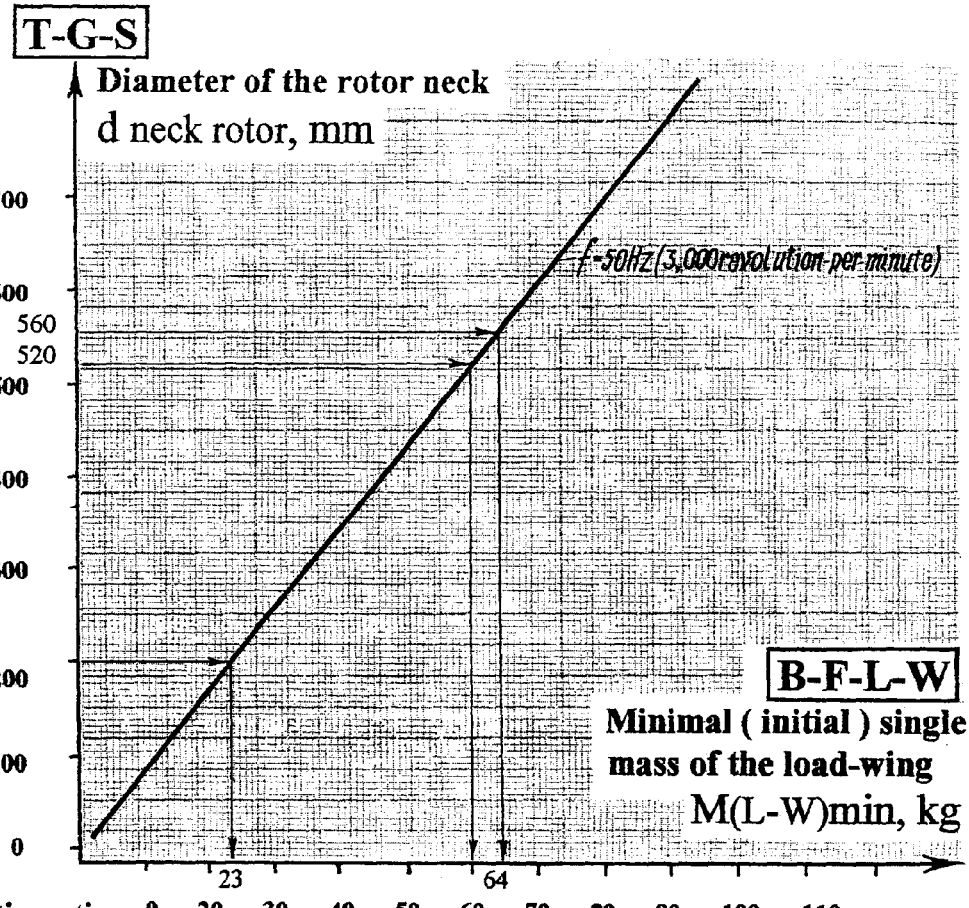

Fig.22 The graph for determination of initial single mass of the load-wing $M_{(L-W)}min$ of B-F-L-W as function of diameter of the rotor neck $d_{neck\ rotor}$ of T-G-S [by Vladilen Safonov].
(See text in Specification).
The graph may be used for determination of minimal /initial/ single mass of the load-wing: for example, for T-G-S with designed operating frequency $f = 50$ Hz (3000 revolutions-per-minute), for $d_{neck\ rotor} = 560$ mm -- $M_{(L-W)}min = 64$ kg; for $d_{neck\ rotor} = 520$ mm -- $M_{(L-W)}min = 60$ kg; for $d_{neck\ rotor} = 200$ mm -- $M_{(L-W)}min = 23$ kg.

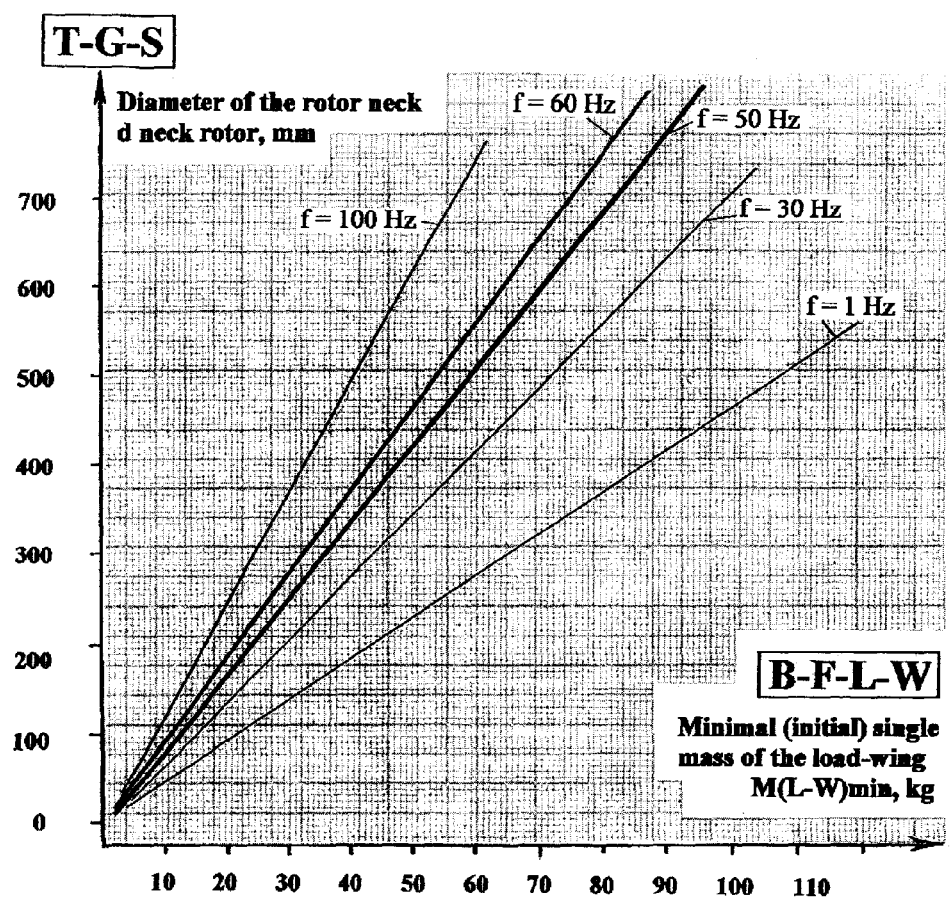
Fig. 23 The graphs for determination of initial single mass of the load-wing as function of diameter of the rotor neck, for various values of designed operating frequency of T-G-Ss [by Vladilen Safonov]. See text in Specification.

Turbine Generator Vibration Damper System. Vladilen Safonov.
Cont.
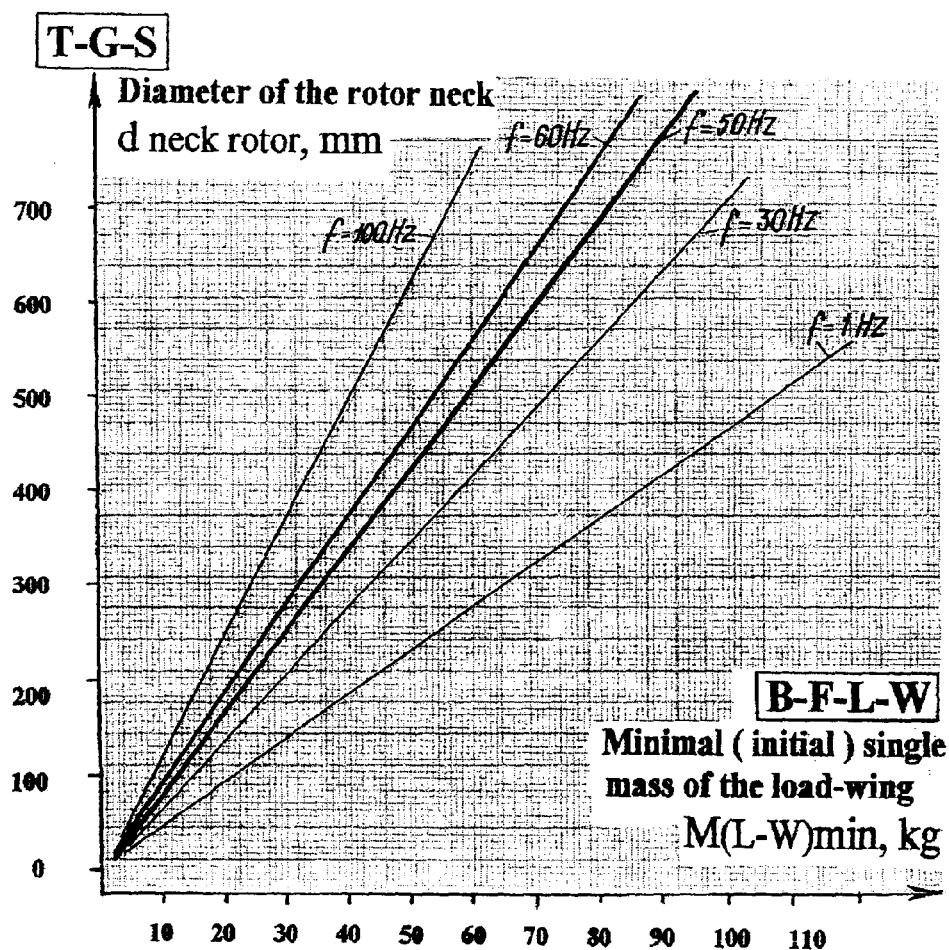
Continuation.
Fig. 23 The graphs for determination of initial single mass of the load-wing $M_{(L-W)}$min as function of diameter of the rotor neck $d_{neck\ rotor}$, for various values of designed operating frequency f of T-G-Ss [by Vladilen Safonov].
(See text in Specification).

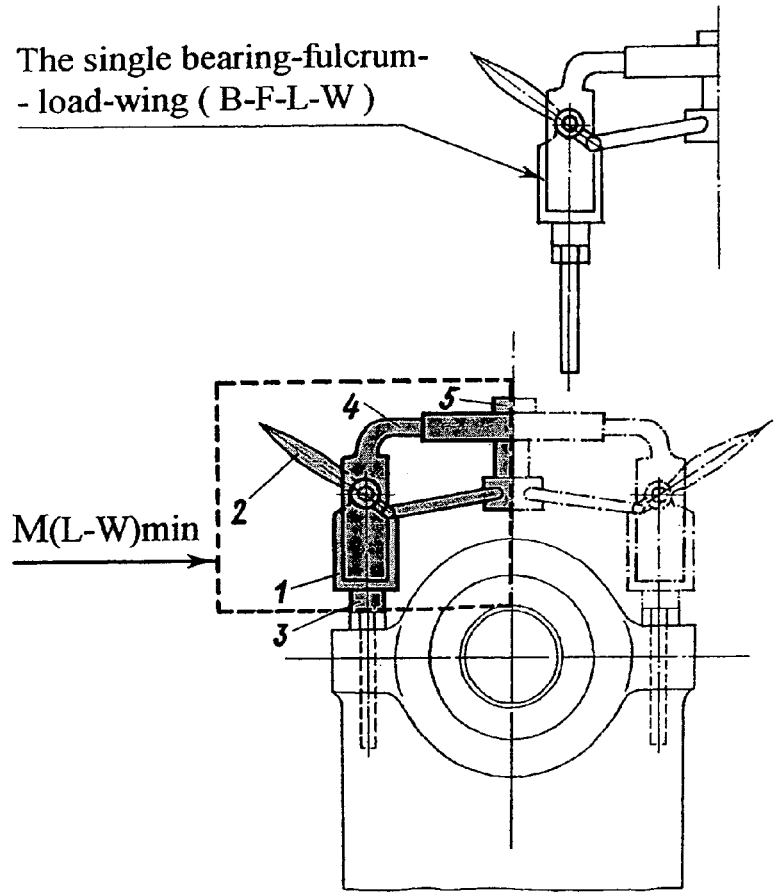
Fig. 24 Distribution of the minimal /initial/ single mass of the load-wing M(L-W)min among all elements and mechanisms, forming the single bearing-fulcrum-load-wing (B-F-L-W). Removal of vibrations in wide diapasons.
Cont.

Turbine Generator Vibration Damper System. Vladilen Safonov.

*Cont.*

The single bearing-fulcrum-
- load-wing ( B-F-L-W )

M(L-W)min

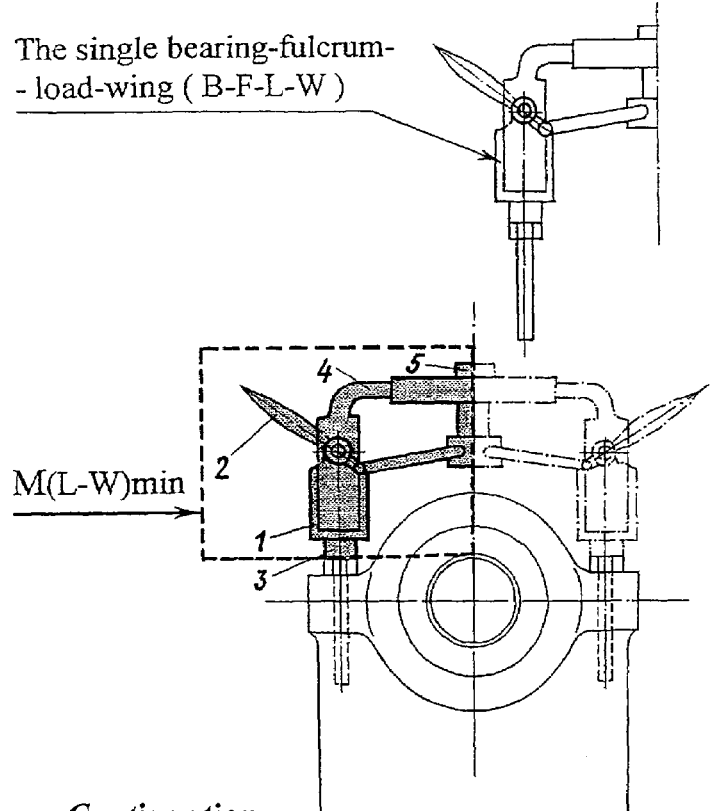

*Continuation.*

Fig. 24 Distribution of the minimal /initial/ single mass of the load-wing M(L-W)min among all elements and mechanisms, forming the single bearing-fulcrum-load-wing (B-F-L-W).
Removal of vibrations in wide diapasons.
Placement of the B-F-L-Ws in direction parallelly to rotor axis.
A total mass of the bearing-fulcrum-loads-wings (the B-F-L-Ws) is equal to a double mass of the single bearing-fulcrum-load-wing (B-F-L-W).
See text in Specification.

Turbine Generator Vibration Damper System. Vladilen Safonov.
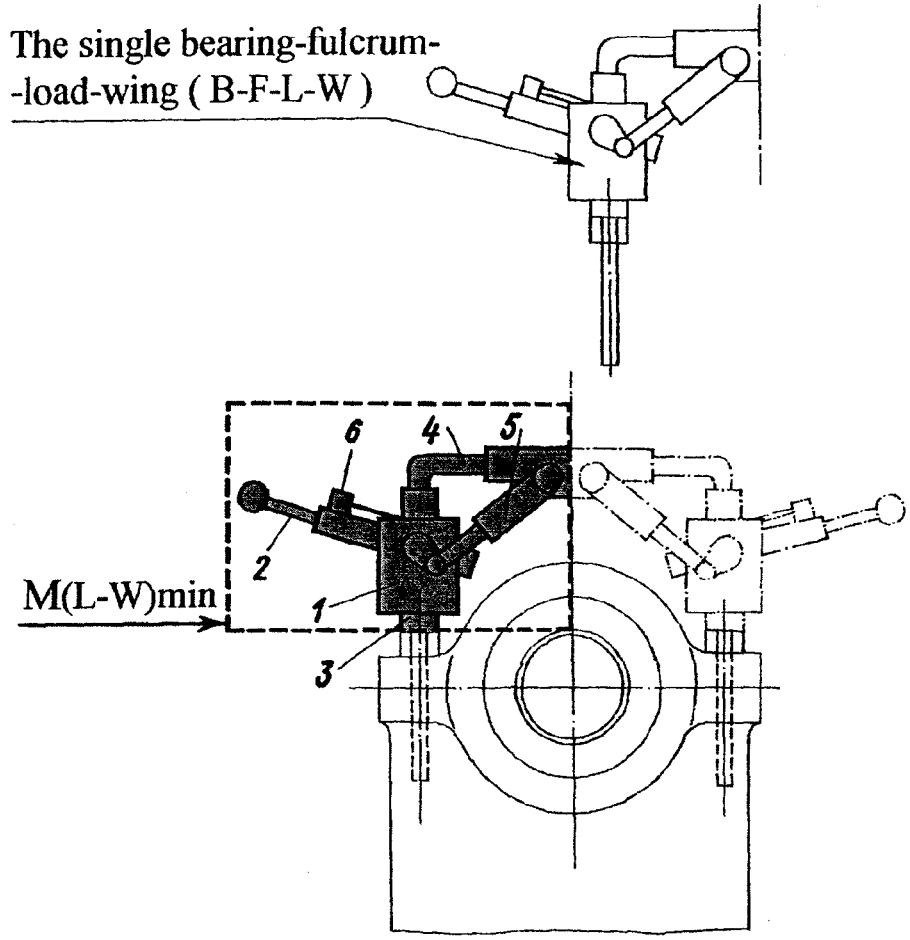
Fig. 25 Distribution of the minimal /initial/ single mass of the load-wing M(L-W)min among all elements and mechanisms, forming the single bearing-fulcrum-load-wing (B-F-L-W). Removal of vibrations in super-wide diapasons.

Turbine Generator Vibration Damper System. Vladilen Safonov.

*Cont.*

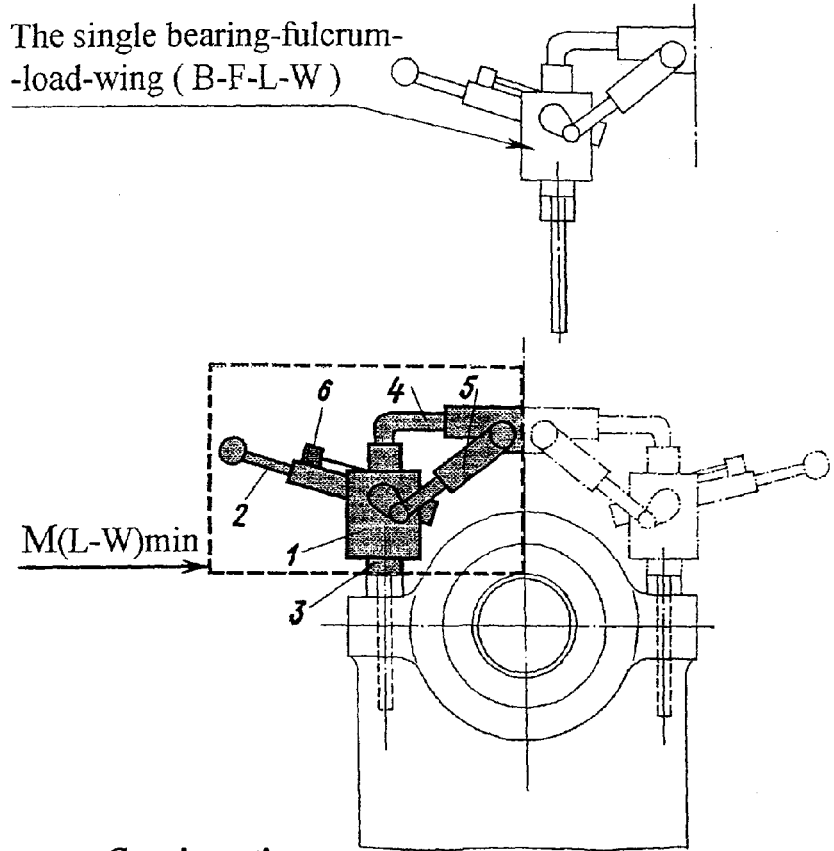

*Continuation.*

Fig.25 Distribution of the minimal /initial/ single mass of the load-wing M(L-W)min among all elements and mechanisms, forming the single bearing-fulcrum-load-wing (B-F-L-W).

Removal of vibrations in super-wide diapasons.
Placement of the B-F-L-Ws in direction parallelly to rotor axis.
A total mass of the bearing-fulcrum-loads-wings (the B-F-L-Ws) is equal to a double mass of the single bearing-fulcrum-load-wing (B-F-L-W).
See text in Specification.

Turbine Generator Vibration Damper System. Vladilen Safonov.
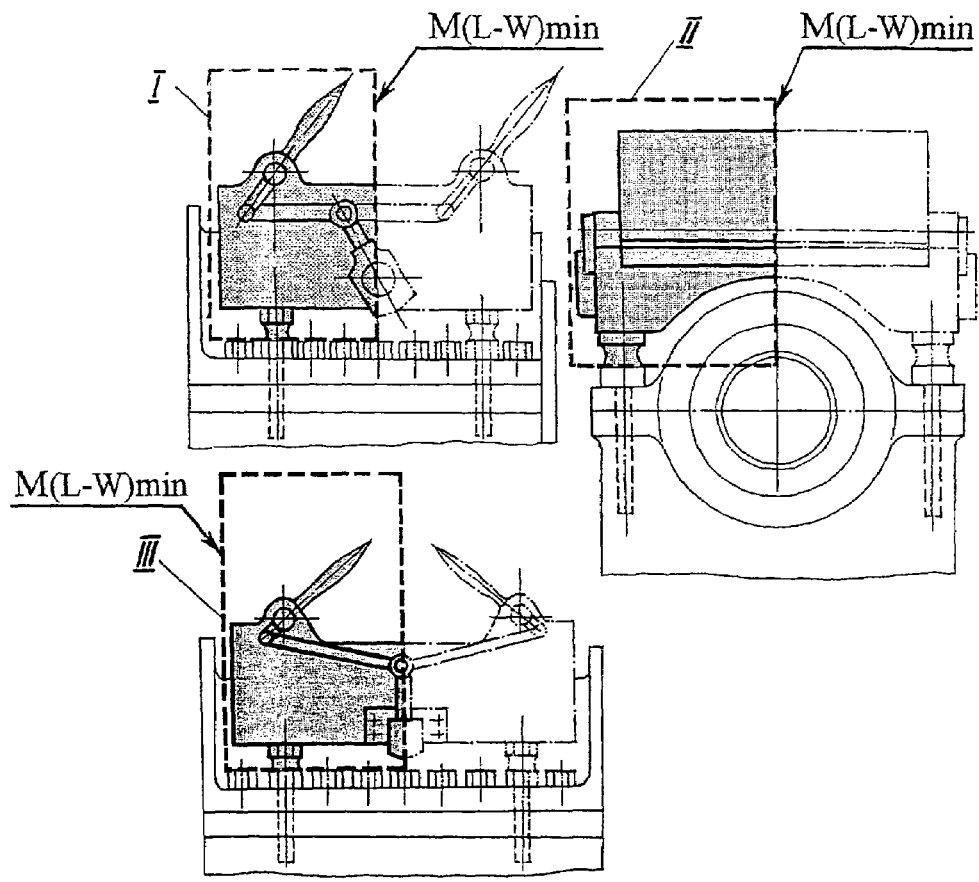
Fig. 26 Distribution of the minimal /initial/ single mass of the load-wing M(L-W)min among all elements and mechanisms, forming the single bearing-fulcrum-load-wing (B-F-L-W).
Placement of the B-F-L-Ws in direction perpendicularly to rotor axis.
See text in Specification.

Turbine Generator Vibration Damper System.  Vladilen Safonov.
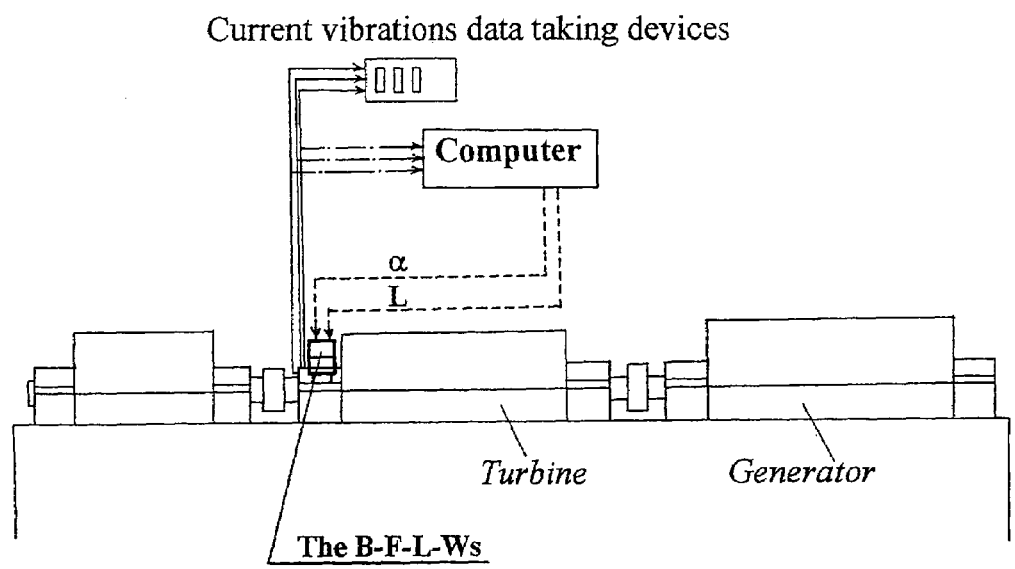
Fig. 27  Connecting of computer with the database to the bearing vibrations indicatory system to conduct removal of beyond-normal vibrations at the bearing-fulcrum automatically.

Turbine Generator Vibration Damper System. Vladilen Safonov.
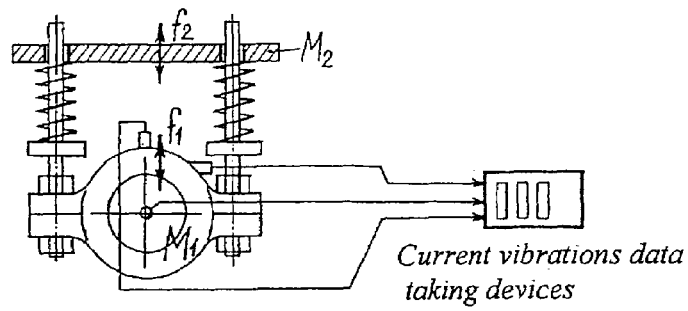
a)
The 'mass and spring' vibrating system method.
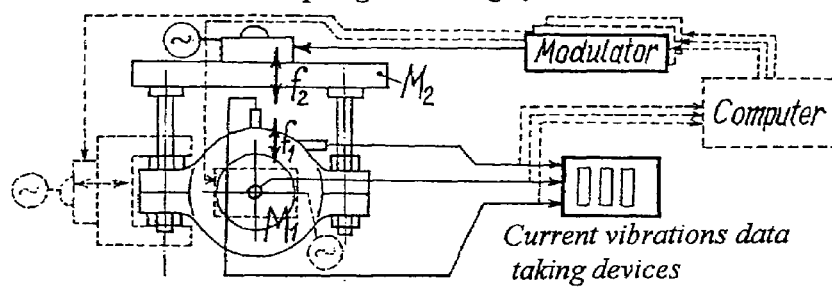
b)
The 'mass and vibrator' vibrating system method.
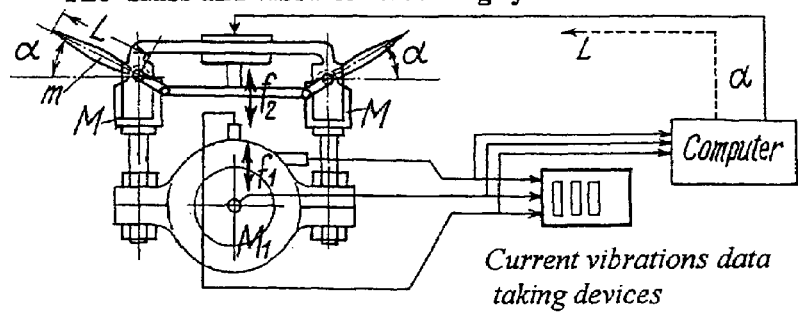
c)
The B-F-L-Ws method.
Fig. 28 Other methods of damping vibration [a), b)] -- but of extremely limited capabilities to be used upon bearings-fulcra zones at T-G-Ss -- in comparison with the B-F-L-Ws method [c)].
See text.

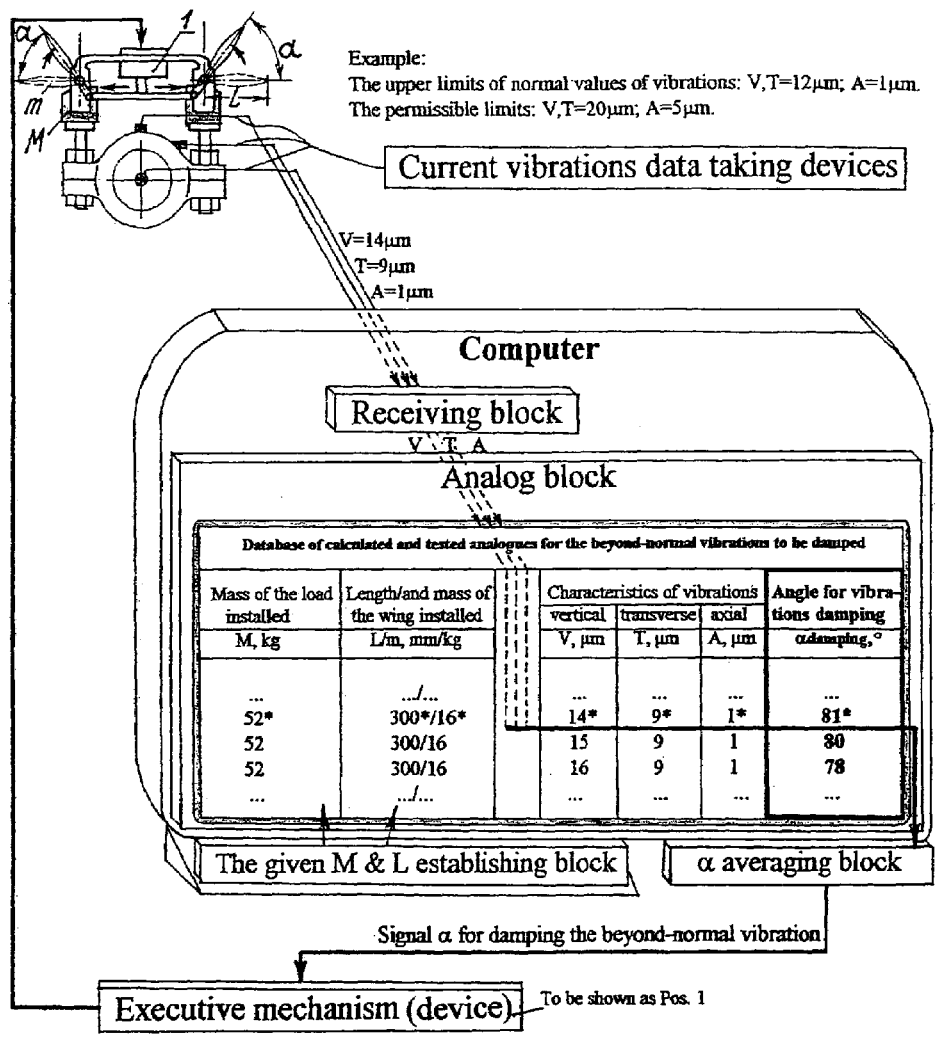
Fig. 29 Automation -- by use a computer and automatic equipment -- of process of removal of beyond-normal vibrations at T-G-Ss. [Wide diapasons.]
* - Here, all the data are shown to serve as illustration only.

Turbine Generator Vibration Damper System. Vladilen Safonov.
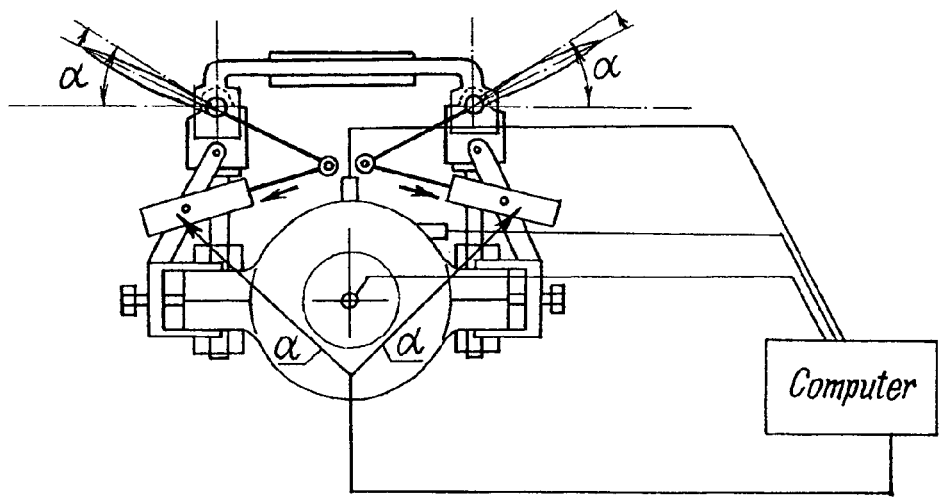
Variant I. Bifurcate signal α.
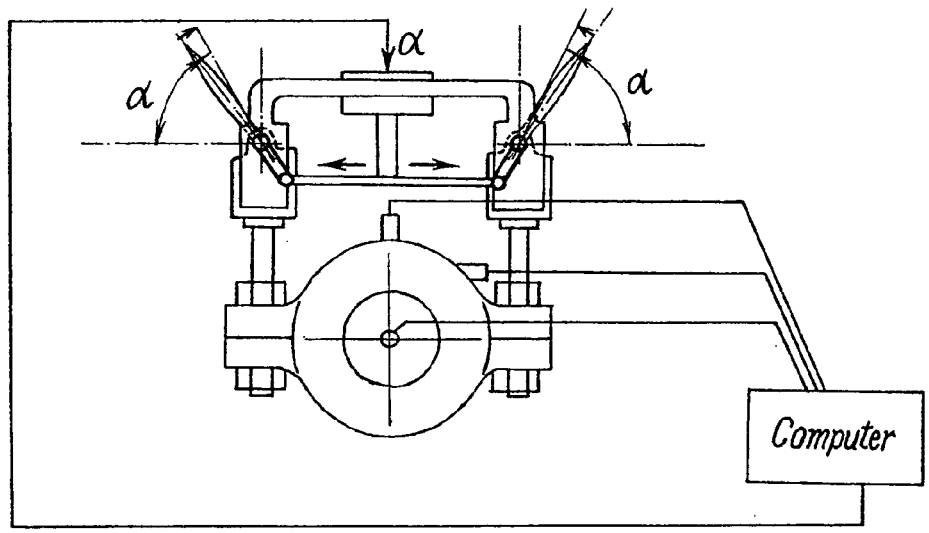
Variant II. Sole signal α.
*Cont.*
Fig. 30    Variants of sending signal α.

Turbine Generator Vibration Damper System. Vladilen Safonov.

*Cont.*

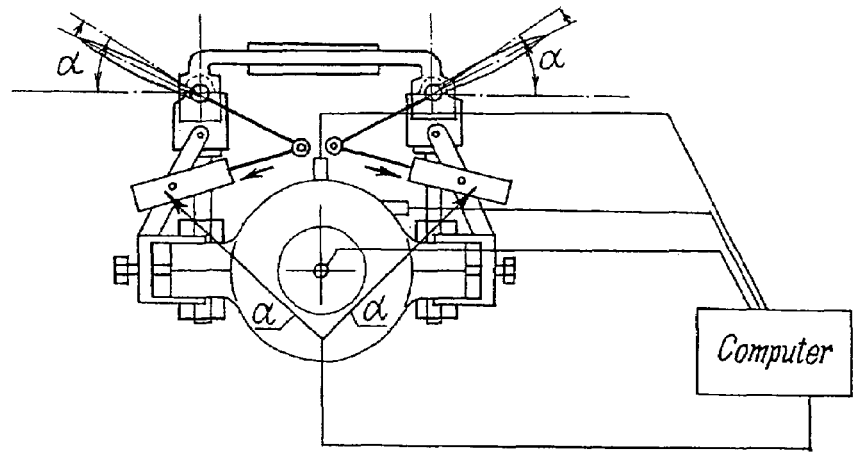

Variant I. Bifurcate signal α.

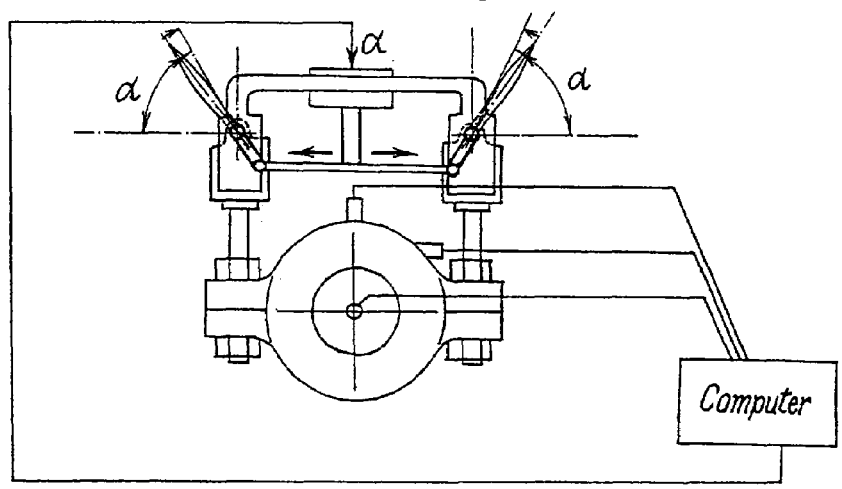

Variant II. Sole signal α.

*Continuation.*

Fig. 30 Variants of sending signal α.
Variant I: Bifurcate signal sent equally to the two separate executive mechanisms for turning the wings of the B-F-L-Ws.
Variant II: Sole signal sent to the united executive mechanism for turning the wings of the B-F-L-Ws.

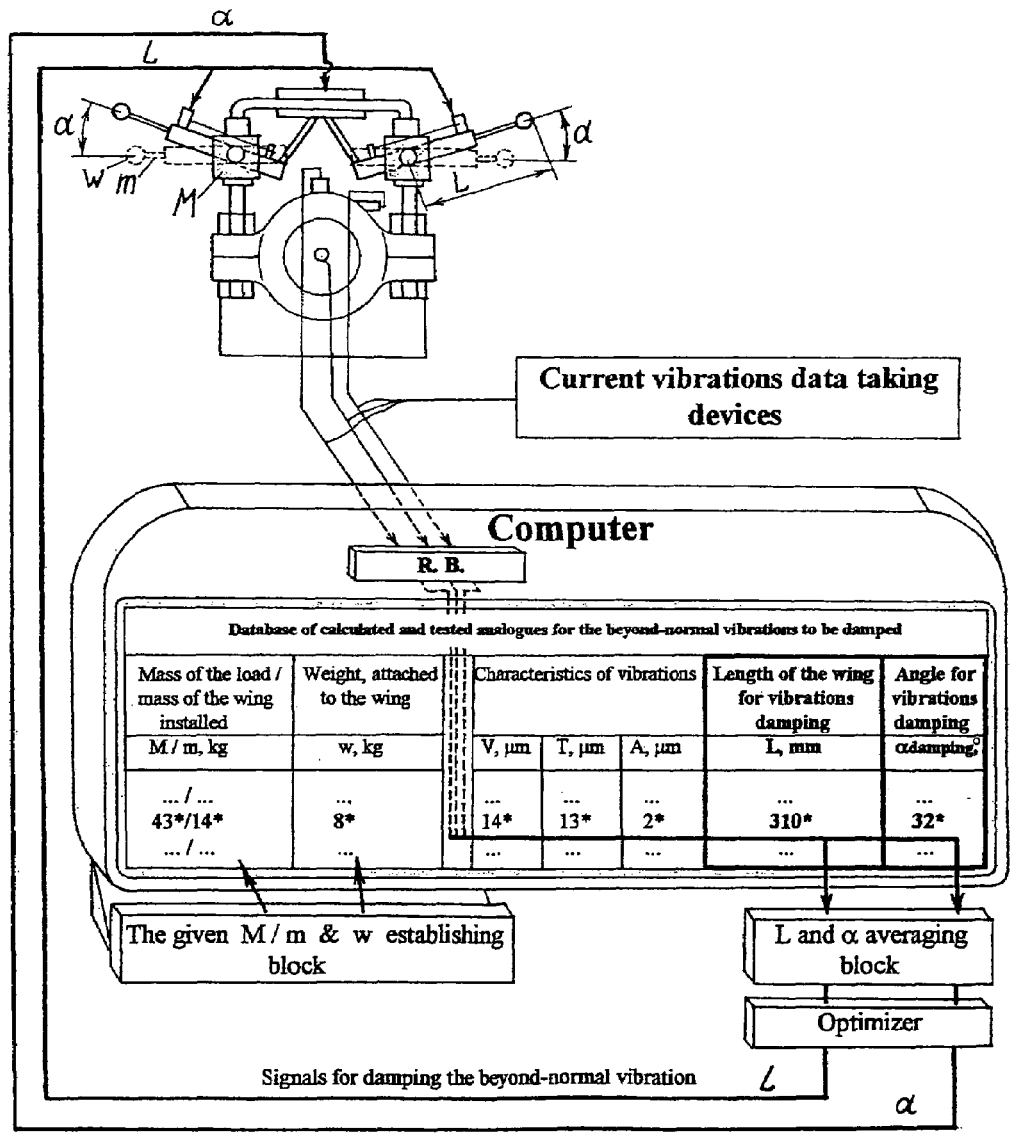
Fig. 31 Automation of process of removal of beyond-normal vibrations at T-G-Ss. [Super-wide diapasons].
\* - Here, all the data are shown to serve as illustration only.

Turbine Generator Vibration Damper System. Vladilen Safonov.
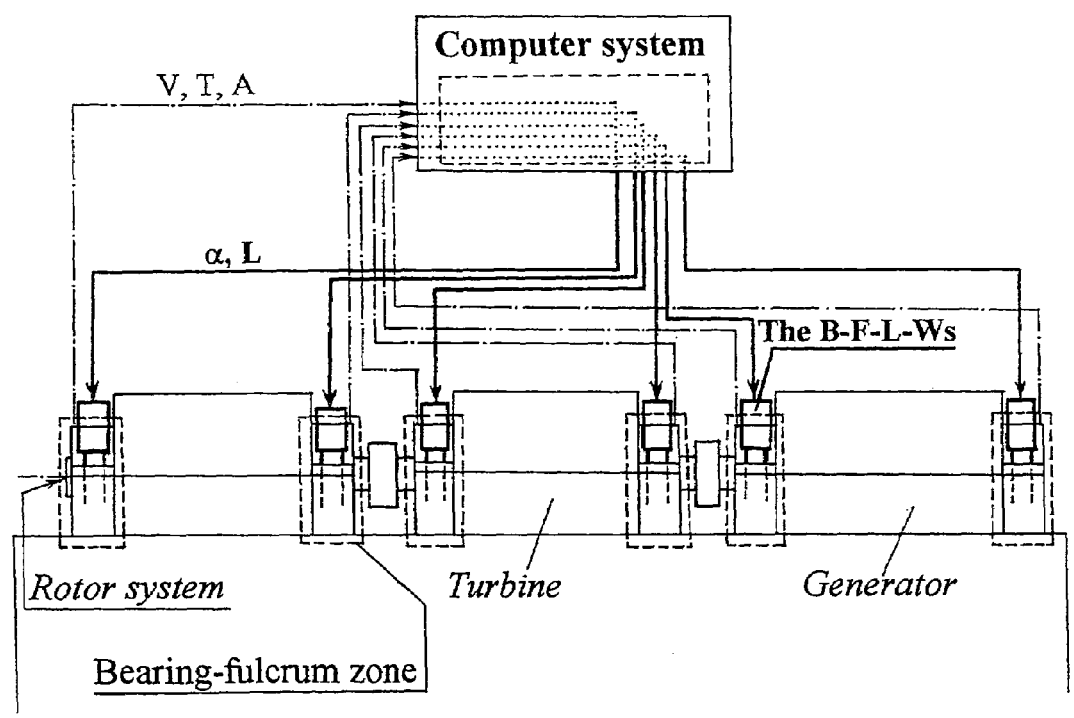
Fig. 32 Automation of process of removal of beyond-normal vibrations and keeping vibration situation normal and stable at whole T-G-S by the use of computer system and automatic equipment.

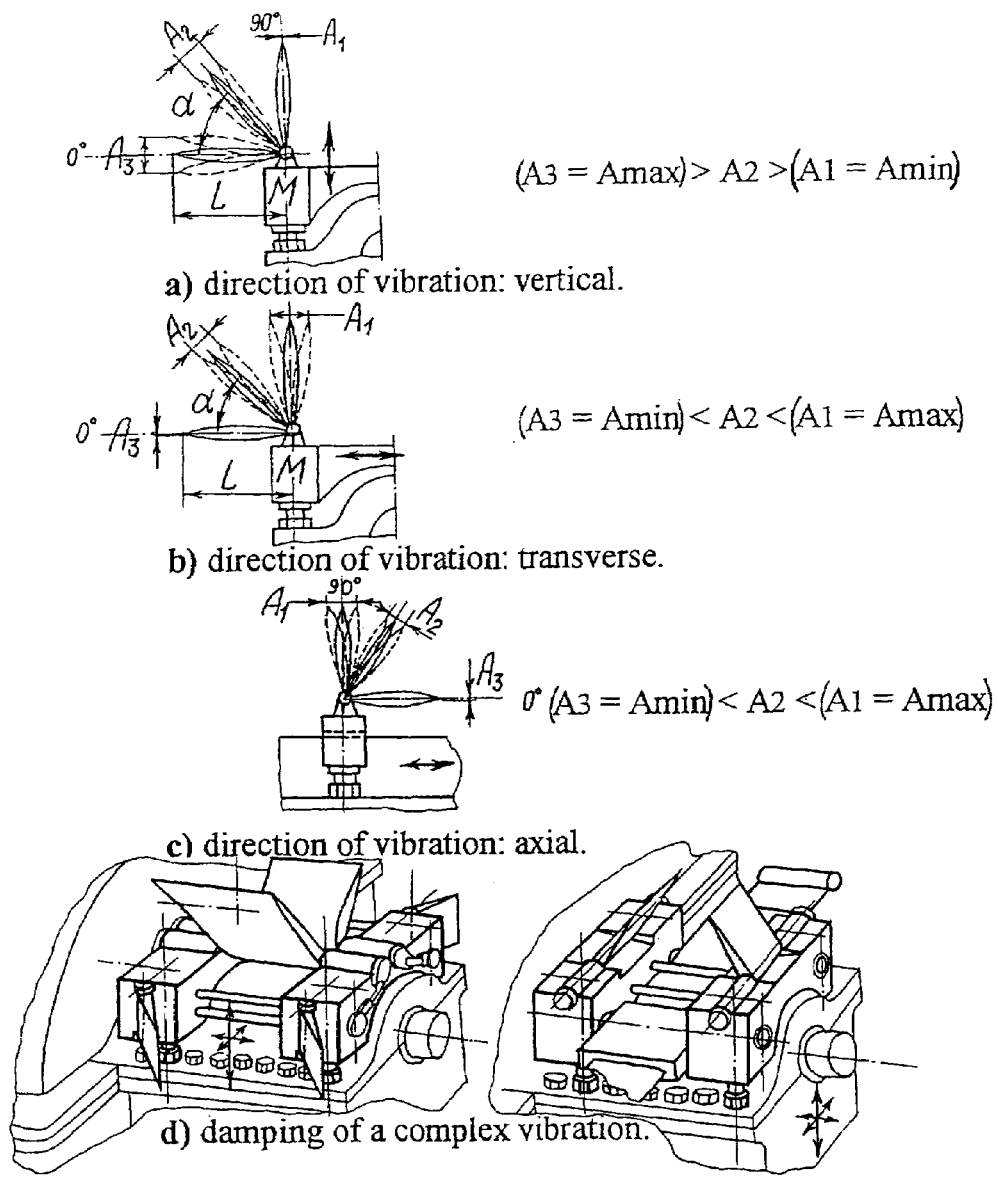
Fig. 33 Simple wings of the B-F-L-Ws.
Work of simple wing for damping vertical [a)], transverse [b)], axial [c)], complex [d)] vibrations within its turn round from 0° to 90°.

Turbine Generator Vibration Damper System. Vladilen Safonov.
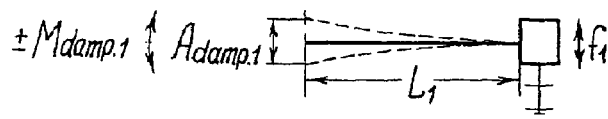
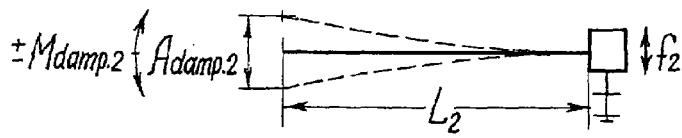
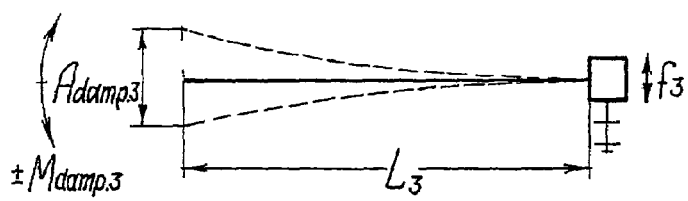
f1 = f2 = f3 .
L3 > L2 > L1 .
+ - Mdamp.3 > + - Mdamp.2 > + - Mdamp.1 .
Adamp.3 > Adamp.2 > Adamp.1 .
Fig. 34 An increase of damping capabilities (in damping momentum Mdamp. and damping amplitude Adamp.) of wing depending on elongation of its length.

Turbine Generator Vibration Damper System. Vladilen Safonov.
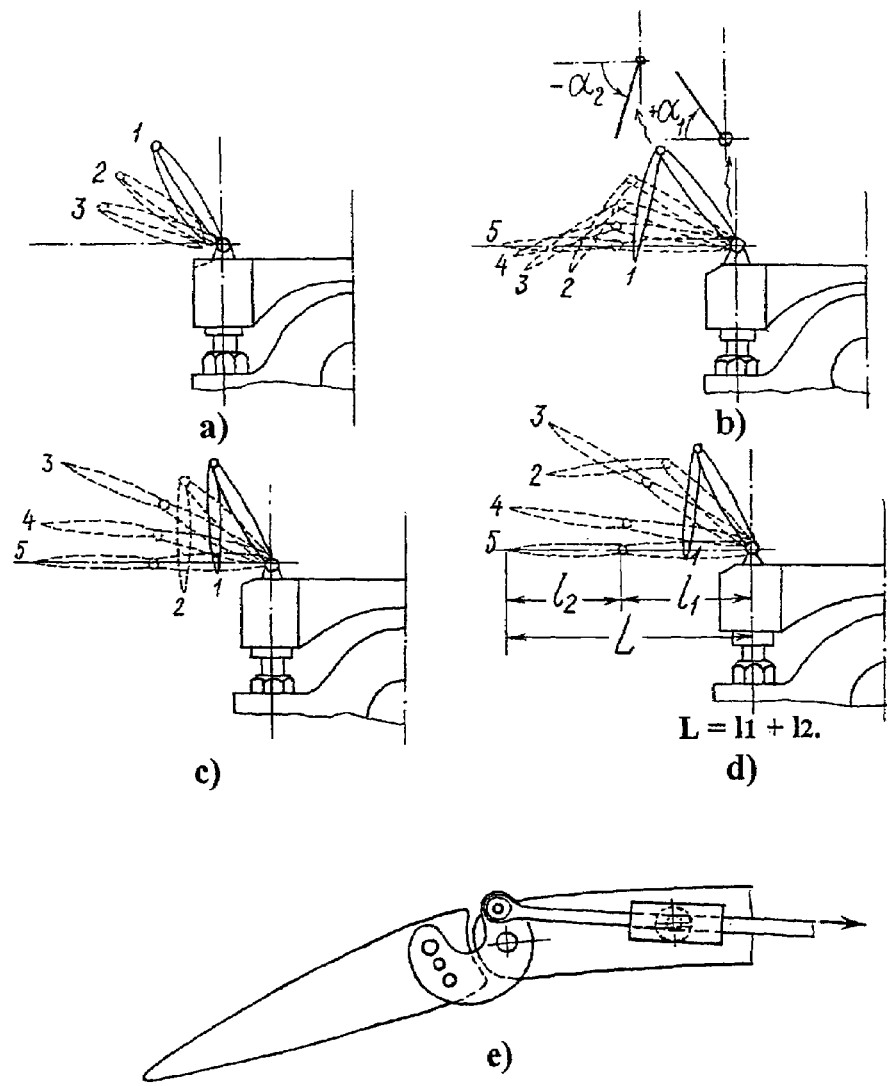
Fig. 35 Folding wings of the B-F-L-Ws.
Change of damping capabilities of folding wing depending on summary angle ($\alpha_1 + \alpha_2 + ...$) and total length of wing ($l_1 + l_2 + ...$).
a), b), c), d) - variants of spreading folding wings; e) - mechanism for turning the wing (variant).

Turbine Generator Vibration Damper System. Vladilen Safonov.

Imitative model                                   Real model

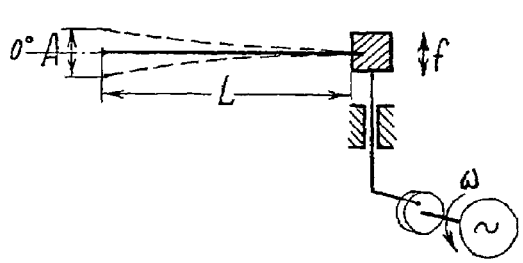 

Velocity ω is low, frequency f is low.
Wing is firm, non-flexible / in construction, substance or texture of material /.

a)

Imitative model                                   Real model

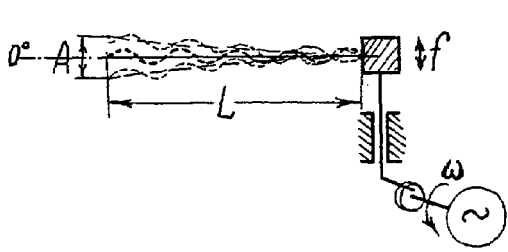 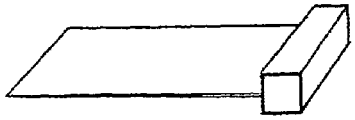

Velocity ω is high, frequency f is high.
Wing is highly elastic, flexible / in construction, substance or texture of material /.

b)

Fig. 36 Additional damping capabilities of wing depending on its flexibility.
a) firm wing; b) flexible wing.
(See text in Specification).

Turbine Generator Vibration Damper System. Vladilen Safonov.
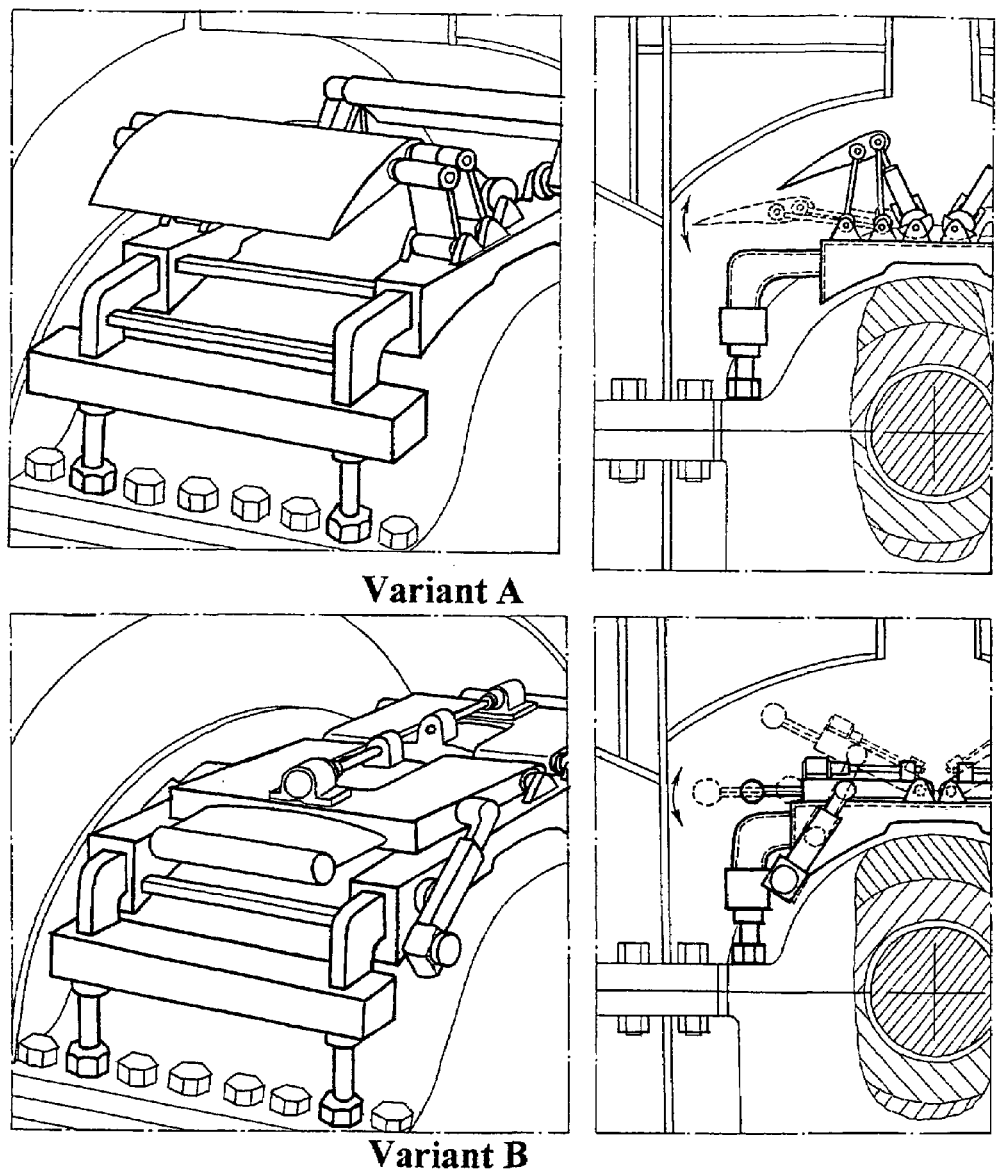
Variant A
Variant B
Fig. 37 Some variants of the forms of the B-F-L-Ws adapted to be used at the T-G-Ss' bearings-fulcra with limited space for spreading the wings. See text in Specification.

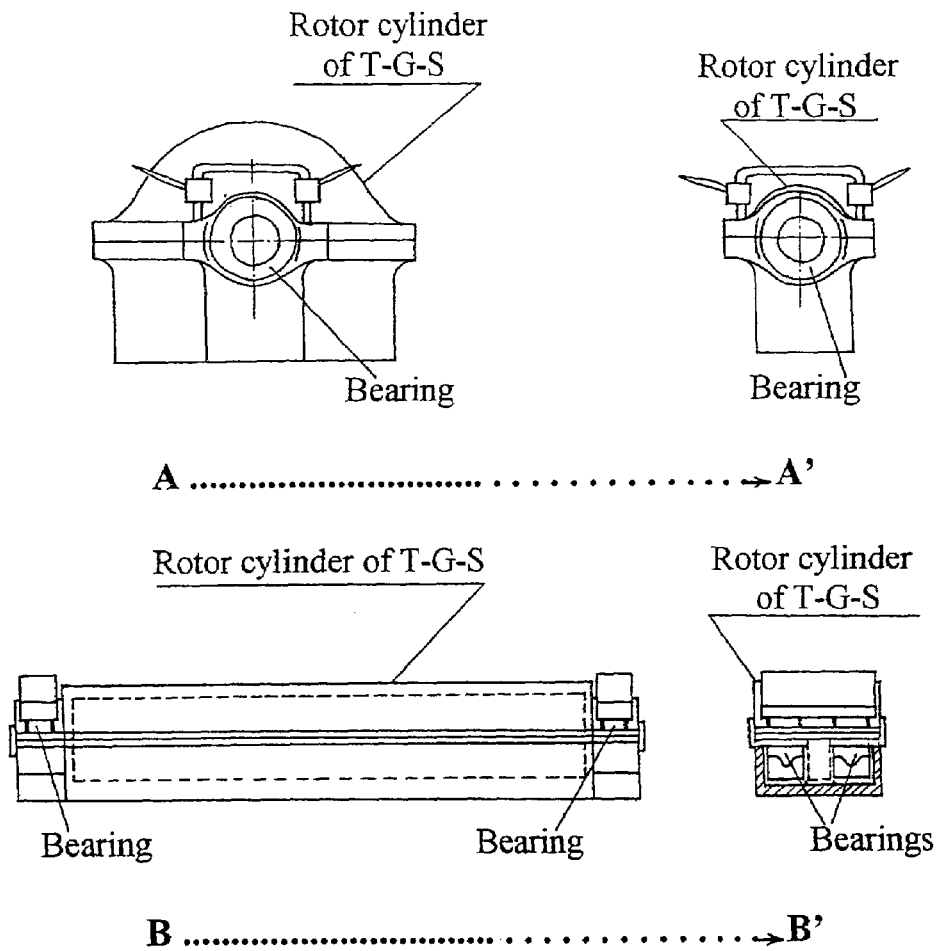
Fig. 38 Correlations A' and B' -- in mutual dimensions and constructions -- between bearings and their related rotor cylinder for which the method of removal of vibrations may be used so, that the B-F-L-Ws will be installed already upon whole rotor cylinder.
Those rotor cylinders are specified- see text in Specification.

Turbine Generator Vibration Damper System. Vladilen Safonov.
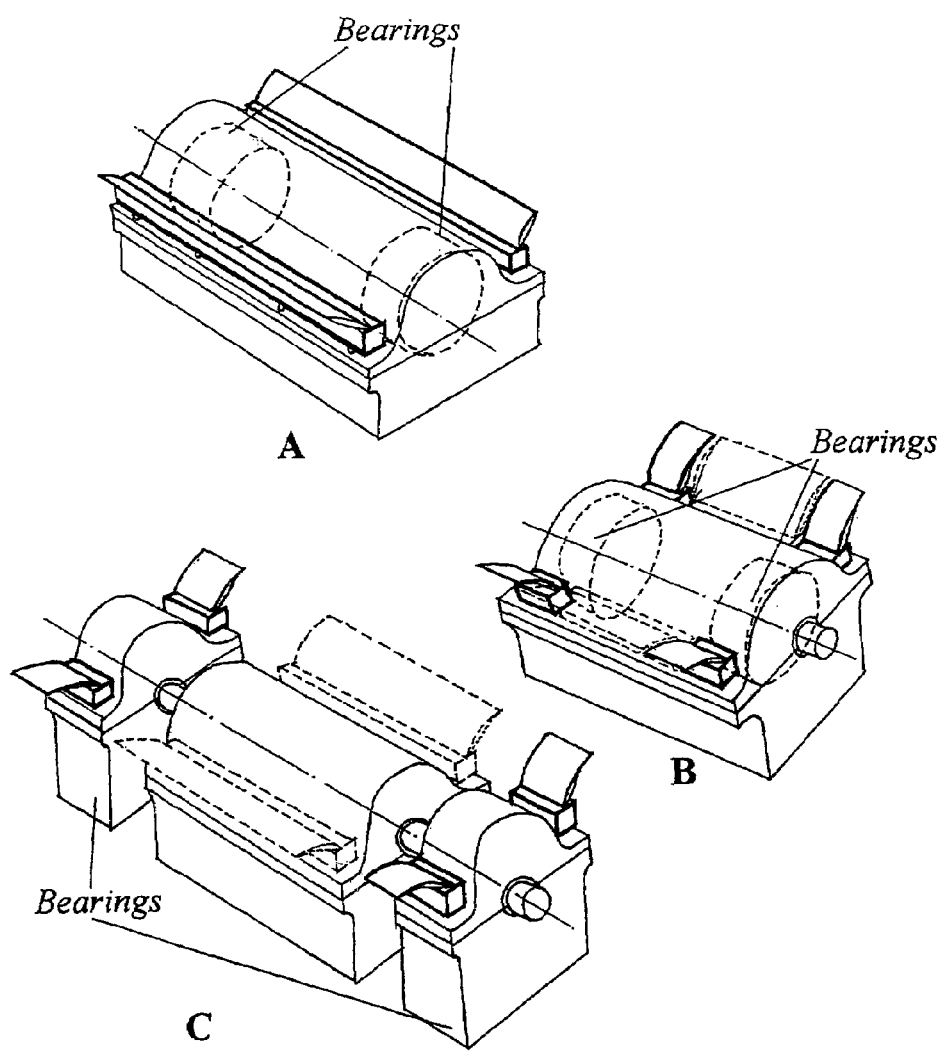
Fig. 39 Variants of installation of the B-F-L-Ws upon the whole rotor cylinders.
See text in Specification.

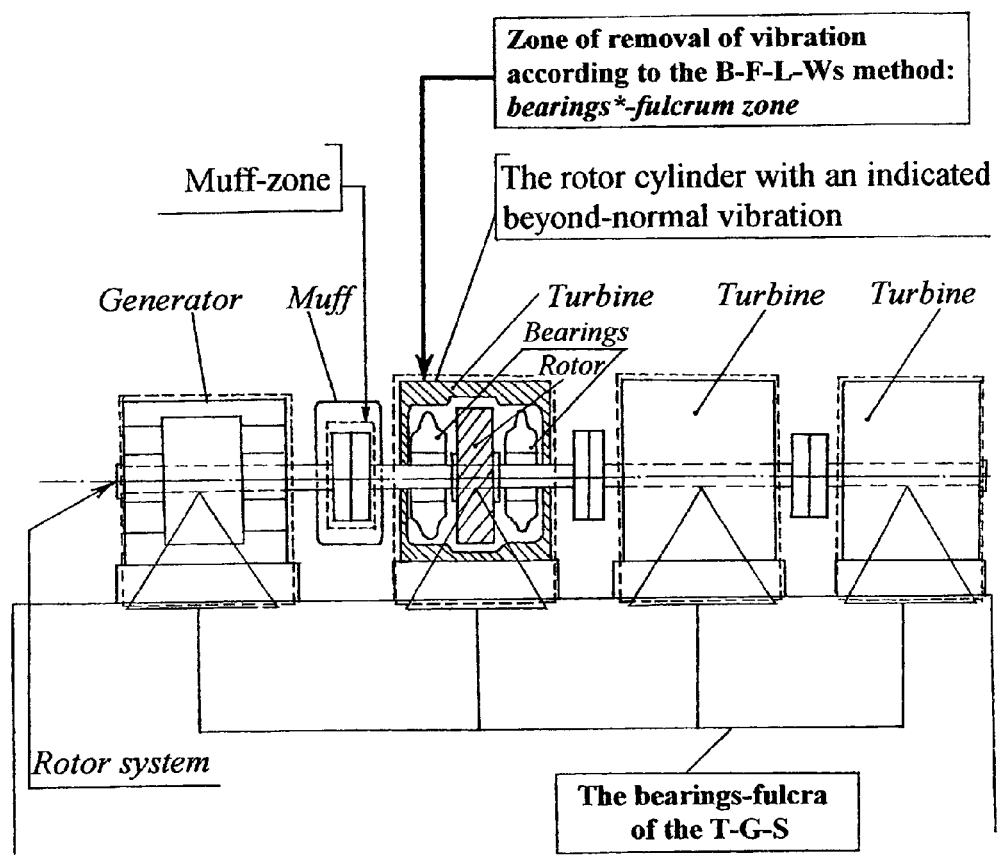
Fig. 40 The specified rotor cylinders of the T-G-S as the fulcra of the whole rotor system.
* - bearings-fulcrum zone - compare with bearing-fulcrum zone (see Fig. 1).

Turbine Generator Vibration Damper System. Vladilen Safonov.

Cont.

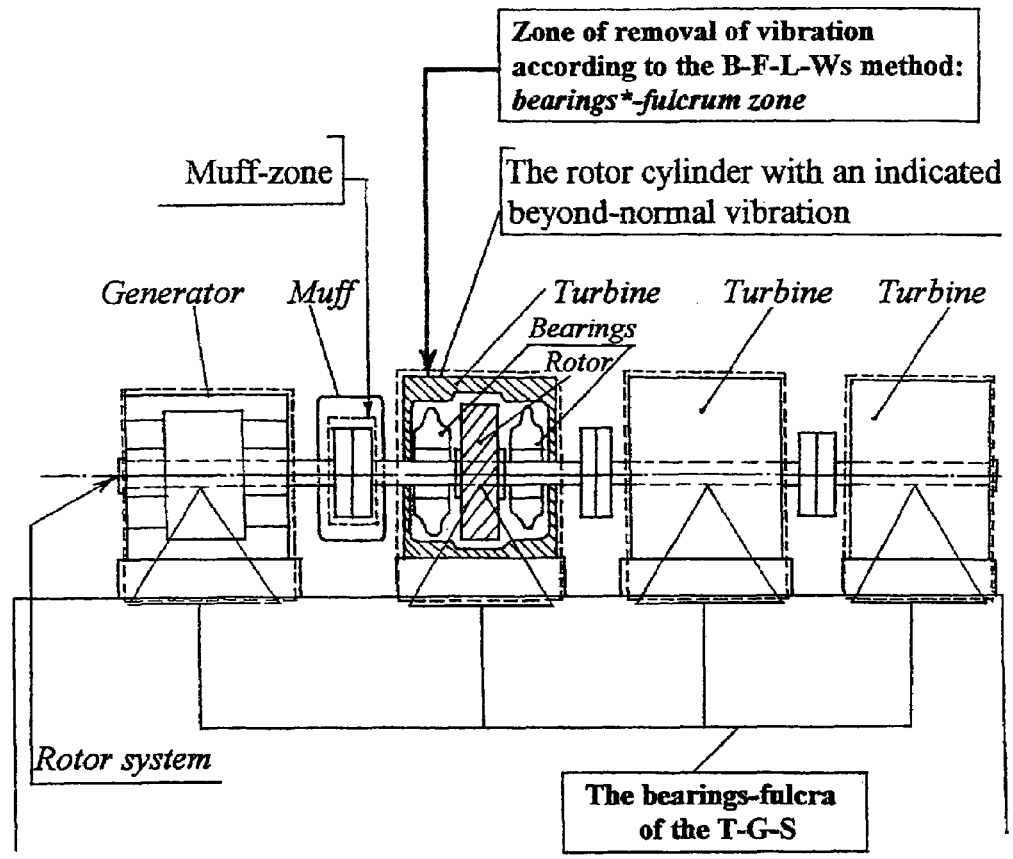

Fig. 40  The specified rotor cylinders of the T-G-S as the fulcra of the whole rotor system.
When the B-F-L-Ws may be used upon whole rotor cylinder and for the corresponding specified rotor cylinders - see text in Specification.

Installation of the B-F-L-Ws at the rotor cylinder as a whole, automation of the process of removal of vibrations at every cylinder as a whole and at whole T-G-S, the limitations are analogic to what must be done for the B-F-L-Ws to be installed and used at bearing-fulcrum.

\* - *bearingS-fulcrum zone* - compare with *bearing-fulcrum zone* (see Fig. 1).

Turbine Generator Vibration Damper System. Vladilen Safonov.
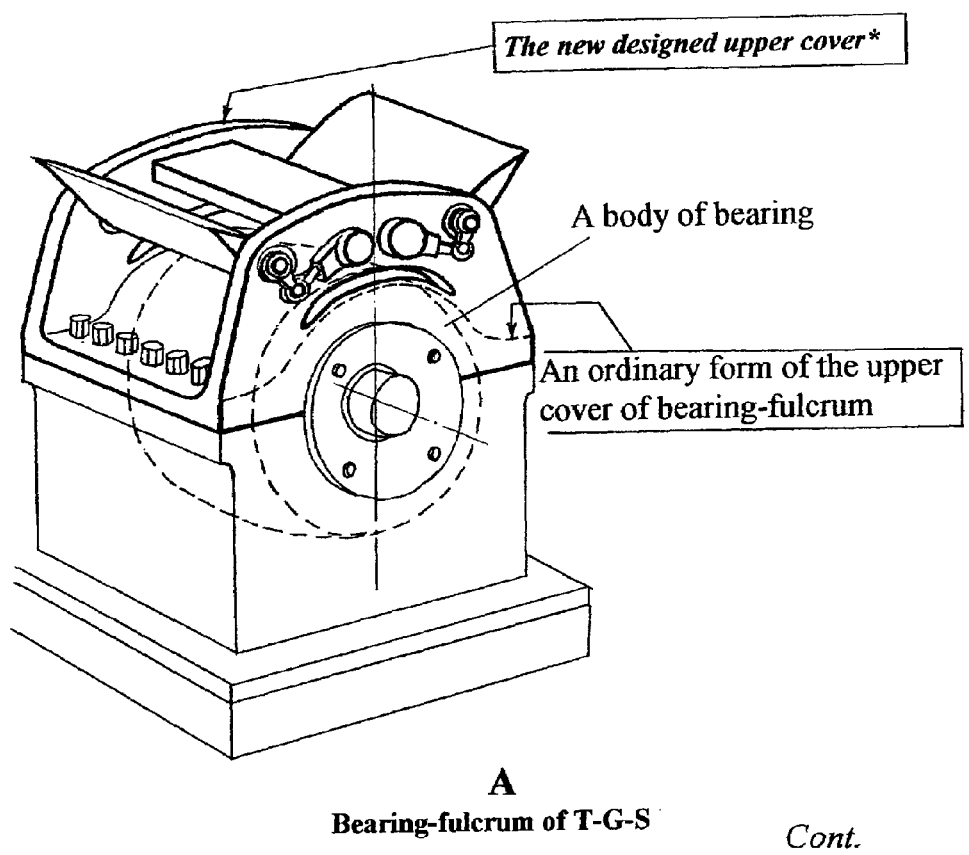
A
Bearing-fulcrum of T-G-S     *Cont.*
Fig. 41 Variants of simple changings of the construction of bearing-fulcrum (or the form of its upper cover) in the future designed T-G-Ss to be adapted for use of the B-F-L-Ws method - removal of vibrations at T-G-Ss without stopping their generaing electricity / being in operation.

Turbine Generator Vibration Damper System. Vladilen Safonov.

*Cont.*

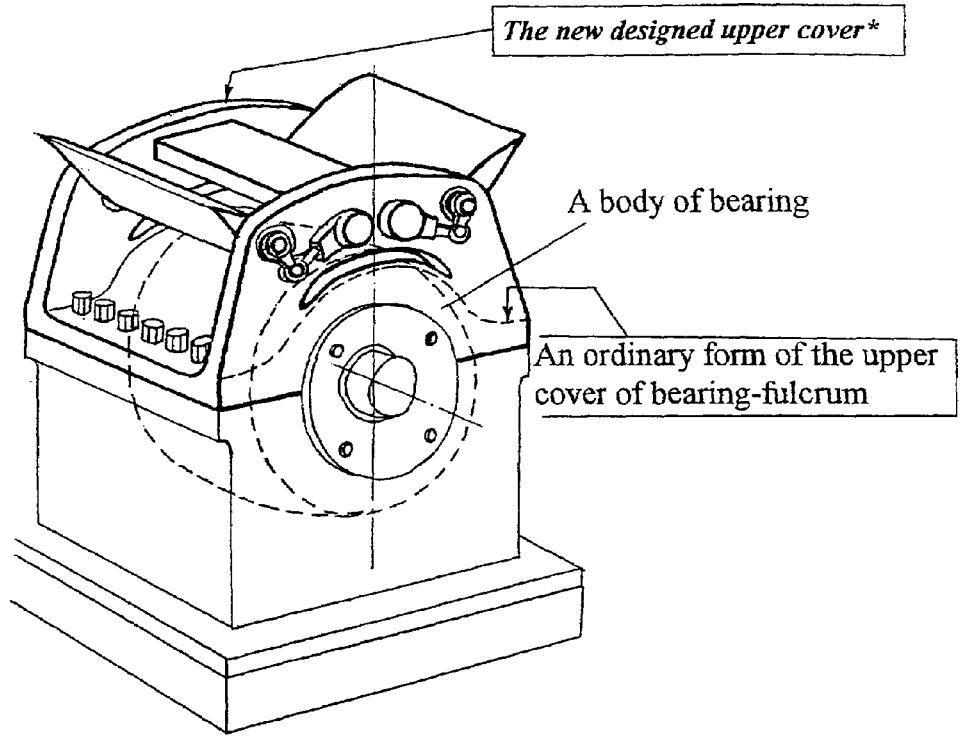

A
Bearing-fulcrum of T-G-S

*Cont.*

Continuation.

Fig. 41 Variants of simple changings of the construction of bearing-fulcrum (or the form of its upper cover) in the future designed T-G-Ss to be adapted for use of the B-F-L-Ws method - removal of vibrations at T-G-Ss without stopping their generating electricity / being in operation.

\* - *The additional mass (including loads-wings and related units) that will be added to the ordinary mass of upper cover has to be equal to a double mass of the single bearing-fulcrum-load-wing (B-F-L-W).*

Turbine Generator Vibration Damper System. Vladilen Safonov.

*Cont.*

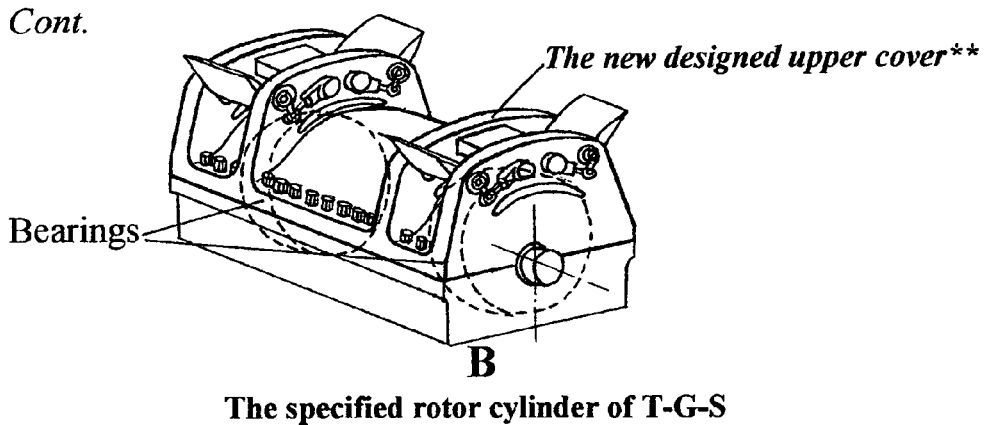

The specified rotor cylinder of T-G-S

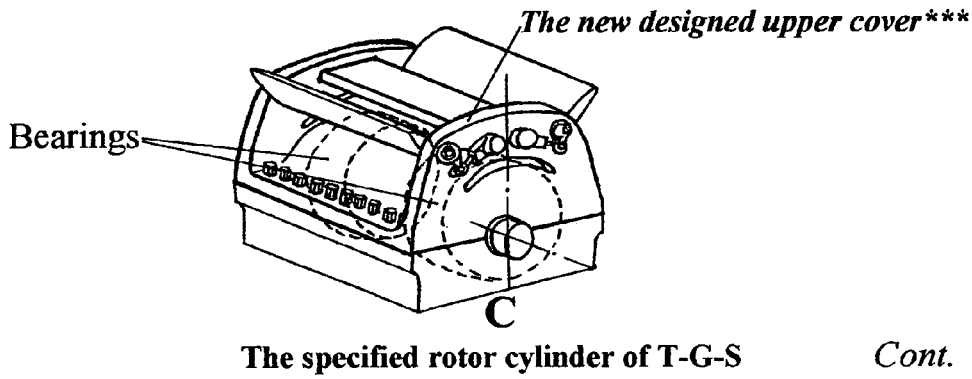

The specified rotor cylinder of T-G-S  *Cont.*

Fig. 41 *Continuation.* Variants of simple changings of the construction of bearing-fulcrum (or the form of its upper cover) in the future designed T-G-Ss to be adapted for use of the B-F-L-Ws method - removal of vibrations without stopping their generating electricity / being in operation. See text in Specification.

Turbine Generator Vibration Damper System. Vladilen Safonov.

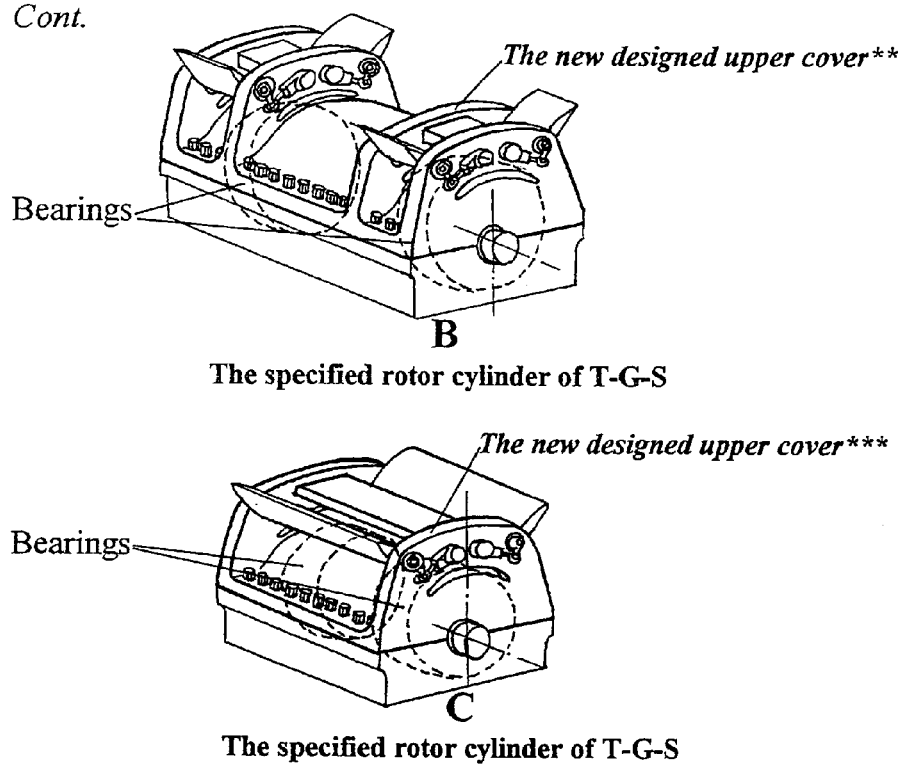

Cont.

The specified rotor cylinder of T-G-S

B

The specified rotor cylinder of T-G-S

C

Fig. 41 *Continuation.* Variants of simple changings of the construction of bearings-fulcrum (or the form of its upper cover) in the future designed T-G-Ss to be adapted for use of the B-F-L-Ws method - removal of vibrations without stopping their generating electricity / being in operation.

** - *The additional mass (including loads-wings and related units) that will be added to the ordinary mass of upper cover has to be equal to two double masses of the single bearing-fulcrum-load-wing (B-F-L-W).*

*** - *The minimal additional mass that will be added to the ordinary mass of upper cover has to be equal to two double masses of the single bearings-fulcrum- -load-wing (B-F-L-W).*

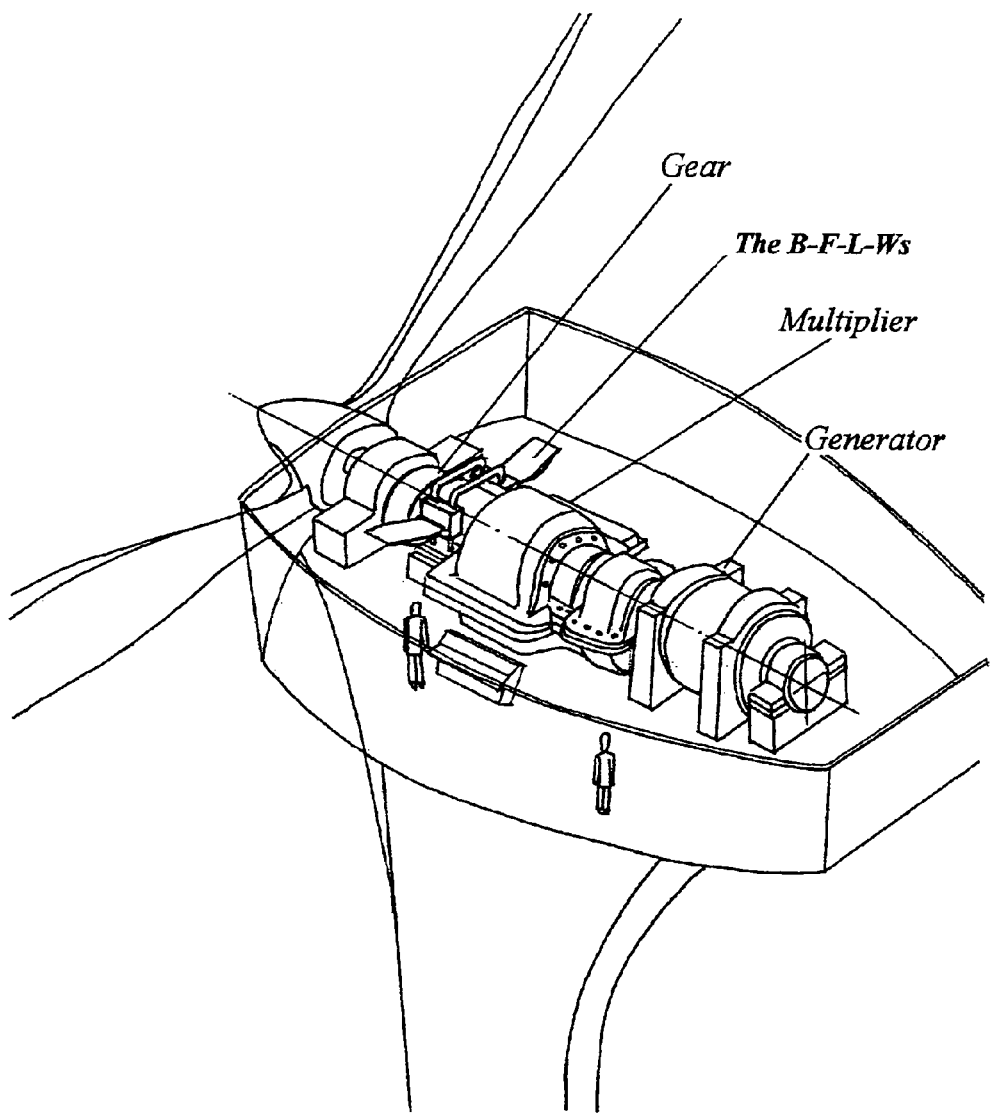
Fig. 42 Removal of vibrations with the B-F-L-Ws at bearing-fulcrum of T-G-S.
Wind Electro Power Plant.
General view.

Turbine Generator Vibration Damper System. Vladilen Safonov.
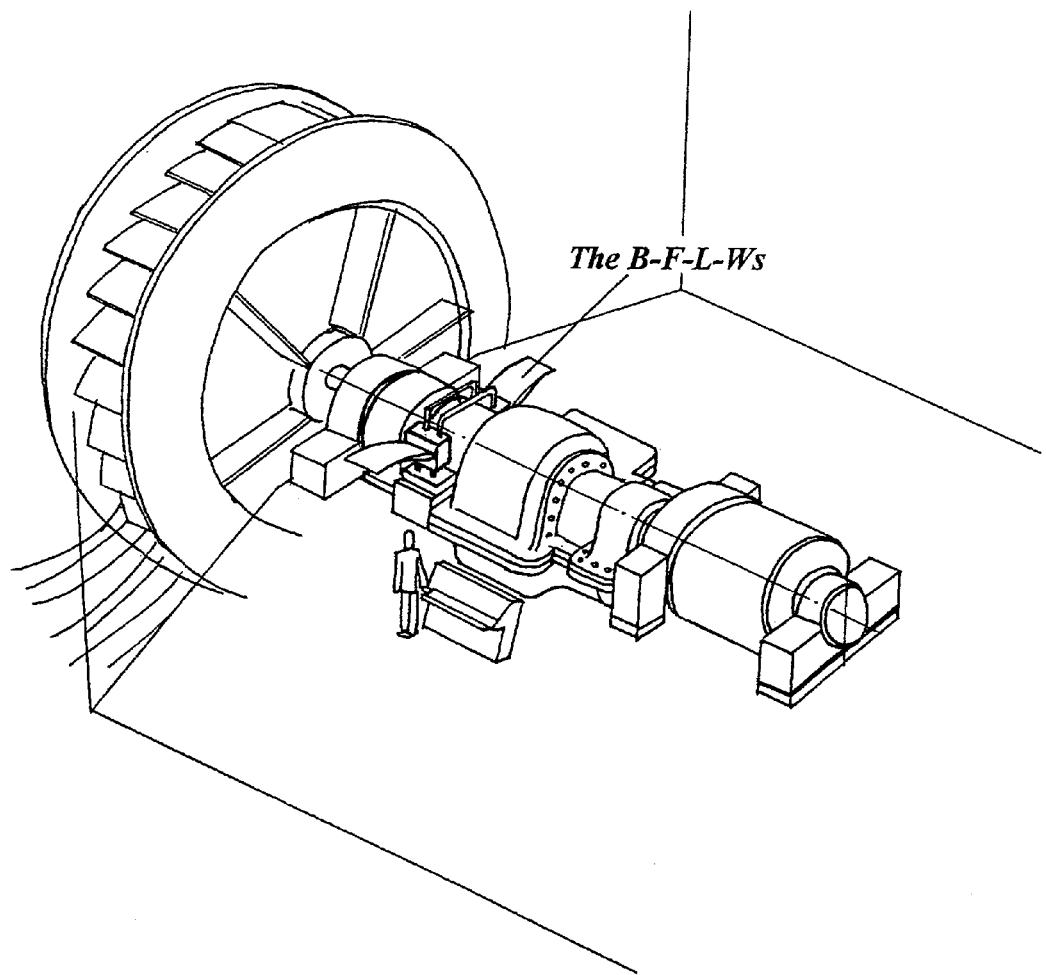
Fig. 43 Removal of vibrations with the B-F-L-Ws at bearing-fulcrum of T-G-S.
Hydro Electro Power Plant.
General view.

Turbine Generator Vibration Damper System. Vladilen Safonov.
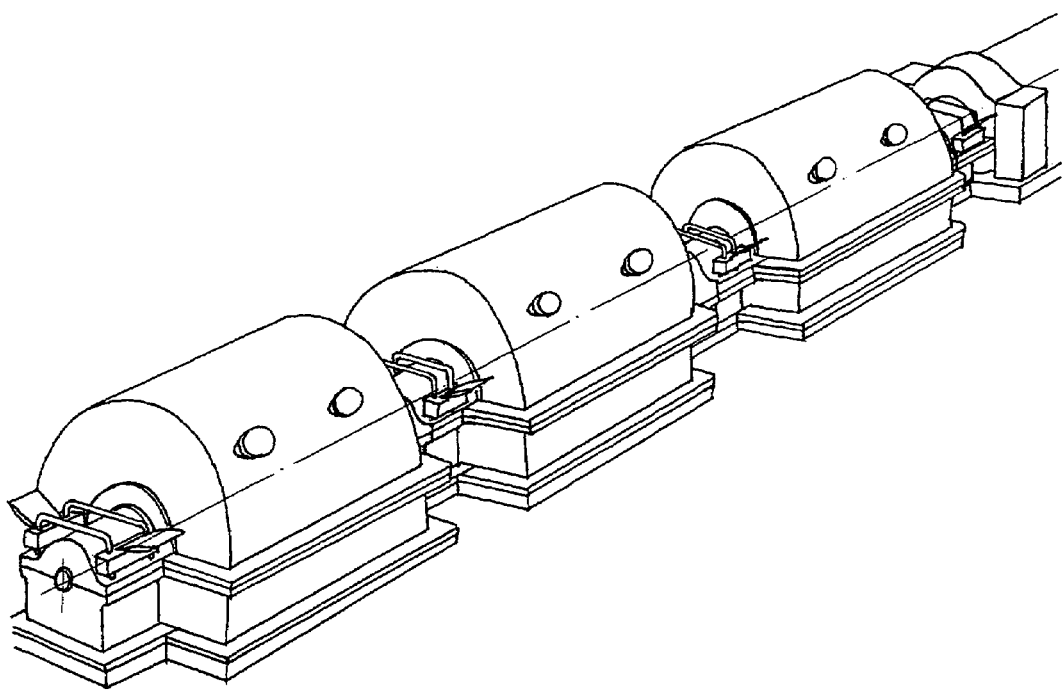
Fig. 44  Removal of vibrations with the B-F-L-Ws at whole T-G-S.
Electro Power Plant.
General view.

TURBINE GENERATOR VIBRATION DAMPER SYSTEM

RELATED APPLICATIONS

This application is a divisional application off of PCT Application No. PCT/US2004/039854, filed Nov. 26, 2004, which is a continuation of U.S. patent application Ser. No. 10/724,541, filed Dec. 1, 2003, now U.S. Pat. No. 7,026,736 each with a priority to Dec. 1, 2003. Each of these applications are herein incorporated by reference.

BACKGROUND OF THE INVENTION

1. Field of the Invention

This invention is a divisional one from the previous inventions of this author related to methods and apparatuses for active removal of internal vibrations from turbine-generator-sets (T-G-S). The previous invention of turbine generator vibration damper system relates to the vibration damper apparatuses themselves and covers all possible variations of horizontally placed T-G-Ss (in size, capacity, working velocity of rotor, diameter of working wheel, etc.), also all reasonable values of vibration (in amplitude and frequency, etc.), at presently existing all types power electro and other plants using rotary machines. Also, if the designs of future turbines and generators, first of all of high capacity, could originally include their bearings-fulcra improvements, based on this invention [use of the specified bodies, the B-F-L-Ws], that will make such machinery—with minimized shutdown period and minimized operating vibration—both more efficient and more safe for customers.

The present invention relates to the method of vibration damping by this specific vibration damper system. Beyond this, the application of this method is now presented wider than for rotary machinery only. The method itself covers not only rotary machinery, but can further be utilized by other or materially different processes and at other apparatuses and machinery (i.e. motor, re-heater, cooling device, etc.) for as long it successfully damps vibrations.

2. Description of the Related Art

From the beginning of time, mankind has relied on various sources of energy to survive. These sources have included wood, coal, oil, wind power, and nuclear energy to just name a few. However, just about all these sources rely on the fact that mechanical movement is transformed into electrical power by a turbine-generator-set. While the overall design of these turbine-generator-sets has been improved over the years, they still must deal with internal vibrations. Most of these vibrations are engineered or machined out during manufacture, but additional vibrations develop as the machine operates throughout the years. When these vibrations reach an unacceptable level, the turbine-generator-set must be shut down to allow adjustments to take place. These adjustments not only take time and money to perform, but the generator is not online, thus no electricity or associated revenue is produced. Accordingly, there exists a need for a means by which vibrations can be reduced in a turbine-generator-set in a continuous manner without the requirement of taking the generator off-line. The development of the Turbine Generator Vibration Damper System fulfills this need.

The Turbine Generator Vibration Damper System, as its name implies, is an apparatus that actively removes internal vibrations from turbine-generator-sets.

The invention relies on dynamic forces generated by at least a pair (when symmetrically placed) of "wings" or by at least one "wing" (when centrally placed), or combination of that, and associated hardware mounted on the bearing housing, which operate to offset internally produced vibrations in an active or "real time" fashion. This is in contrast to the typical method of taking the turbine-generator off-line, shutting it down and then eliminating the source of vibration. The invention allows the generator to remain operational during adjustments. Thus, it remains on-line producing electricity and associated revenue. Additionally, the workers, material and labor normally used in the static reduction of vibration are saved as well. As a net result, less redundancy or backup sources of electricity are needed. The use of the Turbine Generator Vibration Damper System provides a real solution to internal vibrations that develop in turbine-generator-sets throughout their lifetime.

A search of the prior art did not disclose any patents that read directly on the claims of the instant invention; however, the following references were considered related:

U.S. Pat. No. 6,070,704, issued in the name of Sasse, describes a torque converter with a torsional vibration damper.

U.S. Pat. No. 6,298,965, issued in the name of Krause et al., describes a force transmitting apparatus having an external damper.

U.S. Pat. No. 6,112,869, issued in the name of Krause et al, describes a force transmitting apparatus having an external damper.

U.S. Pat. No. 6,471,484, issued in the name of Crall, describes a method and apparatus for damping rotor assembly vibrations.

U.S. Pat. No. 6,006,879, issued in the name of Sudau, discloses a torque converter with a torsional vibration damper arrangement.

U.S. Pat. No. 6,056,093, issued in the name of Hinkel, describes a torque converter with a turbine shell integrated with a torsional vibration damper.

U.S. Pat. No. 6,056,092, issued in the name of Hinkel, describes a torque converter with bridge coupling and vibration damper between bridge coupling and turbine hub.

And, U.S. Pat. No. 6,102,174, issued in the name of Sasse, describes ahydrodynamic torque converter with a torsional damper arranged in the inner torus.

Consequently, a need has been felt for providing an apparatus and method for removing turbine generator vibrations without necessitating the shutdown of such turbine generators.

SUMMARY OF THE INVENTION

Vibration at rotary machines is what designers want least. Still, a beyond-normal vibration is the major problem causing unexpected emergency stops of a rotary machinery all over the world. In methods of removal of a beyond-normal vibration at turbine-generator-sets, it is known to shut these sets down into a short- or long-time stop, depending on the volume of work of vibration removal operation. In this invention, removal of vibration does not require a T-G-S to be shut down: its operating, and generating electricity and associated revenue, is continuing within process of removal of vibration.

According to the present invention, removal of vibration is accomplished by a summary action of both massive-loading and self-exciting forces, issued from Bearing-Fulcrum-Load-Wings [B-F-L-Ws], that are attached at extreme points, in where vibration is resulted upon T-G-Ss.

Installed either in advance or within process of operation of the T-G-Ss, the B-F-L-Ws serve the following purposes:

1. To follow scanningly any change of vibration situation upon the bearings, with damping any slight increase of vibration, being indicated there as beyond-normal, down to normal values for all the processes of T-G-Ss operation /starting, all common-mode (power) operations, stopping/ thoroughly, and, therefore, keeping a complete vibration situation upon T-G-Ss permanently normal;

2. To prevent an increase of vibration without stopping operation of turbo-aggregate, and thereby prevent any vibration from growing; and 3. To damp beyond-normal vibrations, that may occasionally occur within common-mode operations of the T-G-S's.

All of these avoid unexpected stops experienced presently at power, chemical and other industries that result from T-G-Ss throwing down into beyond-normal vibration situations and/or to prolong T-G-Ss being in operation/generating electricity up to their planned stops or up to other connected machinery/equipment stops, within which removal of vibration at these T-G-Ss may be done by other methods of adjustment.

In operation, the present invention relates to methods and apparatuses for removal, in wide in super-wide diapasons, of beyond-normal vibrations that may occur at horizontally placed turbine-generator-sets [T-G-Ss] within period of the time of their starting or/and current (common-mode) operations processes.

The key places of control of the vibration situation are presently the bearings of turbine-generator-sets. Any disbalance impulses or pulsations inside the cylinders, disturbances leading to vibration, are transferring eventually to influence on vibration situation at the bearings as fulcra of the rotors.

Increase of vibration at a bearing results into destroying of its lubricant layer, that results into a local increase of temperature of cooling oil (or cooling agent), and, therefore, into increase of temperature of babbitt-layer (or slippery surfaces) of a bearing.

When temperature of cooling oil (or cooling agent) inside a bearing is reaching upto the critical level, an automatic control system of turbine-generator-set is giving the signal 'STOP' to shut down this set on the whole, or this set may be stopped by operator before or within the temperature of oil has reached the critical level.

Destroying of slippery surfaces in such bearing results into destroying of the bearing(s), the rotor neck surfaces, etc., and may eventually lead to destroying of blade apparatus of the rotor and the correlative stationary parts in the cylinder.

All parameters taken from the bearings of a turbine-generator-set are determining and forming the basic signal to shut down the set in case of a beyond-normal vibration.

Nevertheless, presently practicing methods of removal of a beyond-normal vibration at T-G-Ss, that occurs within its starting or/and common-mode operations processes, have a concern with the zone(s) of the rotor(s) muff(s), but not bearing(s).

According to presently practicing methods, removal of vibration is conducted by balancing the rotor(s) within the zone(s) located at the(se) rotor(s) muff(s)—the nearest muff (s) to the bearing(s) with an indicated beyond-normal vibration.

It is common that this balancing includes loading (with the small bodies—special weights of known mass—in the specially calculated place on a body of the rotor half-muff) or/and unloading this half-muff in the special place on its body. Loading is ordinary carried out by fixing the weight(s) (with welding, joining, etc.) on a body of the rotor half-muff. Unloading is ordinary carried out by cutting the weight(s) (or picking, burning, hollowing, grooving, etc. the weight(s) or body metal) off a body of the rotor half-muff.

To conduct this safely and according to the presently existing methods, two general things are required:

a) the covering case(s) of the rotor(s) half-muff(s) has/have to be open to reach the body of the muff(s), and/or, therefore, b) this turbine-generator-set has to be shut down, stopped in operation, and, therefore, not generating electricity (or compressing, or pumping products).

As minimum, the construction of all the(se) muff(s) covering case(s) (and of other parts) at all presently existing and the future turbine-generator-sets will require the preliminary and/or in-service changes to be done in a way to readily conduct these methods [in any bearing vibration occasion at any of turbines, generators, compressors or pumps] without stopping turbine-generator-sets.

However, if the decision to stop the set for balancing the rotor(s) at the muff(s) zone(s) is taken [or, more often, if the T-G-S has already been stopped automatically], then this stop also, commonly and as minimum, includes Shutting down the set [turbine-generator].
Opening the bearing(s) of a beyond-normal vibration. Inspection the surfaces of babbitt layer inside the bearing(s) and the rotor(s) neck surfaces. Closing the bearing(s).
Opening the upper carter(s) of the case(s) of the rotor(s) muff(s).
Control of the rotors gathering in the place of their junction.
Loading the muff(s) body/(ies) with the balancing weights or removing (extraction) the balancing weights off the muff(s) body/(ies): balancing the rotor(s).
Dynamic balancing of the rotor(s). Testing within starting, gradually loading power, and stopping the set.
Closing the carter(s) of the case(s) of the muff(s).
Starting the set in operation.

Eventually, it results into loss of operating time from hours to days per year for the set, and into loss of money upto millions of dollars per year for the set (due to non-generating electricity, in case of power plants).

The new places (the new zones) of application to remove vibration at T-G-S. In this invention the place of application is transferred from the zone(s) of muff(s) to the zones of bearings-fulcra of T-G-Ss, i.e. where vibration is resulted.

Zones for application of the process (the method of removal of beyond-normal vibrations at T-G-Ss without stopping their generating electricity/being in operation) are shown in FIG. 1.

One can see that now the zone of application is transferred to the bearing-fulcrum zone(s) of the bearing(s) with indicated beyond-normal vibration.

An advantage of the present invention is that removal of vibration does not require a T-G-S to be shut down, thereby continuing operating and generating electricity during the process of removal of vibration.

Another advantage of the present invention is that ic can be installed in advance, or within process of operation of T-G-Ss, the B-F-L-Ws.

Yet another advantage of the present invention is that it is capable of damping beyond-normal vibrations that may occasionally occur within common-mode operations processes upon operating T-G-Ss, and, so, improving a thorough safety of T-G-Ss and their efficiency.

This method can also be utilized by other or materially different processes in all kind of machinery, apparatuses and technologies for as long it successfully damps vibrations. For this, the key places for installation of the B-F-L-Ws may be, but not limited to, the bearing(s)-fulcra, or fulcra, zones, where vibration is resulted.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a cross sectional elevational view of a turbine generator vibration damper system according the present invention, showing zones for application of the process (the method of removal of a beyond-normal vibrations at T-G-Ss without stopping their generating electricity/being in operation)—bearings-fulcra zones;

FIG. 2A is a front elevational view of a principal scheme of application of the present invention upon presently existing T-G-Ss;

FIG. 2B is a front elevational view of a principal scheme of application of the present invention upon newly designed T-G-Ss incorporating the present system integrally therein;

FIG. 2C is a front elevational view of a principal scheme of application of the present invention upon apparatus or reactor.

FIG. 2D is a front elevational view of a principal scheme of application of the present invention upon pipeline.

FIG. 2E is a front elevational view of a principal scheme of application of the present invention upon a vibrating body such as tank or vessel.

FIG. 3 is a front elevational view of a Bearing-Fulcrum-Load-Wings [B-F-L-Ws] for removal of beyond-normal vibrations in wide diapasons;

FIG. 4 is a front elevational view of a B-F-L-Ws for removal of beyond-normal vibrations in super-wide diapasons;

FIG. 5 is an exploded perspective view showing the main elements of the B-F-L-Ws;

FIG. 6 is a perspective view of the B-F-L-Ws for removal of beyond-normal vibrations in wide diapasons;

FIG. 7 is a perspective view of the B-F-L-Ws for removal of beyond-normal vibrations in super-wide diapasons;

FIG. 8 is a perspective view of the B-F-L-Ws for removal of beyond-normal vibrations in super-wide diapasons showing placement in direction perpendicularly to rotor axis of T-G-S;

FIG. 9 is an elevational view depicting loads of the B-F-L-Ws in various embodiments;

FIG. 10 depicts various configurations for the wings of the B-F-L-Ws;

FIG. 11 is an exploded cross sectional elevation of fixture units for fixing loads of the B-F-L-Ws to a case of bearing-fulcrum;

FIG. 12 is a side elevational view of the preferable setting of fixture units of the B-F-L-Ws.

FIG. 13 is a perspective view of the installation of the B-F-L-Ws with fixation which not requires replacement of the standard bolts of bearing-fulcrum;

FIG. 14 is a perspective view showing variants of units for changing the length of wings of the B-F-L-Ws;

FIG. 15 is elevational views of various types of drivers (shown schematically) of units for turning wings of the B-F-L-Ws;

FIG. 16 is a perspective view of a change of mass of wing of the B-F-L-Ws by attached weights;

FIG. 17 depicts side elevational views of variants of joint-units of the B-F-L-Ws;

FIG. 18 is an exploded view of the operations (in number and sequence) to install the B-F-L-Ws;

FIG. 19 depicts placements of the B-F-L-Ws around bearing-fulcrum of T-G-S in direction parallelly to rotor axis;

FIG. 20 depicts both correct and incorrect placements of the B-F-L-Ws at bearing-fulcrum /if to follow the instructions of the B-F-L-Ws method;

FIG. 21 depicts placement of the B-F-L-Ws upon bearing-fulcrum at T-G-S in direction perpendicularly to rotor axis;

FIG. 22 is a graph for determination of initial single mass of the load-wing of B-F-L-W as function of diameter of the rotor neck of T-G-S;

FIG. 23 depicts graphs for determination of initial single mass of the load-wing M(L-W)min as function of diameter of the rotor neck dneck rotor, for various values of designed operating frequency f of T-G-Ss;

FIG. 24 depicts distribution of the minimal /initial/ single mass of the load-wing M(L-W)min among all elements and mechanisms, forming the single bearing-fulcrum-load-wing (B-F-L-W) for removal of vibrations in wide diapasons;

FIG. 25 depicts distribution of the minimal /initial/ single mass of the load-wing M(L-W)min among all elements and mechanisms, forming the single bearing-fulcrum-load-wing (B-F-L-W) for removal of vibrations in super-wide diapasons;

FIG. 26 depicts distribution of the minimal /initial/ single mass of the load-wing M(L-W)min among all elements and mechanisms, forming the single bearing-fulcrum-load-wing (B-F-L-W) with placement of the B-F-L-Ws in direction perpendicularly to rotor axis;

FIG. 27 depicts connecting of computer with the database to the bearing vibrations indicatory system to conduct removal of beyond-normal vibrations at the bearing-fulcrum automatically;

FIG. 28 depicts alternate methods of damping vibration;

FIG. 29 depicts automation of process of removal of beyond-normal vibrations at T-G-Ss utilizing computer control;

FIG. 30 is an alternate process of FIG. 29 depicting variants of sending signal "α";

FIG. 31 depicts automation of process of removal of beyond-normal vibrations at T-G-Ss for super-wide diapasons;

FIG. 32 depicts automation of process of removal of beyond-normal vibrations and keeping vibration situation normal and stable at whole T-G-S by the use of computer system and automatic equipment;

FIG. 33 depicts simple wings of the B-F-L-Ws for applications for damping vertical, transverse, axial, complex vibrations within its turn round from 0° to 90°;

FIG. 34 is a graphical representation showing an increase of damping capabilities (in damping momentum Mdamp. and damping amplitude Adamp.) of wing depending on elongation of its length;

FIG. 35 depicts folding wings of the B-F-L-Ws;

FIG. 36 depicts additional damping capabilities of wing depending on its flexibility;

FIG. 37 depicts variants of the forms of the B-F-L-Ws adapted to be used at the T-G-Ss' bearings-fulcra within limited space for spreading the wings;

FIG. 38 shows correlations A' and B'—in mutual dimensions and constructions—between bearings and their related rotor cylinder for which the method of removal of vibrations may be used so, that the B-F-L-Ws will be installed already upon whole rotor cylinder;

FIG. 39 depicts variants of installation of the B-F-L-Ws upon the whole rotor cylinders;

FIG. 40 shows a side elevational view of the specified rotor cylinders of the T-G-S as the fulcra of the whole rotor system;

FIG. 41 is a perspective view showing variants of simple changings of the construction of bearing(s)-fulcrum (or the form of its upper cover) in the future designed T-G-Ss to be adapted for use of the B-F-L-Ws method—removal of vibrations at T-G-Ss without stopping their generating electricity/being in operation;

FIG. 42 is a perspective view showing removal of vibrations with the B-F-L-Ws at bearing-fulcrum of T-G-S. Wind Electro Power Plant;

FIG. 43 is a perspective view showing removal of vibrations with the B-F-L-Ws at bearing-fulcrum of T-G-S. Hydro Electro Power Plant;

And, FIG. 44 is a perspective view showing removal of vibrations with the B-F-L-Ws at whole T-G-S.

DESCRIPTION OF THE PREFERRED EMBODIMENTS

The best mode for carrying out the invention is presented in terms of its preferred embodiment, herein depicted within the Figures.

1. Detailed Description of the Figures

According to the preferred operation, the present invention relies on dynamic forces generated by the B-F-L-Ws, which operate to offset internally produced vibrations in an active or "real time" fashion. As seen best in FIGS. 2A-2B, it can be seen that the static and dynamic components that would form the Turbine Generator Vibration Damper System include the loads 101 and the wings 102 that may be simple or changeable in length, width, weight, folding, multiply, etc. The fixture units 103 for fixing the loads to the case of the bearing-fulcrum, and the fixture units for fixing the wings to and turning the wings around the load (or to the joint-unit), utilize connecting arm 104 with the unit for turning the wings 105. It may also include the loads, the wings and analogous associated mechanisms for damping of vibrations in the direction of the rotor axis, if necessary.

Damping of vibrations may be done with manual changing of the operational parameters of the vibrations damping or/and automatically by use of automatic equipment and computer system. The Turbine Generator Vibration Damper System may be installed at presently operating T-G-Ss, as shown in FIG. 2A, and in future designed T-G-Ss where the features of the bearing housing will be changed correspondingly for use of this method, as shown in FIG. 2B. Parameters V, T and A are current vertical, transverse and axial vibrations at the bearing.

Analogously, principal schemes of various applications of the B-F-L-Ws shown in FIG. 2C (with installation upon apparatus or reactor), FIG. 2D (with installation upon pipeline), FIG. 2E (with installation upon a vibrating body such as tank or vessel). For all those drawings, the loads 101 and the wings 102, the fixture units 103, the connecting arms 104, and the units for turning the wings 105 work analogously to the described above, when installed upon turbine-generator-sets.

As shown in FIGS. 3 and 4, more details on parameters α and L, indicated in FIG. 2A. The principal scheme of the B-F-L-Ws for removal of vibrations in wide diapasons is shown in FIG. 3. Here, for the stated mass of the load M and length of the wing L, also for the stated mass of the wing m and possible additional weight w, tuning the system to the damping of vibrations is done by changing the angle α. Principal scheme of the B-F-L-Ws for removal of vibrations in super-wide diapasons is shown in FIG. 4 For the stated mass of the load M, also for the stated mass of the wing m and weight w, tuning the system to the damping of vibrations is done by changing the length of the wing L and the angle α.

As earlier indicated, the system foresees the change of width, weights, etc. of the wings as well, if it would be necessary.

Principal view with indication of the main elements of the B-F-L-Ws, installed at the bearing-fulcrum of T-G-S, is shown in FIG. 5.

Here it includes: Loads, Wings, Fixture units, Units for turning the Wings (see: A), Units for changing the length of the Wings (see: B) and Joint-Unit. When, by all means, the final design (construction) of the B-F-L-Ws will eventually be, as designed, completed following the tests, it would be further reasonable to use FIG. 6 for illustrative purposes in the detailed description of this invention.

As above indicated, this invention covers all possible ways of designing, manufacturing, assembling, fastening, calculating the parameters, testing and using of the B-F-L-Ws and the computer system beyond those described below in this Specification unless the results of the work of the Turbine Generator Vibration Damper System are positive, i.e. it provides a solution to internal vibrations that develop in turbine-generator-sets throughout their lifetime.

This invention covers all possible variety of the B-F-L-Ws, which may be used within this method at presently existing and operating T-G-Ss and at the T-G-Ss of the future design. It also covers all possible variants of changes that may be done in the T-G-Ss bearings (or in the bearing-fulcra) of the future design at the future T-G-Ss in accordance with this invention.

The drawings, as described, are not of the final design (as the final design is to be obtained following the tests) but of the schematic design, that is sufficient, however, for detailed description of how the Turbine Generator Vibration Damper System may work for various applications upon T-G-Ss.

Use of various elements and details of the B-F-L-Ws with placement in various directions to the rotor axis of T-G-S, including those with the space constraint and upon the whole rotor cylinders, of preferable placements and fixations of the B-F-L-Ws, of variations of automation of process, etc. is to be offered to manufacturers and customers. Being preferable, they are, however, not mandatory for as long as all other possible B-F-L-Ws and associated computer systems within frames of this invention are hereby covered when they may still provide a solution to internal vibrations.

Referring to FIG. 6, a detailed variant of the B-F-L-Ws, installed at the bearing-fulcrum of T-G-S, for removal of beyond-normal vibrations in wide diapasons is shown. This variant of B-F-L-Ws include: Loads (101), Wings (102), Fixture units (103), Joint-Units (104) and Unit for turning the Wings (105). Detailed variant of the B-F-L-Ws, installed at the bearing-fulcrum of T-G-S, for removal of vibrations in super-wide diapasons is presented in FIG. 7.

One can see that this variant of the B-F-L-Ws includes: Loads (101), Wings (102), Fixture units (103), Joint-Units (104), Units for turning the Wings (105) and Units for changing the length of the Wings (106). At the end of the wing one can also see Unit for changing the Weights. Detailed variant of the B-F-L-Ws, installed at the bearing-fulcrum of T-G-S, for removal of vibrations in super-wide diapasons in the direction perpendicularly to rotor axis of T-G-S is shown in FIG. 8.

In general, every B-F-L-W, named hereinafter as the single B-F-L-W, may consist of the following elements:

1. The load, which may be casted as a whole body, if designed, or, as shown, assembled from the parts. An assembling must form the load as a rigid body. See more details in FIG. 9.

2. The wing, which may be formed (casted) as a whole body, if designed, or assembled from the parts as shown. See more details: FIGS. 10, 35.

3. The fixture unit for fixing the wing to and turning the wing around the load (or to the joint-unit). It may be of any suitable construction. See more details: FIG. 10, and FIG. 17 (par. 4). If designed, the wing may be formed together with (the part of) the load.

4. The fixture unit for fixing the load to the case of the bearing-fulcrum.

It may be of various [of any suitable] constructions, but here [see: FIG. 11 (A), (B), (C)] as example, shown variant of using a pair of special pins and nuts.

For preferable setting of fixture units, see FIG. 12. For variant of installation of the B-F-L-Ws with fixation which not requires replacement of the standard bolts, see: FIG. 13.

The single B-F-L-W may also include:

5. The unit for changing the length of wing (lengthening). See: FIG. 14. As earlier indicated, there might be the unit for changing the width of wing as well.

6. The unit for changing the weight of wing (weightening). See: FIG. 16.

The whole B-F-L-W needs

7. The unit(s) for connecting the single B-F-L-Ws together—the joint-units of the B-F-L-Ws. See: FIG. 17.

8. The computer system. See more details: FIGS. 27 and 29-32.

In reference to all the various embodiments, the loads 101 can comprise many possible types and at least fourteen various forms of the loads of the B-F-L-Ws are presented in the Figures. The ways (variants) of forming the loads of the B-F-L-Ws are also shown. The wings 102 can also come in various forms. Variants of fixation the loads to the wings are also shown. For preferable fixations of the wings fulcra (on)to the loads and the joint-units, see also: FIG. 17 (pars. 4a, 4b, 4c). For variants of folding wings, see: FIG. 35.

Fixture units 104 are for fixing the loads of the B-F-L-Ws to a case of bearing-fulcrum. Variants of the fixture units for fixing loads of the B-F-L-Ws to a case of bearing-fulcrum are shown in FIG. 11. It may be in form of not divided pin (A) or bolt-collector and pin (B), (C). If such units will be installed, in advance or within operation of T-G-S, instead of the standard bolts of the bearing-fulcrum, an installation of the B-F-L-Ws at the bearing-fulcrum may take just some minutes only.

The preferable setting of fixture units is shown in FIG. 12. Variant of installation of the B-F-L-Ws with fixation which not requires replacement of the standard bolts of bearing-fulcrum is presented in FIG. 13. Units for changing the length of the wings of the B-F-L-Ws, and variants of the units for changing the length of the wings of the B-F-L-Ws are shown in FIG. 14. The electrically driven units are presented on this picture.

Units for turning the wings of the B-F-L-Ws can use various types of drivers (shown schematically) of units for turning the wings of the B-F-L-Ws are presented in FIG. 15. Here one can see hydraulically (electro-hydraulically) driven wings (1), electrically driven wing (2), mechanically (manually) driven wing (3), electro-mechanically (and manually) driven wings (4), (5), (6).

Units for changing the weight of the wings of the B-F-L-Ws are shown in FIG. 16, which indicates variant of changing the weights w1, w2 and w3 by changing length and/or diameter of the weights.

Various kinds of the joint-units of the B-F-L-Ws are shown in FIG. 17. Variant 1 presents the connecting plates (also bars, ribs, etc.) that may serve to firmly join two loads. Variant 2 indicates the types of the connecting arch-shaped units for joining loads together. Here, for variants 2b, 2c and 2d wings fulcra are shown as fixed onto the joint-units. Variants 2e and 2f present the detailed view of the connecting arch-shaped pipe units. Variants 3a and 3b show the constructions when two loads may be manufactured as the whole one (by casting, pressing, shaping, etc.) with the arch jointing. For variant 3b wings fulcra are shown as fixed onto the joint-unit. One can also see the views of mechanisms for turning the wings of the B-F-L-Ws, shown in FIG. 17 with fixation (on)to the loads or onto the joint-units.

The most preferable variants of fixation of wings fulcra (on)to the loads and the joint-units are shown in FIG. 17 (par. 4a): those are the variants when the wings fulcra are fixed without eccentricity to the axises of the fixture units for fixing the loads to a case of the bearing-fulcrum of T-G-S (for the view perpendicularly to the axis of the bearing-fulcrum of T-G-S).

Pictures 4b and 4c in FIG. 17 describe what can happen if the wings of the B-F-L-Ws are fixed with the eccentricity to the axises of those fixture units.

There are some recommendations given for designing the joint-units and correct fixing the wings (on)to the loads and the joint-units. First of all, designer should be tending to obtain the value of the external a and/or internal e eccentricities as little as possible to avoid the bending momentums in the joint-units.

Second, the wider diameter b1 of the fixture units is the better one, and the eccentricity (if any) a1 should be less than b1/2 (see: FIG. 17, par. 4b). Third, in case of internal eccentricity (such as for the B-F-W-Ss working in the limited space) the shorter wings are preferable (see: FIG. 17, par. 4c). Fourth, the system formed out of the loads M, the fixture units d and the joint-units R1, R2, should be so rigid that it may resist the momentum originated from the eccentricity (if any) (see: FIG. 17, pars. 4b, 4c).

As shown in FIG. 18, the order (in number and sequence) to install—to place and to fix—the B-F-L-Ws at the bearing-fulcrum of T-G-S. This variant of installation includes:

1. Install 4 fixture units A (instead of the standard bolts of the case of the bearing-fulcrum). The parameters of the fixture unit A should be equal to (or better than) the corresponding parameters of the standard bolts. The installation of the fixture units A may be done in advance or within operation of the T-G-S. It may be done at one or several, or all bearings-fulcra of the T-G-S.

2. Place the B-F-L-Ws on the fixture units A. One should use a crane or lifting mechanism for this operation. Join the pins B with the fixture units A.

And

3. Tighten the nuts D and E of the B-F-L-Ws.

Most adequate and practically possible variants of placement of the B-F-L-Ws around bearing-fulcrum of T-G-S in direction parallelly to rotor axis are presented in FIG. 19. Here, the most adequate and practically possible variant is (1 & 1'). Most adequate variant of placement is (4). Variants (2 & 2'), (3 & 3') and (6 & 6') may be considered additional (and limited in use).

Variants (1 & 1')+(6 & 6'), also (5 & 5') are adequate, but practically not always possible for placement. Variant (6 & 6') is not preferable as not increasing the weight of an upper cover of bearing-fulcrum. Loads may be used with wings, or without wings (as additional variant). Variant 7 is adequate, but practically not always possible for placement. Please pay attention to that in variant 7 the folding wing (and changeable in length, width and weight) is shown.

Correct and incorrect placements of the B-F-L-Ws at bearing-fulcrum are shown in FIG. 20. One should pay attention to that transferring of vibrations from/to the case of bearing-fulcrum should be done through the zones of junction the B-F-L-Ws with the case of bearing-fulcrum, but not directly through the covering case(s) of bearing (for the view perpendicularly rotor axis) (see: FIG. 20, 2 Correct placement). Please also look at FIG. 12.

Most adequate and practically possible variants of placement of the B-F-L-Ws upon bearing-fulcrum of T-G-S in direction perpendicularly rotor axis (e.g. upon an axial stress bearing-fulcrum) are presented in FIG. 21. One can see that the most adequate and practically possible variant is (1), and most adequate variant is (2). Variant (3 & 3') may be considered additional (for loading). Variants (4 & 4') and (5 & 5') are adequate, but practically not always possible for placement.

The first step that should be done within the assembling of the B-F-L-Ws during the complete tests is to determine the minimal /initial/ single mass of the load-wing of the B-F-L-W, i.e. the minimal mass of the single B-F-L-W when the beyond-normal vibrations are to be first damped. As the whole B-F-L-Ws is a symmetrical device, and because it is easier, and correct, to conduct assembling of the B-F-L-Ws when operators simultaneously work at the both by-sides of the bearing-fulcrum, the term of the minimal /initial/ single mass of the load-wing of the B-F-L-W $M_{(L-W)}$min is used here.

The graph shown on FIG. 22 may be used for determination of minimal /initial/ single mass of the load-wing $M_{(L-W)}$min of the B-F-L-W as function of diameter of the rotor neck $d_{neck\ rotor}$ of T-G-S. For example, for T-G-S with designed operating frequency f=50 Hz (3000 revolutions-per-minute): for $d_{neck\ rotor}$=560 mm, $M_{(L-W)}$min=64 kg; for $d_{neck\ rotor}$=520 mm, $M_{(L-W)}$min=60 kg; for $d_{neck\ rotor}$=200 mm, $M_{(L-W)}$min=23 kg. The graphs shown on FIG. 23 may be used for determination of initial single mass of the load-wing $M_{(L-W)}$min as function of diameter of the rotor neck $d_{neck\ rotor}$, for various values of designed operating frequency f of T-G-Ss. Those graphs (FIGS. 22, 23), because may be corrected according to the results of the tests at the concrete T-G-S (serial of T-G-Ss). The graphs FIGS. 22, 23 were described in order to best explain principles of the invention and its practical application.

When the minimal /initial/ single mass of the load-wing $M_{(L-W)}$min is determined within the tests, this value of this mass should be distributed among all elements and mechanisms, forming the single B-F-L-W. This distribution for variant of removal of vibrations in wide diapasons with placement of the B-F-L-Ws in direction parallelly to rotor axis is shown in FIG. 24.

The minimal /initial/ single mass of the load-wing $M_{(L-W)}$min should be distributed among the load (1), the wing (2), the fixture units (3), the joint-unit (4) and the unit for turning the wings (5). Here, a total mass of the B-F-L-Ws is equal to a double mass of the single B-F-L-W.

The distribution of the minimal /initial/ single mass of the load-wing $M_{(L-W)}$min for variant of removal of vibrations in super-wide diapasons with placement of the B-F-L-Ws in direction parallelly to rotor axis is presented in FIG. 25.

The minimal /initial/ single mass of the load-wing $M_{(L-W)}$min should be distributed among the load (1), the wing (2), the fixture units (3), the joint-unit (4), the unit for turning the wings (5), the unit for change the length of the wings (6) and the unit for changing the weights.

The distribution for variant of removal of vibrations in wide diapasons with placement of the B-F-L-Ws in direction perpendicularly to rotor axis is shown in FIG. 26. Here one can see some variants of how the minimal initial single mass of the B-F-L-W (see: variants I, II and III) should be distributed among the elements of the B-F-L-W under conditions of the B-F-L-Ws' being symmetrical, as it is shown in FIG. 26.

The total mass of the B-F-L-Ws will allow to determine the final dimensions of the loads, wings and other elements of the B-F-L-Ws.

OPERATION OF THE PRESENT INVENTION

When the B-F-L-Ws are being assembled, the complete tests are being passed and the data is collected, then being installed at the bearing-fulcrum the B-F-L-Ws may be operated by operator manually.

Depending on whether the vibrations will be damped in wide or super-wide diapasons, operator should (manually or with the use of mechanisms) change the angles α, or the lengths of the wings L and corresponding angles α, according to the collected data for the vibrations being damped.

It is preferred that those operations will be done by automatic equipment with use of computers. Connecting of computer with the database to the bearing vibrations indicatory system to conduct removal of beyond-normal vibrations at the bearing-fulcrum automatically is shown in FIG. 27. Other methods of damping vibration are shown in FIG. 28. The data taking devices of the current vibrations are practically installed at the bearings at all industrial T-G-Ss.

Those electronic devices are indicating vertical, transverse and axial vibrations at every bearing of T-G-S. When computer with the installed database (for collecting the data, see below) is connected with the bearings vibration indicatory system, the values of vibrations will be received in computer and compared with what is in the database according to the tests of the B-F-L-Ws (see: FIG. 29—automation—by use of computer and automatic equipment—of process of removal of beyond-normal vibrations at T-G-Ss in wide diapasons).

By way of illustrations, if the values of current vibrations at the bearing-fulcrum are: vertical V=14 μm, transverse T=9 μm and axial A=1 μm. (The upper limits of normal limits of vibrations: V, T=12 µm; A=1 µm. The permissible limits: V, T=20 µm; A=5 µm.) Among the tested analogous situations, for this situation the angle α should be changed up to 81° to damp the beyond-normal vertical vibration. Computer gives signal "α=81°", which goes to the executive mechanism that turns the wing upto 81°: the beyond-normal vibration is damped. The signal α, being sent from the computer to the executive mechanism(s) (see FIG. 30) may be bifurcate (variant I) or sole (variant II). For variant I: bifurcate signal sent equally to the two separate executive mechanisms for turning the wings of the B-F-L-Ws. For variant II: sole signal sent to the united executive mechanism for turning the wings of the B-F-L-Ws.

Automation of process of removal of beyond-normal vibrations at T-G-Ss in super-wide diapasons is shown in FIG. 31. Computer system works analogously to what is described in FIG. 29. But now, for the received and compared values of vibrations, computer sends two signals [L and α], to the executive mechanisms to damp beyond-normal vibration. Here, an optimizer may be used in this process: it is device serving to choose the variant of (L & α)—among many such sets of values for the one, which is the nearest [in time and to the values currently determined] set of (L & α)—to minimize work for the elongation and turning the wings in vibrations damping. Block for averaging (see FIG. 29) and L and α averaging block (see FIG. 31) are devices that may be used for averaging of the values of α (FIG. 29) and the values of L and α (FIG. 31) among numerous currently obtained within certain very short period of time.

As a result of the thorough tests the following data should be collected:

1. For damping vibrations in wide diapasons— for the stated mass of the load M and length of the wing L, also for the stated mass of the wing m and possible additional weight w, tuning the system to the damping of vibrations is done by changing the angle α.

For all possible values of the vibrations within all possible common-mode operating situations /starting, all common-mode (power) operations, stopping/, throughout the given range of this invention, thoroughly, the values of the angle α, i.e. the angle of the turn of the wing when the vibration is damped, should be determined and collected.

2. For damping vibrations in super-wide diapasons— for the stated mass of the load M, also for the stated mass of the wing m and weight w, tuning the system to the damping of vibrations is done by changing the length of the wing L and the angle α.

Here, for all possible values of the vibrations within all possible common-mode operating situations /starting, all common-mode (power) operations, stopping/, throughout the given range of this invention, thoroughly, the values of the length of the wing L and the angle α, i.e. the length of the wing with corresponding angle α when the vibration is damped, should be determined and collected.

The data should be collected (e.g. in the forms of tables or/and computer software) for the further use of the method.

Following the conducted tests, the B-F-L-Ws (the complete devices) may be

At the operating Plant installed at all bearings-fulcra to follow scanningly any change of vibration situation upon the bearings, with damping any slight increase of vibration, being indicated there as beyond-normal, down to normal values for all the processes of T-G-Ss operation /starting, all common-mode (power) operations, stopping/ thoroughly, and, therefore, keeping a complete vibration situation upon T-G-Ss permanently normal;

at one or several bearings-fulcra with indicated beyond-normal vibration (for this purpose the B-F-L-Ws may be installed in advance prior to starting T-G-S in operation, or within operation when beyond-normal vibrations are indicated);

or stored until need will be, i.e. until beyond-normal vibrations are indicated at one or several bearings-fulcra at concrete T-G-S or serial of T-G-Ss. For that use it will be better if special fixture units for fixing loads of the B-F-L-Ws to the cases of bearings will be installed in advance at all bearings, thus the B-F-L-Ws may readily be installed there (at any bearing-fulcrum) in a matter of minutes.

At the Research Centre/Manufacturer the construction of the bearings-fulcra in the future designed T-G-Ss should be changed according to this method and the results of the tests.

Conducting the tests at the Research Centre/Manufacturer of T-G-Ss is preferred, especially if the tests conducted for the serial of T-G-Ss.

Automation of process of removal of beyond-normal vibrations and keeping vibration situation normal and stable at whole T-G-S by the use of computer system and automatic equipment is presented in FIG. 32. Here, analogously to above-described automation of vibrations damping at one bearing-fulcrum, vibrations are damped at all the bearings of the whole turbine-generator-set, i.e. at the bearings-fulcra of all cylinders simultaneously, following scanningly any change of vibration situation upon the bearings, with damping any slight increase of vibration, being indicated there as beyond-normal, down to normal values for all the processes of T-G-Ss operation; this will keep a complete vibration situation permanently normal and stable at the whole T-G-S. It should be noticed, that here every B-F-L-Ws receives its own command from the computer (computer system).

Automation of process of removal of beyond-normal vibrations at T-G-Ss may be done when the B-F-L-Ws are installed at the whole cylinders.

One can see in FIG. 33 how vibration damping capabilities of simple wings increase within wing's turn round from 0° to 90° for damping of vertical a), transverse b) and axial c) vibrations. Here two variants of the B-F-L-Ws for damping of a complex vibration, i.e. of vertical, transverse and axial vibrations simultaneously, are also shown.

An increase of damping capabilities (increase of damping momentum Mdamp. and damping amplitude Adamp.) of wing depending on elongation of its length is shown in FIG. 34. One can see that for the same operating frequency both the damping amplitude and the damping momentum will increase with elongation of the wing. As a variant of how an elongation of the wings may also be achieved, one can see picture of use of the folding wings that may allow increasing of the damping amplitude and the damping momentum of the wings in FIG. 35. Here, pictures a), b), c) and d) show variants of spreading the folding wings. Variant of the mechanism for turning the folding wing is shown in picture e).

When spreading of folding wings (or even spreading of simple wings) in the operating space is limited, an increase of damping capabilities of the B-F-L-Ws may certainly be done by placement of two or several simple wings (e.g. the heavy and short wings) with their fixation (on)to the loads or/and the joint-units one under another as shown in FIG. 17 (par. 4*a*). For that the air space(s) between the wings must allow them not touch each other within turn of each wing from 0° to 90° when the turn is done simultaneously with other wings.

Pictures of additional damping capabilities of wing depending on its flexibility are presented in FIG. 36.

Use of highly elastic, flexible (in construction, substance or texture of material) wings may change the damping capabilities of the wing, comparing with use of firm and non-flexible one. Some variants of the forms of the B-F-L-Ws adapted to be used at the T-G-Ss' bearings-fulcra within limited space for spreading the wings are presented in FIG. 37. They relate, first of all, to the bearings-fulcra which are not completely open at some types of T-G-Ss. Variant A shows the B-F-L-Ws with the wings which work is based on the principle of work of the folding wings. Variant B shows the B-F-L-Ws where fixation of the wings boxes (with the wings) onto the joint-unit is done closer to the rotor vertical axis.

Under certain conditions, the rotor cylinders themselves may be accepted as the bearings-fulcra of the whole rotor system of the complete turbine-generator-set. Then the B-F-L-Ws may be installed at those cylinders (analogously to how it is done at bearing-fulcrum of cylinder of T-G-S) to damp beyond-normal vibrations at the rotor cylinders and keep a complete vibration situation over the whole rotor system at the whole T-G-S stable and normal permanently.

One may use this method in the only way, when the B-F-L-Ws will be installed at the whole rotor cylinders, if only those rotor cylinders are of the type (in the size, the construction, etc.), where (a) the related indicated vibrations at the bearings and at the whole rotor cylinder will not differ from each other, or will differ in the certain stable functional mutual dependence which is /or is enable to be/ known (or determined by present methods) for every moment; and at the same time; and (b) the removal of beyond-normal vibrations by this method can surely be done reducing the related vibrations down to normal level simultaneously both at the whole rotor cylinder (and at all its internal parts) and at its rotor bearings in particular.

Those cylinders are named as the specified rotor cylinders. Correlations A' and B'—in mutual dimensions and constructions—between bearings and their related rotor cylinder for which the method of removal of vibrations may be used so, that the B-F-L-Ws will be installed already upon whole rotor cylinder are shown in FIG. 38. Here, as examples, are given variants when the size of the bearing (in diameter) of the T-G-S does not differ from (or approximately equals to) the size of cylinder itself (in diameter) (see: Correlations A. A'), or/and when the distance between the bearings along the rotor axis does not differ from (or approximately equals to) the length of the cylinder itself (see: Correlations B. B'). Variants A and B relate to the ordinary cylinders. Variants A' and B' relate to the specified rotor cylinders where the above-mentioned conditions (a) and (b) must be observed.

The installation of the B-F-L-Ws at the whole rotor cylinder may be done as general variant [as shown at FIGS. 39, 40], or as an additional variant.

As additional (to the installation at the bearings) variant it may be done only if need will be.

Before the B-F-L-Ws are to be installed at the whole (specified) cylinder, the limit of permissible vibration at the whole rotor cylinder must be known [it must be indicated in the technical documentation of this rotor cylinder or of the T-G-S, or must be determined within the preliminary tests with certain definition how the vibrations at the whole rotor cylinder refer to the vibrations at its rotor bearings].

The installation and fixing of the B-F-L-Ws at the whole rotor cylinder is analogous to what must be done for the installation and fixing at the bearings. Here, the limitations of the mass, length, etc. of the B-F-L-Ws are analogous to the installation at the bearings.

Automation of the process of removal of vibrations at every cylinder as a whole and at the whole T-G-S is analogical to what must be done for the B-F-L-Ws to be installed and used at bearing-fulcrum.

The specified rotor cylinders of the T-G-S as the fulcra of the whole rotor system are shown in FIG. 40. Every specified cylinder along the rotor system of the whole T-G-S may be accepted as the bearings-fulcrum of the rotor system. Here, when the removal of vibrations is to be done at the specified cylinders, every zone of removal of vibration according to the B-F-L-Ws' method at the specified cylinder may be called the bearings-fulcrum zone; compare with the bearing-fulcrum zone (see also to compare: FIG. 1).

Variants of simple changings of the construction of bearing(s)-fulcrum (or the form of its upper cover) in the future designed T-G-Ss to be adapted for use of the B-F-L-Ws method—removal of vibrations at T-G-Ss without stopping their generating electricity/being in operation—are presented on FIG. 41.

Here, the additional mass (including loads-wings and related units) of the new designed upper cover* (see: variant A) that should be added to the original mass of upper cover has to be equal to a double mass of the single bearing-fulcrum-load-wing (B-F-L-W). The additional mass (including loads-wings and related units) of the new designed upper cover (see: variant B) that should be added to the original mass of upper cover has to be equal to two double masses of the single bearing-fulcrum-load-wing (B-F-L-W). For variant C (the new designed upper cover*), the minimal additional mass that should be added to the original mass of upper cover has to be equal to two double masses of the single bearings-fulcrum-load-wing (B-F-L-W).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. This method also covers all other possible applications in all kind of machinery and technologies for as long it successfully damps vibrations. For this, the key places for installation of the B-F-L-Ws may be, but not limited to, the bearing(s)-fulcra, or fulcra, zones, where vibration is resulted.

It is intended that the scope of the invention be defined by the Claims appended hereto and their equivalents. Therefore, the scope of the invention is to be limited only by the following claims.

What is claimed is:

1. A method for dampening vibration in a Turbine Generator set, said method comprising the steps:

affixing a pair of bearing fulcrum load wings to a location on a bearing housing of a turbine-generator set that is susceptible to vibration; and tuning the characteristics of said bearing fulcrum load wings in a manner that results in tunability of vibration dampening capability.

2. The method of claim 1, wherein the characteristic of said bearing fulcrum load wing that is tuned is the length of said bearing fulcrum load wing.

3. The method of claim 1, wherein the characteristic of said bearing fulcrum load wing that is tuned is selected from the group comprising:

the width of said bearing fulcrum load wing; the position of said bearing fulcrum load wing; the weight of said bearing fulcrum load wing and; and the relative angle between said bearing fulcrum load wings and a lateral horizontal line of said bearing housing.

4. The method of claim 1, further comprising the step of actively tuning the characteristics of said bearing fulcrum load wings utilizing a computer control means for adjusting said characteristic.

5. The method of claim 1, further comprising the step of actively tuning the characteristics of said bearing fulcrum load wings utilizing means for adjusting said characteristic selected from the group comprising:

computer electronic control, mechanical control, elecromechanical control; hydraulic control; electro-hydraulic control; and manual control.

* * * * *